(12) United States Patent
Funamoto et al.

(10) Patent No.: US 6,742,907 B2
(45) Date of Patent: Jun. 1, 2004

(54) ILLUMINATION DEVICE AND DISPLAY DEVICE USING IT

(75) Inventors: Tatsuaki Funamoto, Suwa (JP); Osamu Yokoyama, Suwa (JP); Satoru Miyashita, Suwa (JP); Kanemitsu Kubota, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/431,541

(22) Filed: May 8, 2003

(65) Prior Publication Data

US 2003/0206408 A1 Nov. 6, 2003

Related U.S. Application Data

(63) Continuation of application No. 09/068,931, filed as application No. PCT/JP97/03388 on Sep. 24, 1997, now abandoned.

(30) Foreign Application Priority Data

| Sep. 24, 1996 | (JP) | 8-252094 |
| Nov. 14, 1996 | (JP) | 8-303389 |
| Dec. 20, 1996 | (JP) | 8-342224 |
| Dec. 27, 1996 | (JP) | 8-350199 |
| Jan. 8, 1997 | (JP) | 9-001586 |
| Feb. 6, 1997 | (JP) | 9-023862 |
| Mar. 17, 1997 | (JP) | 9-063658 |

(51) Int. Cl.$^7$ ................................................ F21V 7/04
(52) U.S. Cl. ........................ 362/31; 362/561; 349/63
(58) Field of Search .......................... 362/26, 31, 561; 349/63, 201, 65

(56) References Cited

U.S. PATENT DOCUMENTS

| 5,134,549 | A | | 7/1992 | Yokoyama | |
| 5,349,503 | A | * | 9/1994 | Blonder | 362/31 |
| 5,461,547 | A | * | 10/1995 | Ciupke | 362/31 |
| 5,521,797 | A | | 5/1996 | Kashima | |
| 5,729,311 | A | | 3/1998 | Broer | |
| 5,775,791 | A | * | 7/1998 | Yoshikawa | 362/31 |
| 5,779,338 | A | | 7/1998 | Ishikawa | |
| 6,130,730 | A | | 10/2000 | Jannson | |
| 6,174,064 | B1 | | 1/2001 | Kalantar | |
| 6,582,091 | B2 | * | 6/2003 | Funamoto et al. | 362/31 |
| 2001/0055076 | A1 | * | 12/2001 | Ochi et al. | 349/63 |

FOREIGN PATENT DOCUMENTS

| JP | 06324331 A | 11/1994 |

* cited by examiner

Primary Examiner—Drew Dunn
Assistant Examiner—Leo Boutsikaris
(74) Attorney, Agent, or Firm—Oliff & Berridge, PLC

(57) ABSTRACT

An illumination device is provided of the type arranged at the front which is of low power consumption and of high recognisability both when the illumination is turned on and when illumination is turned off. An illumination device arranged at the front face of an illuminated object has a light-guide plate forming a transparent flat plate shape and formed with point-form optical extraction structures on its surface or in a position facing this surface, and a light source arranged opposite and end face of this light-guide plate. The light source is for example a point light source. The optical extraction structures are for example pillar-shaped projections and these are arranged two-dimensionally. The function is provided that, when this illumination device is arranged at the front of the illuminated body, rays are projected on to the illuminated body and rays reflected by the illuminated body are transmitted with scarcely any dispersion. There is also provided a function of transmitting external light with scarcely any dispersion of rays reflected by the illuminated body when the illumination is not turned on. A point light source such as a light emitting diode (LED) or electric light bulb can be employed and low power consumption can easily be achieved.

9 Claims, 77 Drawing Sheets

ILLUMINATION DEVICE AND DISPLAY DEVICE USING IT

This is a Continuation of application Ser. No. 09/068,931 filed May 21, 1998 now abandoned (U.S. National Stage of PCT/JP97/03388, filed Sep. 24, 1997). The entire disclosure of the prior application is hereby incorporated by reference herein in its entirety.

BACKGROUND OF THE INVENTION

1. Field of Invention

The present invention relates to an illumination device and display device using this wherein a light-guide plate is arranged at the front face of an illuminated object and this illuminated object is two-dimensionally surface-illuminated, and more particularly relates to an illumination device and display device using this wherein properties such as illumination function, recognisability, contrast and energy-saving that are based on the optical diffusion characteristic of this light-guide plate are greatly improved.

2. Description of Related Art

Conventionally, various types of illumination device are employed that exhibit the function of surface illumination in respect of a display device that requires planar illumination, such as a liquid crystal display device.

For example there is known a display device that is arranged at the back face of the object to be illuminated, such as a liquid crystal display panel; normally such an illumination device is arranged to be constantly lit. An illumination device is also known mounted on a liquid crystal display device having a reflective function. In the case of such an illumination device, a reflective plate is arranged at the back face of the liquid crystal display panel and the device is employed by illumination provided by external light. Furthermore, an illumination device is also known that is arranged together with a semi-transparent reflective plate at the back face of a liquid crystal display panel; this illumination device is used for reflection when the environment is brighter and to provide back lighting illumination when the environment is dark (for such devices, for example Early Japanese Patent Publication No. SHO.57-049271, Early Japanese Patent Publication No. SH0.57-054926 and Early Japanese Patent Publication No. SH0.58-095780 may be referred to).

However, conventional illumination devices having solely an illumination function suffered from the problem that power consumption in order to keep the light source constantly lit was large; for example, they could not be used over a long time to provide illumination for portable equipment. Also, in the case where a conventional display device having solely a reflective function was mounted on a liquid crystal display device or the like, there was the problem that contrast of the display screen was low, making it impossible to employ them in a dark environment. Furthermore, illumination devices that are employed with a semi-transparent reflective plate inevitably have the problem that the display is dark both when used with reflection and when used with back lit illumination; this technique represents an unsatisfactory compromise and has not become popular at all.

In these circumstances there has recently been proposed for example in Early Japanese Patent Publication No. H.6-324331 an illumination device that is arranged at the front face of a display device such as a liquid crystal display device. The illumination device of this proposal is incorporated in a thin liquid crystal display device and has the object of ensuring high contrast of illumination both when lit and when not lit. Specifically, a thin illumination device is arranged at the top face (front face) of a liquid crystal display and a reflective plate is arranged at the back face of the liquid crystal display. The illumination device comprises a light-guide plate and a light source that is arranged at the end face of this light-guide plate or in its vicinity. At the optical output face of the light-guide plate, there is formed an indented shape comprising faces practically parallel with this face and faces approximately perpendicular thereto. The indented shape may be formed for example of a plurality of ribs or projections of cylindrical or prismatic shape.

However, the illumination devices arranged at the front face of these publications are adapted to light sources of rod or linear shape. For such light sources, fluorescent tubes, which are of high light-emitting efficiency are generally employed; however, fluorescent tubes need power of at least a certain level and suffer from the problem that their power consumption cannot be reduced below this. Also, if point light sources such as LEDs or electric light bulbs were employed, there was the problem that, since the lines of intersection at the root sections forming the ribs or prismatic projections and optical output faces are straight lines, the quality of illumination tends to be adversely affected by regular reflection. Furthermore, in the case of point light sources, there was the problem that unevenness of brightness could not be eliminated by one-dimensional distribution control of the pattern of the projections. Also, illumination devices arranged at the front face in this way were subject to the problem of being easily affected by external damage to the light-guide plate, causing light to be emitted by dispersive reflection of optical flux from such damaged portions, lowering the contrast of the illuminated object such as the liquid crystal display when lit.

Also, with such illumination devices of the type that were arranged at the front face, since the light source is arranged at the end face of the light-guide plate, a space needs to be provided at the end of the light-guide plate sufficient to screen the light source from the observer; if they are employed as illumination for a liquid crystal display or the like, a border is therefore necessary around the periphery of the display area. This resulted in waste of space and imposed considerable design limitations.

In one aspect, the present invention was made in order to solve the various problems of a conventional illumination device as described above.

An object of the present invention is to provide an illumination device using a point light source of low power consumption and high quality, and a display device such as a liquid crystal display device using this.

Also, a further object of the present invention is to provide an illumination device of low power consumption and high quality by employing as light source a light emitting diode (LED), and a display device such as a liquid crystal display device using this. Yet a further object of the present invention is to provide an illumination device whereby illumination can be achieved without loss of reflective function and a display device such as a notice board device or liquid crystal display device using this, and a device such as an electronic device or mobile telephone using this liquid crystal display device.

Yet a further object of the present invention is to provide an illumination device with little deterioration of illumination function by low-cost, convenient means, and a display device such as a liquid crystal display device with little deterioration of display quality.

Yet a further object of the present invention is to provide an illumination device whereby rays of light can be efficiently directed into the interior of a light-guide plate from a light source positioned remote from the light-guide plate end, which is space-saving, and has excellent design characteristics, a display device such as a liquid crystal display device, and a device such as an electronic device or mobile telephone using this liquid crystal display device.

Furthermore, from the point of view of display devices in which an illumination device is mounted, in view of conventional reflective type liquid crystal display devices for the aforesaid display devices, it is an object to provide various types of electronic device such as liquid crystal display devices, portable telephone devices; timepieces, cameras or data terminal devices wherein the production of a bright line which is annoying to the observer can be prevented, wherein unevenness of brightness can be eliminated, which are of a type in which power consumption can be reduced and furthermore which afford an illumination function of high quality.

Furthermore, conventionally, notice board devices having an illumination function were of a construction in which a casing was provided whose front face was covered by transparent glass and wherein a notice was illuminated by arranging a light source at the front edge of the notice. Also, they were of a construction in which the person viewing them could not directly see the light source due to an optical screening section, also serving as a casing, in front of the light source.

However, conventional notice board devices suffered from the problem that they had to be of sufficient thickness in order for the entire notice to be illuminated, and that the difference of illumination was large at locations remote from the vicinity of the light source.

Also, in a further aspect relating to a display device, an object of the present invention is to provide a notice board device wherein such problems are solved and which is of small thickness and wherein the uniformity of illuminance is high.

SUMMARY OF THE INVENTION

In order to solve the aforementioned problems, in one aspect thereof, the present invention provides an illumination device arranged at the front face of an illuminated object, comprising a light-guide plate of transparent flat plate form formed with point-form optical extraction structures on its surface on at a position facing this surface, and a light source arranged facing the end face of this light-guide plate. Suitably the light source is a point light source. Also for example the optical extraction structures are distributed relatively sparsely in the vicinity of the point light source and progressively more densely going away from the point light source. Further, a rod-shaped optical diffuser may be provided arranged between the end face of the light-guide plate and the point light source. For example a milky white transparent body in which optical diffusing material is dispersed may be employed as the rod-shaped diffuser. Also for example a transparent body formed with optical extraction shapes may be employed as the rod-shaped optical diffuser. As an example, rib-shaped projections may be provided as the optical extraction structures on the optical output face facing the illuminated object of the light-guide plate. Further, pillar-shaped projections may be provided as the optical extraction structures on the optical output face facing the illuminated object of the light-guide plate. Also, as a further aspect, in a liquid crystal display device comprising a liquid crystal display and an illumination device arranged at the front face of this liquid crystal display, the illumination device comprises a light-guide plate forming a transparent flat plate shape and formed with point-form optical extraction structures on its surface or at a position facing this surface, and a point light source arranged facing the end face of this light-guide plate.

Further, as another aspect, there is provided a display device arranged at the front face of an illuminated object comprising a light-guide plate formed of transparent plate shape and formed at its surface with projections or concavities for optical diffusion having an inclined surface of under about 30° with respect to this surface, and a light source arranged opposite the end face of this light-guide plate. In this case, a reflecting member can be arranged adjacent the other end face of the light-guide plate apart from the end face where the light source is arranged. Also, a reflecting member may be arranged so as to cover this light source and the end face of the light-guide plate where the light source is arranged.

Also, as a further aspect of an illumination device according to the present invention, in an illumination device wherein optical flux from a light source is transmitted in one direction practically orthogonal to the plate face direction and that is provided with a light-guide plate that delivers this optical flux as illumination from a face in this one direction, a sheet-form transparent member is arranged facing the face of the light-guide plate on the opposite side to this one direction.

As another aspect there is further provided; in an illumination device arranged at the front face of an illuminated object, a light-guide plate formed with optical extraction structures at its surface and constituting a transparent sheet-shaped member, and a light emitting diode (LED) arranged integrally with an end face of this light-guide plate. Suitably, the optical extraction structures are distributed relatively sparsely in the vicinity of the light emitting diode and progressively more densely going away from the light emitting diode. Also, pillar-shaped projections could be provided as the optical extraction structures on a face facing the illuminated object of the light-guide plate. Concave shapes or convex-shaped projections could be provided as the optical extraction structures on a face opposite to the face facing the illuminated object of the light-guide plate. Also as a further aspect, in an illumination device arranged at the front face of an illuminated object, there are provided a light-guide plate formed with optical extraction structures at at least one face of the transparent flat plate, a light source arranged at a position remote from the same planar position as this light-guide plate, and means for converting that convert the direction of the rays from this light source so that they are guided into the optical input face of the light-guide plate.

Yet further, in an aspect of the present invention relating to a display device, as one mode thereof, in a liquid crystal display device of the reflective type wherein at least a front light is arranged at the top face and a polarisation separating plate is arranged at the bottom face, this front light comprises a light-guide plate comprising a flat transparent plate formed with a plurality of point-form optical extraction elements in its surface, and a point light source arranged facing the end face of this light-guide plate. For example these optical extraction structures may be distributed relatively sparsely in the vicinity of the light source and progressively more densely going away from the light source. Also suitably a rod-shaped optical diffuser is provided arranged at the end face of the light-guide plate and the point light source is arranged at the end of this rod-shaped optical diffuser. Also suitably pillar-shaped projections are provided as the optical extraction structures on a face facing the illuminated object of the light-guide plate. Furthermore, concave shapes or convex shapes could be provided as optical extraction structures on the face on the opposite side to the face facing the illuminated object of the light-guide plate.

In yet a further aspect of a display device according to the present invention, in a notice board device having an illumination function, a transparent plate is arranged at the front face of the notice and a function of planar illumination of this notice is conferred on this transparent plate.

Features relating to further structure and benefits of the present invention will be apparent from the detailed description of the accompanying drawings and the following embodiments.

DETAILED DESCRIPTION OF PREFERRED EMBODIMENTS

Figure 1A:
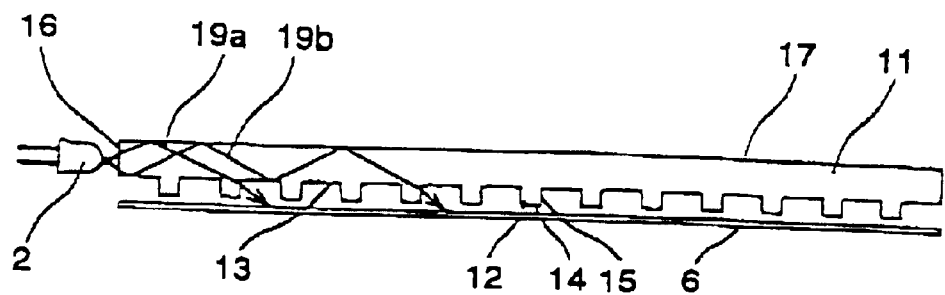
FIG. 1A and FIG. 1B are a diagrammatic cross-sectional view and perspective view illustrating a first embodiment of the present invention.
Figure 1B:
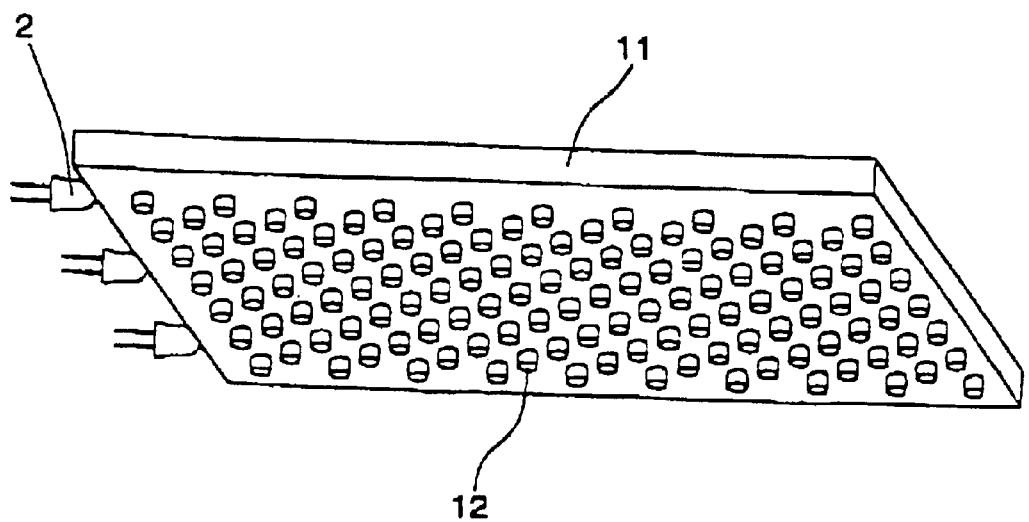

Embodiments of the present invention and modifications thereof are described below with reference to the drawings.
First Embodiment A first embodiment of the present invention is described with reference to the drawings. In FIG. 1A one or a plurality of point light sources 2 are arranged at the end face of light-guide plate 11. As shown in FIG. 1B, light-guide plate 11 is provided with projections 12 on one face of the transparent plate; the faces of projections 12 are in all cases constituted by faces practically parallel to optical output face 13 (bottom face 14) and faces practically perpendicular thereto (side faces 15). Light-guide plate 11 is formed by transparent material of refractive index about 1.4 or more. After the optical flux from a point light source 2 is input from end face 16 as shown by ray 19a or ray 19b, it is subjected to total reflection within light-guide plate 11 and is emitted solely from the side faces 15 of projections 12, so the optical output from the back face of the illumination device is large, enabling illuminated element 6 to be efficiently illuminated.

Also, for the transparent material forming light-guide plate 11, there may be employed transparent resin such as acrylic resin, polycarbonate resin, or amorphous polyolefin resin etc. or inorganic transparent material such as glass or a combination of these; these may be formed by a method such as joining a film or resin layer on to an injection moulding, thermosetting resin, photosetting resin, etching, transparent resin or flat glass sheet.

As light sources 2, light emitting diodes (LEDs) or electric light bulbs etc. may be employed. In comparison with the fluorescent tubes that were conventionally employed, these do not require special equipment such as voltage step-up devices and are of light weight and compact and excellent safety since they do not employ high frequencies or high voltages. Also, power control is easy and they can easily cope with applications requiring low power consumption. In particular the life of LEDs is semi-permanent and, regarding colours, they have recently become available with red, green, blue, mixtures of these and white colour. If electric light bulbs are employed, although their life is short, they are cheap and can easily be changed.

With the above construction, by arranging this illumination device at the front face of illuminated body 6, part-time illumination can be achieved in which the illuminated body 6 is observed by turning off illumination under bright conditions when there is sufficient external light, whereas the illuminated body can be observed by switching on illumination under dark conditions when external light is insufficient.

As the illuminated body 6 of an illumination device as described above, printed material such as printed paper or a liquid crystal display or the like are suitable.

Figure 2A:
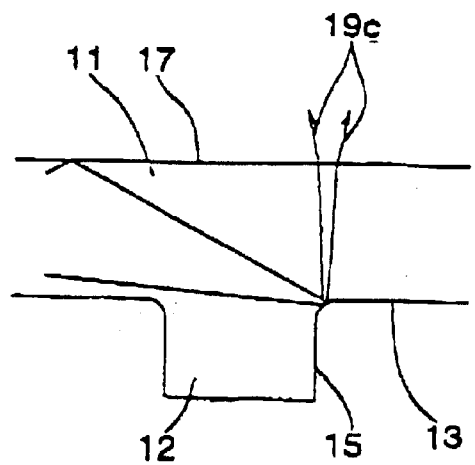
FIG. 2A and FIG. 2B are diagrams illustrating a problem of the prior art.
Figure 2B:
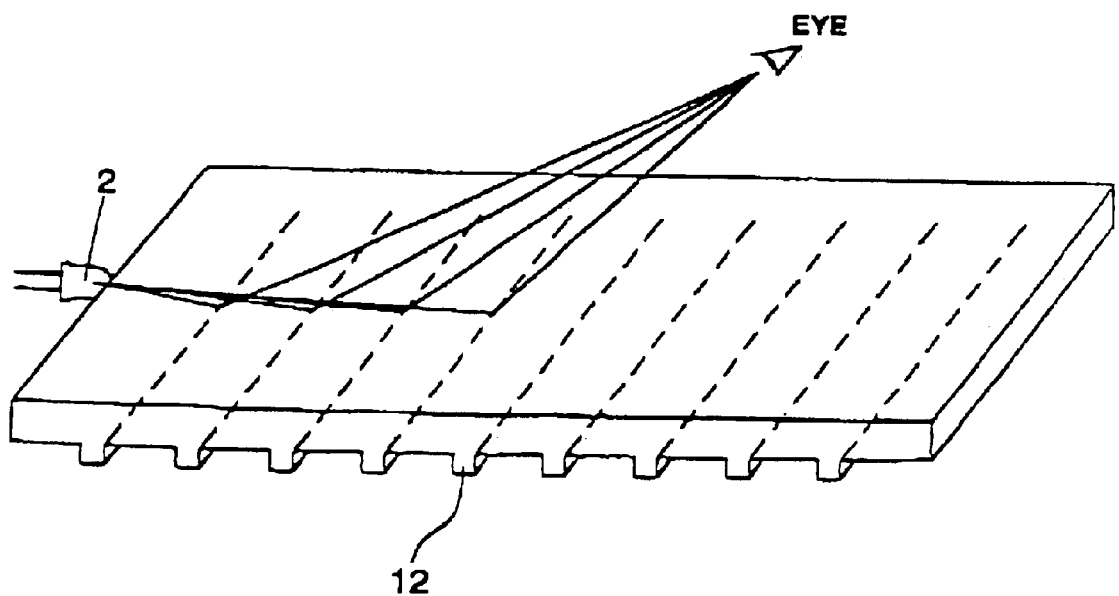

However, as shown in FIG. 2A, it is found that the lines of intersection of the optical output face 13 of light-guide plate 11 and side faces 15 of projections 12 have a minute curved face in manufacture, so some reflected light 19c leaks towards the face 17 opposite the optical output face (the observer's side) and this can be observed by the observer as bright points. As shown in FIG. 2B, when projections 12 are in the form of ribs and these intersection lines are straight lines, the point light source 2, the aforesaid bright points, and the observer are located in the same plane, with the result that specific positions on the light-guide plate appear as bright points to the observer and these bright points move with movement of the observer's eye. These adversely affect recognisability of illuminated body 6. In contrast, with the for example cylindrical shape of projections 12 as in this embodiment, since the bright points do not move in the plane of the light-guide plate 11, uniform recognisability can be obtained irrespective of the observation position of the observer.

Regarding the size of projections 12, since the wavelength of visible light is about 380 nm to 700 nm, this should be at least about 5 $\mu$m in order to avoid diffraction effects and in order to make the size of projections 12 such as not to be noticed with the naked eye should be less than about 300 $\mu$m. Apart from the above, from the point of view of convenience in manufacture, the size of the projections is desirably above about 10 $\mu$m and below 100 $\mu$m. Regarding the ratio of the height and width (i.e. the diameter in the case where these are approximately cylindrical) of projections 12, this may be below 1:1 since the angle of elevation of a light ray within light-guide plate 11 in the planar direction is less than 45°; and in fact satisfactory performance is exhibited up to a ratio of about 1:2, since rays of under 20° represent more than 90%.

Figure 3:
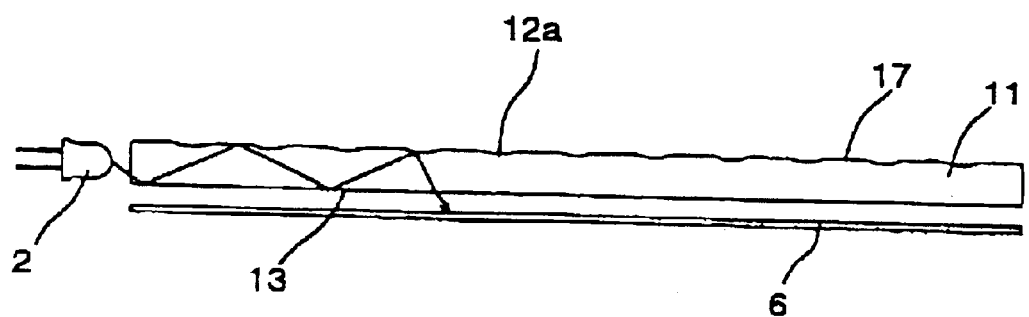
FIG. 3 is a diagrammatic cross-sectional view of a modification of the first embodiment.

A modification is shown in FIG. 3. In FIG. 3, a concave shape 12a is provided on the side of the face 17 opposite the optical output face of light-guide plate 11. Concave shape 12a can have arbitrary size and shape; it has the function of converting optical flux that reaches this concave shape 12a into optical flux having a large angle of elevation with respect to light-guide plate 11; it is found that a satisfactory characteristic is obtained by making this approximately a spherical surface of central angle under 90°. Optical flux that is fed from point light source 2 into light-guide plate 11 is guided within light-guide plate 11 by repeated total reflection but, thanks to the provision of concave shapes 12a in the face 17 opposite the optical output face of light-guide plate 11, optical flux arriving at these is converted to optical flux having a large angle of inclination with respect to the plane of light-guide plate 11, and can thus be output from optical output face 13. By arranging illuminated body 6 on the side of optical output face 13 of light-guide plate 11, this construction functions as planar illumination. And since regions of the surface other than the concave shapes on the side of face 17 opposite the optical output face are parallel with output face 13, these also have the function of vertical ray transparency i.e. of transmitting rays in the direction that intersects the flat plate at right angles.

These concave shapes 12a can be provided in any desired area ratio. However, although the efficiency of illumination can be raised by making the area ratio of concave shapes 12a large, recognisability is lowered by decreasing the ratio of perpendicularly transmitted rays. In fact to set an area ratio exceeding 50% is not realistic and as part-time illumination under dark conditions an area ratio of about 10% may suitably be set. Also, if it is desired to increase/decrease their density in order to achieve uniformity of illumination brightness as described above, at about 10%, the area ratio of the perpendicular transmission section is a range of about 80–90%, so there is no sensation of unevenness of recognisability at different positions.

Regarding the size of concave shapes 12a, since the wavelength of visible light is about 380 nm to 700 nm, it is necessary that this size should be at least about 5 $\mu$m in order that diffraction effects are not produced and should desirably be less than about 300 $\mu$m in order to be such that concave shapes 12a are not noticeable to the naked eye. In addition to the above, from the point of view of convenience in manufacture, the size of the concave shapes should desirably be above about 10 $\mu$m and below 100 $\mu$m.

Figure 4:
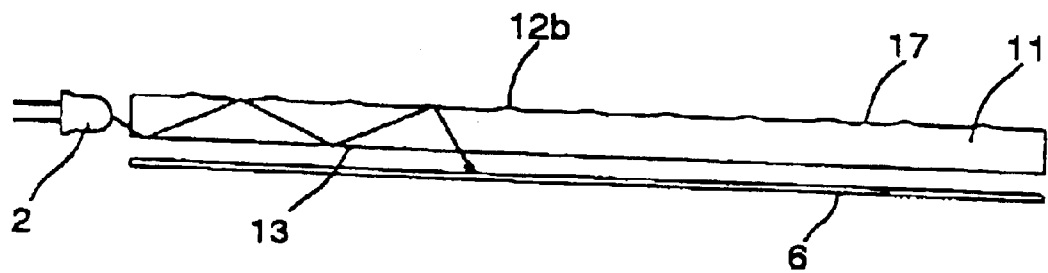
FIG. 4 is a diagrammatic cross-sectional view of a further modification of the first embodiment.

A further modification is shown in FIG. 4. In FIG. 4, concave shapes 12b are provided on face 17 of light-guide plate 11 opposite the optical output face. Convex shapes 12b can have arbitrary size and shape and have the function of converting optical flux arriving at these convex shapes 12b into optical flux having a large angle of elevation with respect to the plans of light-guide plate 11; it is found that good results are obtained by making them approximately conical surfaces of apex angle less than 120°. The density and size of convex shapes 12b are the same as in the case of the concave shapes described above.

Figure 5:
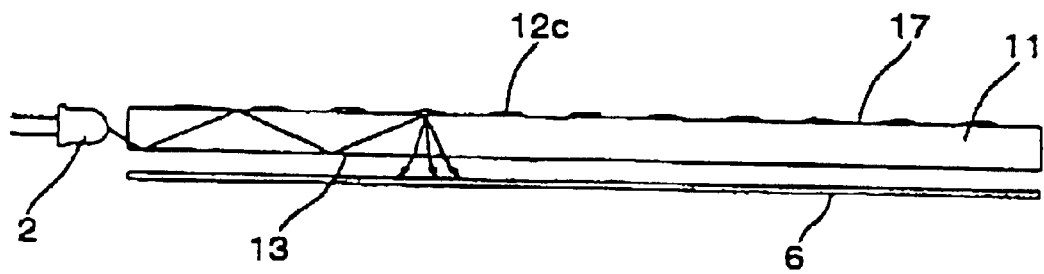
FIG. 5 is a diagrammatic cross-sectional view of a further modification of the first embodiment.

A further modification is shown in FIG. 5. In FIG. 5, an optical diffusion member layer 12c is provided on the side of face 17 opposite to the optical output face of light-guide plate 11. Optical diffusion member layer 12c has arbitrary size and shape and has the function of converting optical flux arriving at this optical diffusion member layer 12c into optical flux having a large angle of elevation with respect to the plane of light-guide plate 11. Specifically, this optical diffusion member layer 12c has the function of optical diffusion towards optical output face 13 and optical screening to face 17 opposite the optical output face. In order to guarantee optical screening, a further optical screening layer can be provided. The density and size of optical diffusion member layer 12c are the same as in the case of the concave shapes described above.

Figure 6:
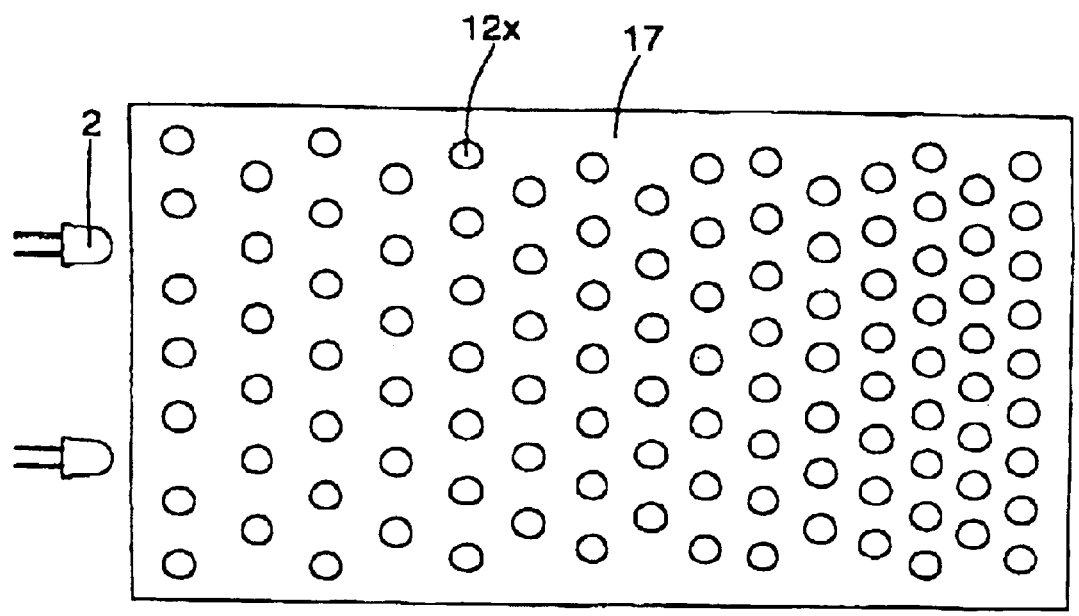
FIG. 6 is a diagrammatic cross-sectional view of a further modification of the first embodiment.

A further modification is shown in FIG. 6. FIG. 6 shows an example in which point-shaped optical extraction shapes 12x as described above (optical extraction structures) are distributed sparsely in the vicinity of point light sources 2 and more densely further away from point light sources 2. The optical flux density in light-guide plate 11 is high in the vicinity of point light sources 2 but the light rays are diffused by optical extraction shapes 12x and, since the density of the optical flux decreases with increasing distance from point light sources 2, optical extraction shapes 12x are arranged more densely in continuous manner. More uniform illumination can thereby be achieved.

Figure 7:
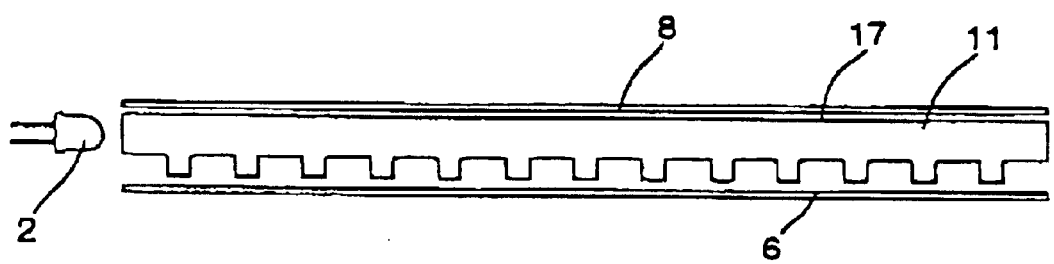
FIG. 7 is a diagrammatic cross-sectional view of a further modification of the first embodiment.

A further modification is shown in FIG. 7. In FIG. 7, a transparent plate or transparent sheet 8 is arranged on the side of face 17 opposite the optical output face of light-guide plate 11. Light-guide plate 11 and the transparent plate or transparent sheet 8 are not stuck together and an air layer is present. If there is even slight damage to the surface of light-guide plate 11, the light rays that are guided through its interior are reflected thereat and it can be recognised from the surface as a bright point or bright line. Not only is such damage unattractive in transparent type illumination but it also severely lowers recognisability in that it lowers contrast etc. However, since the transparent plate or transparent sheet 8 is separated from light-guide plate 11 by an air layer, there is no possibility of optical flux entering it from a light source 2, so that even if it does get damaged bright points or bright lines cannot be produced. Also in this case, since the relative area of the damage is very slight, there is very little effect on recognisability of illuminated body 6. In order for this light-guide plate 11 to be used as illumination positioned at the front, the presence of this transparent plate or transparent sheet 8 is indispensable. As the transparent plate or transparent sheet 8, transparent resin such as acrylic resin, polycarbonate resin, or amorphous polyolefin resin, or inorganic transparent material such as glass can be used. Also, in an electronic device incorporating this illumination device, transparent plate or transparent sheet 8 may also serve as the cover glass of the casing.

Second Embodiment

Figure 8:
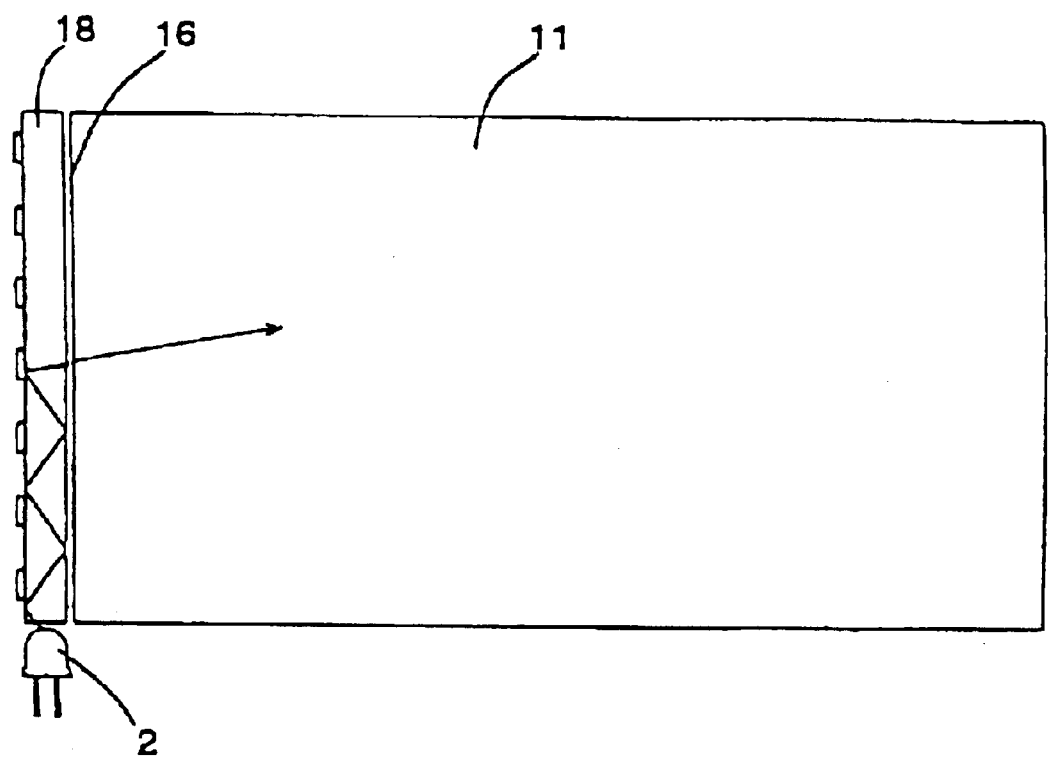
FIG. 8 is a plan view showing a second embodiment of the present invention.
Figure 9A:
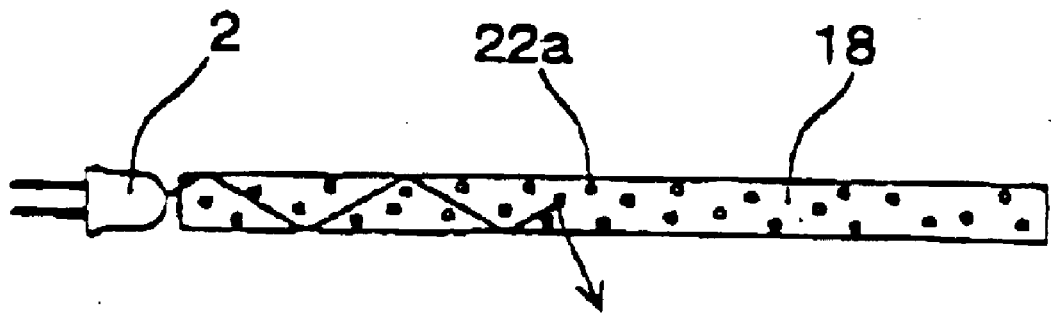
FIG. 9A and FIG. 9B are diagrammatic cross-sectional views of a modification of the second embodiment.
Figure 9B:
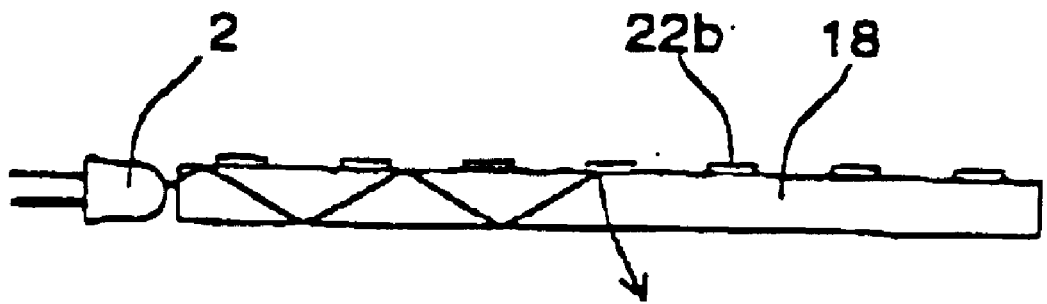

A second embodiment of the present invention is described with reference to the drawings in FIG. 8, a rod-shaped optical diffuser 18 is arranged at at least one end face of light-guide plate 11 and furthermore a point light source 2 is arranged at an end face orthogonal to the axial direction of rod-shaped diffuser 18. Rod-shaped diffuser 18 has the function of guiding the optical flux of point light source 2 arranged at its end face so that the optical flux is uniformly dispersed from the surface of rod-shaped diffuser 18 by means of diffusing material incorporated in its interior and/or optical diffusion shapes arranged at its surface, thereby providing the function of converting the point light source to a linear light source. Light that is input from the surface of rod-shaped diffuser 18 is led to the end face 16 of light-guide plate 11 and is guided within light-guide plate 11. The optical extraction structures described above are formed at the surface of light-guide plate 11, but, even if the optical diffusion shapes are conventional rib shapes or prism shapes, bright lines at specific positions such as would be produced if a point light source were directly incident cannot appear. For rod-shaped optical diffuser 18, a diffuser incorporating transparent bodies 22a having a refractive index different from that of the transparent resin as in FIG. 9A, or a diffuser formed with an optical diffusion pattern 22b by printing or the like on to the surface of the transparent resin as in FIG. 9B could be employed.

Third Embodiment

Figure 10:
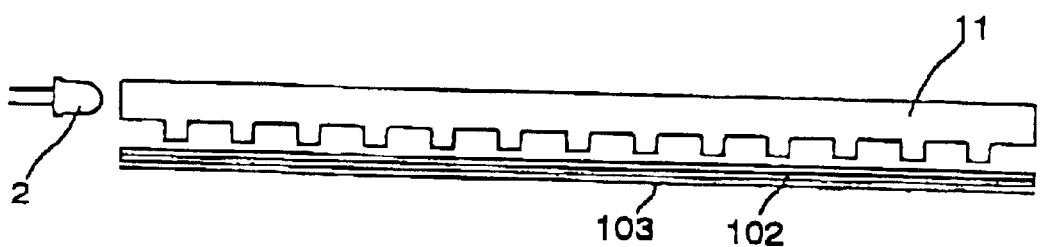
FIG. 10 is a diagrammatic cross-sectional view showing a third embodiment of the present invention.

A third embodiment of the present invention is described with reference to the drawings. FIG. 10 shows an example in which a liquid crystal display panel is employed as the illuminated body. Light-guide plate 11 is arranged at the front face of liquid crystal display panel 102. A reflecting plate 103 is arranged at the back face of liquid crystal display panel 102, so as to constitute a reflective type liquid crystal display device. Light-guide plate 11 has the function of projecting light rays towards liquid crystal display panel 102 and of transmitting light rays reflected by reflecting plate 103 with scarcely any dispersion. This is particularly effective when light source 2 is extinguished when the external light is sufficient; in this case, light-guide plate 11 acts simply as a transparent plate without lowering the recognisability and so has no effect on display quality. And when this is lit for use in dark locations where there is insufficient external light, light-guide plate 11 illuminates liquid crystal display panel 102 and the reflected light produced by reflecting plate 103 passes directly through light-guide plate 11 which now functions simply as a transparent plate in the same way as in the extinguished case described above. This is therefore effective in maintaining high recognisability.

Also, whereas, with a transparent-type liquid crystal display device in which the illumination device is arranged at the back face of the liquid crystal panel, bright/dark contrast is generated by passage of the rays from the illumination device through the liquid crystal display panel once only, with a reflective type liquid crystal display device wherein, as in the present invention, the display device is arranged at the front face of the liquid crystal display panel, rays from the illumination device pass through one more time since they are reflected by the reflecting plate after once passing through the liquid crystal display panel; this is beneficial in obtaining higher recognisability, since contrast is increased. As described above, with the first to third embodiments and the modifications thereof, thin surface illumination can be provided suitable for notices or displays etc. that make use of external light.

Also, in applications such as portable computer terminals, a liquid crystal display device can be provided wherein, when used with illumination extinguished in order to save power in well-lit locations, display quality is not lost and, when lit, high contrast is obtained with lower power consumption by using an LED or electric light bulb or the like.

Figure 11:
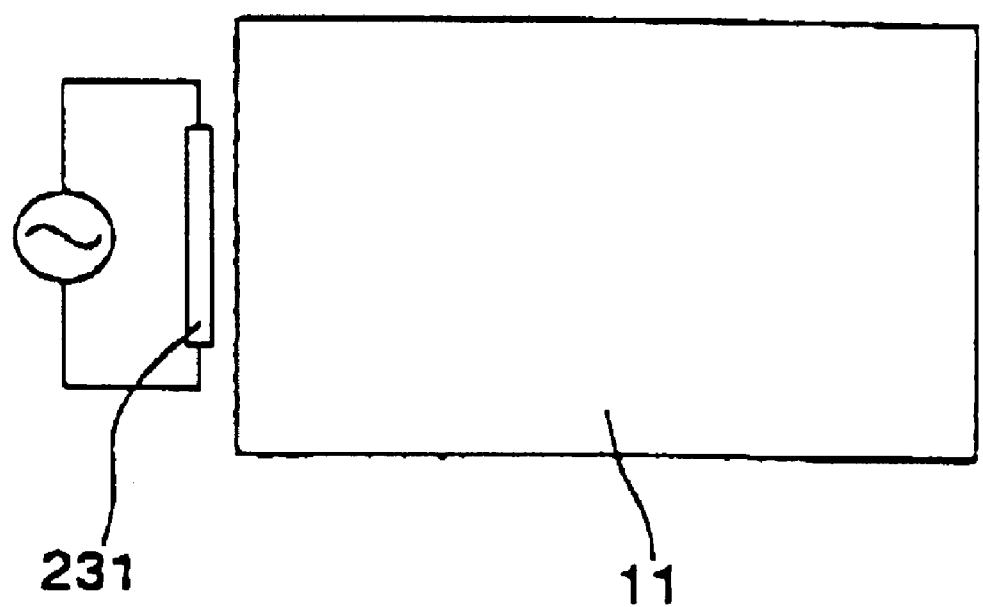
FIG. 11 is a diagram showing a further modification.

It should be noted that the light source employed in the illumination device of the present invention is not necessarily restricted to a point light source as described above. For example, as shown in FIG. 11, as light source, a short fluorescent tube 231 could be arranged along one optical input side end face of light-guide plate 11. In this connection "short fluorescent tube" means shorter than the length of the optical input side end face of the light-guide plate. The optical conversion efficiency of this fluorescent tube is about 10–20 lm/W, which is higher than the efficiency of an LED, which is about 5 lm/W and, since it is short, it can be lit with low power.

Figure 12A:
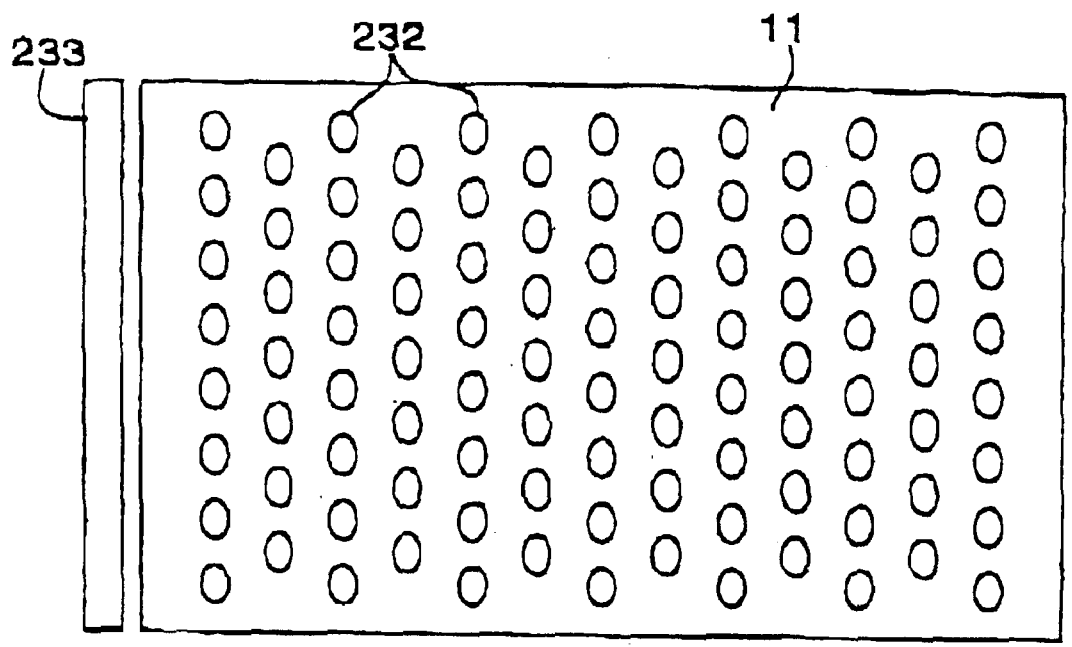
FIG. 12A and FIG. 12B are diagrammatic plan views showing a further modification.
Figure 12B:
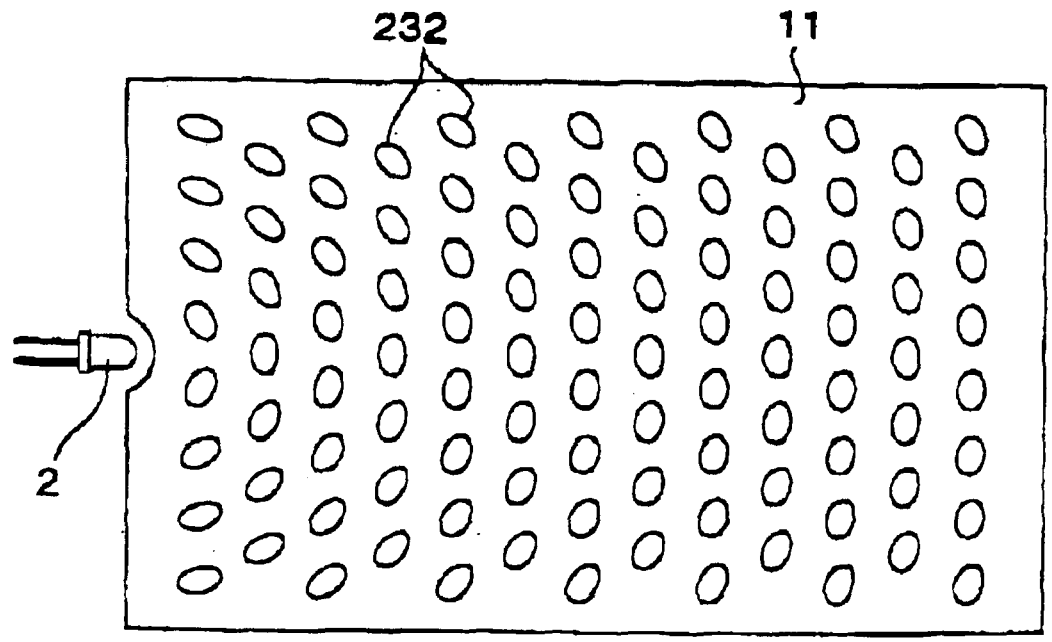
Figure 13:
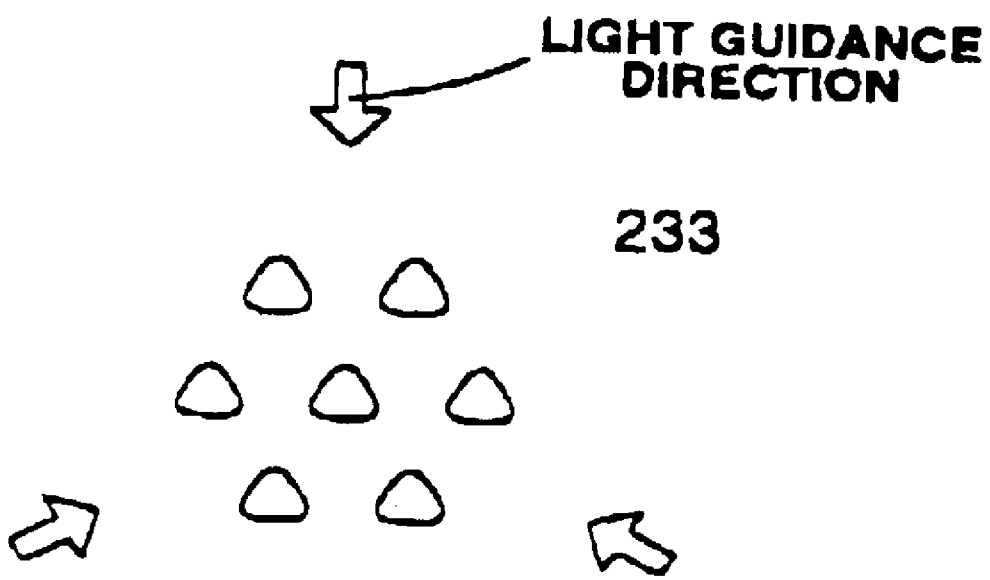
FIG. 13 is a diagram showing yet a further modification.

Also, the projections (projecting shapes) constituting the optical extraction structures capable of being applied in the present invention are not necessarily restricted to those described above. The deformed pillar-shaped projections for example shown in FIGS. 12A, 12B and FIG. 13 could be formed as a replacement for these. In the case of FIG. 12A, elliptical pillar-shaped projections 232 are arranged in two-dimensional fashion on light-guide plate 11; for a fluorescent tube 233 employed as a linear light source, optical output efficiency can be raised by arranging the direction of the major axis of the ellipse perpendicular to the light-guide direction (line joining the light source and the shortest distance of the projection). Also in the case of FIG. 12B, in which elliptical pillar-shaped projections 232 are arranged two-dimensionally on light-guide plate 11, optical output efficiency can likewise be raised by, for an LED employed as point light source, arranging the major axial direction of the ellipse perpendicular to the light-guide direction (line joining the light source and the shortest distance of the projection). Also, in the construction shown in FIG. 13, rounded-triangle pillar-shaped projections 233 are likewise arranged in two-dimensional fashion on the light-guide plate. In this case, depending on the number and direction of the light sources, it is desirable to arrange arcs of the projections which have largest radius perpendicular to the light-guide direction, as optical output efficiency can thereby be raised.

Fourth Embodiment

Figure 14A:
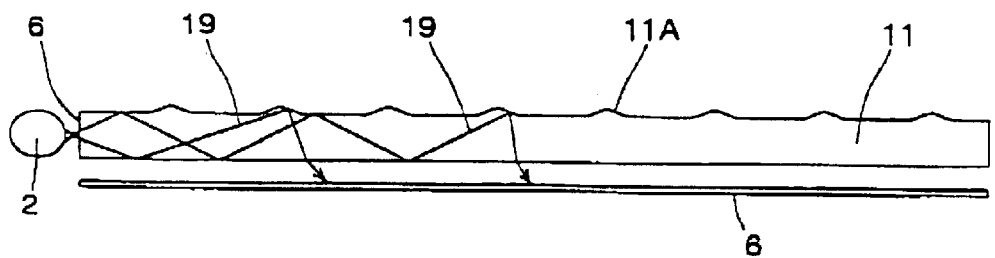
FIG. 14A and FIG. 14B are a diagrammatic cross-sectional view and perspective view showing a fourth embodiment of the present invention.
Figure 14B:
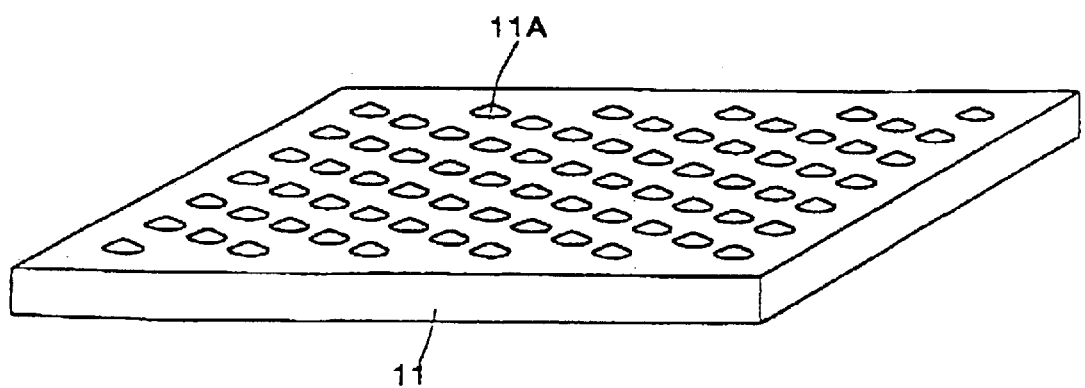
Figure 15:
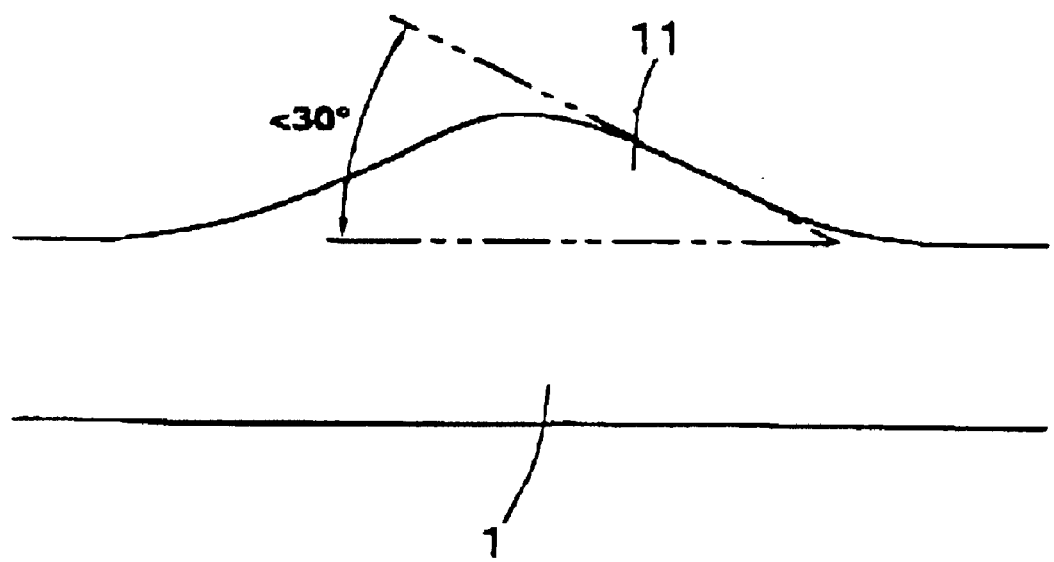
FIG. 15 is a detail diagram of a convex shape constituting a structural element for extraction of light.

A fourth embodiment of the present invention is described with reference to the drawings. In FIG. 14A, a light source 2 is arranged at the end face of light-guide plate 11. As shown in FIG. 14B, light-guide plate 11 is provided with convex shapes 11A on one face of the transparent plate; the surfaces of convex shapes 11A are constituted by faces making an angle of less than about 30° with respect to the plane parallel to light-guide plate 11. Light-guide plate 11 is formed of transparent material of refractive index at least 1.4; if for example the refractive index is 1.4, the critical angle is 45°, and all the light rays input from end face 16 can be optically guided through light-guide plate 11. Specifically, as shown by light ray 19$a$ or light ray 19$b$, the optical flux from light source 2, when input from end face 16, has a vector of less than about 45° with respect to the plane parallel to light-guide plate 11 and so undergoes repeated total reflection within light-guide plate 11. When in due course these reach convex shapes 11A, light rays that have been reflected at the faces of convex shapes 11A make a fairly large angle, greater than about 45°, with the plane parallel to light-guide plate 11 and can therefore be output from light-guide plate 11. A large amount of light is therefore output from the back face of the illuminating device and illuminated body 9 can be effectively illuminated. As shown in FIG. 15, the faces of convex shapes 11A are constituted by faces of angle less than about 30° with respect to the plane parallel to light-guide plate 11. Since most of the components of the rays travelling through light-guide plate 11 are of angle less than 20° with respect to the plane parallel to light-guide plate 11, most of the rays being guided through light-guide plate 11 arrive at the faces of convex shapes 11A at more than the critical angle, so the reflected light can be output from another face of light-guide plate 11.

Figure 16A:
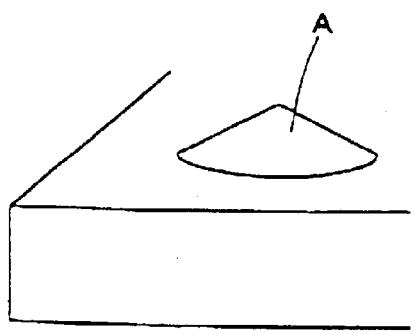
FIGS. 16A to 16D are diagrams of further convex shapes.
Figure 16B:
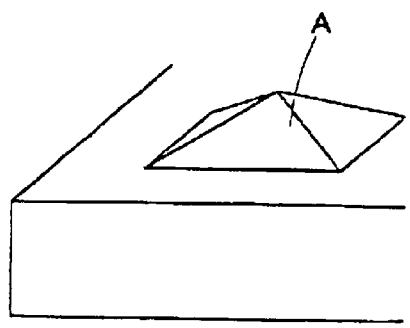
Figure 16C:
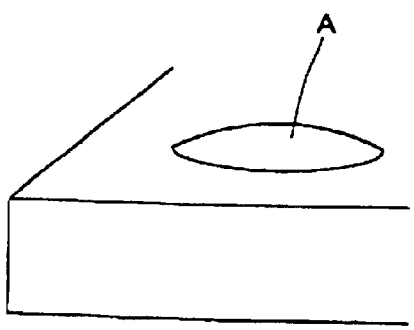
Figure 16D:
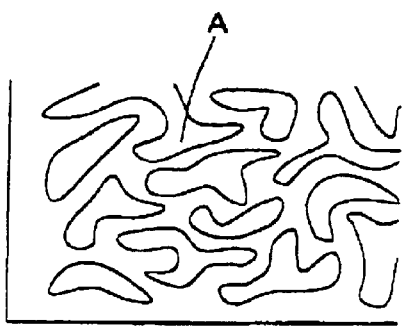

FIG. 16A shows an example in which the convex shape is a conical face (convex shape 11Aa); FIG. 16B shows an example in which it is a pyramidal shape (convex shape 11Ab): FIG. 16C shows an example in which it is a spherical surface (convex shape 11Ac); and FIG. 16D shows an example in which it is an irregularly shaped face (convex shape 11Ad). As described above, the shape can be freely chosen so long as the faces have an angle of under about 30° with respect to the plane parallel to light-guide plate 11 but conical faces as shown in FIG. 16A or a shape based on this are advantageous since the angle of the surface can be fixed and directionality of the surface direction is eliminated.

Figure 17:
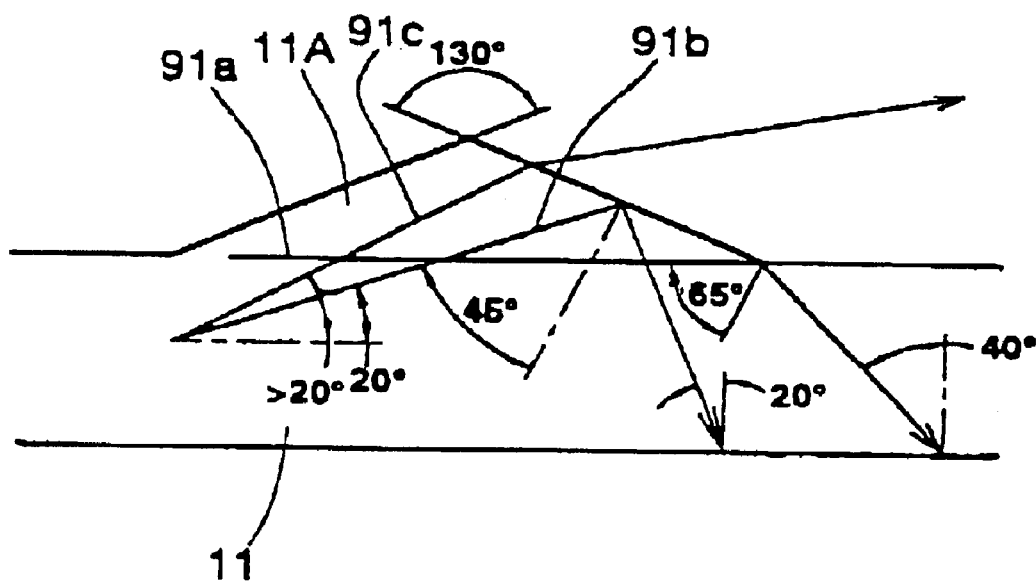
FIG. 17 is a diagram of a further convex shape.

FIG. 17 shows an example in which the convex shapes are conical surfaces of apex angle about 130°. When a ray 91$a$ parallel to light-guide plate 11 is reflected at the conical face, it makes an angle of 40° with respect to the normal of light-guide plate 11 and is output. Ray 91$b$ making an angle of 20° makes an angle of 45° with the conical face and so is reflected; the reflected ray then makes an angle of 20° with the normal of light-guide plate 11 and so can be output. Ray 91$c$ of angle more than 20° can be output from the conical face, but such components represent only a small proportion of the whole, so, by choosing an apex angle of about 130°, effective utilisation as illumination is possible.

For the transparent material forming light-guide plate 11, transparent resin such as acrylic resin, polycarbonate resin, or amorphous polyolefin resin, inorganic transparent material such as glass or a composite of these can be employed and these could be formed by a method such as joining a film or resin layer to an injection moulding, heat setting resin, photosetting resin, etching, or transparent resin or a flat glass plate. As light source 2, a fluorescent tube, electric light bulb, or light-emitting diode (LED) etc. could be employed. Fluorescent tubes have the advantages that high illuminance can be expected at low power and white light can easily be obtained. LEDs have a semi-permanent life and the circuitry is simple since they can be driven at low voltage and they have a high degree of safety in regard to catching fire or causing electric shock etc. Regarding colour, apart from red, green and blue, they have recently become available in mixed colours and/or white, so, depending on the application, they can be widely used. Electric light bulbs have the drawback of short life but they are cheap and have the possibility of being easily replaced.

These convex shapes 11A can be provided in any desired area ratio with respect to the area of the illumination unit. However, although increasing the area ratio of convex shapes 11A enables the efficiency of illumination to be raised, since the ratio of perpendicularly transmitted rays is decreased, it lowers recognisability. In fact, setting an area ratio of above 50% is impracticable and setting an area ratio of about 10% is suitable for part-time illumination under dark conditions. Also, in the case where density is varied in order to achieve uniformity of illuminance as described above, if the ratio is about 10%, the area ratio of perpendicular transmission regions will lie in a range of about 80–90% so unevenness of recognisability depending on position is not experienced.

Figure 18:
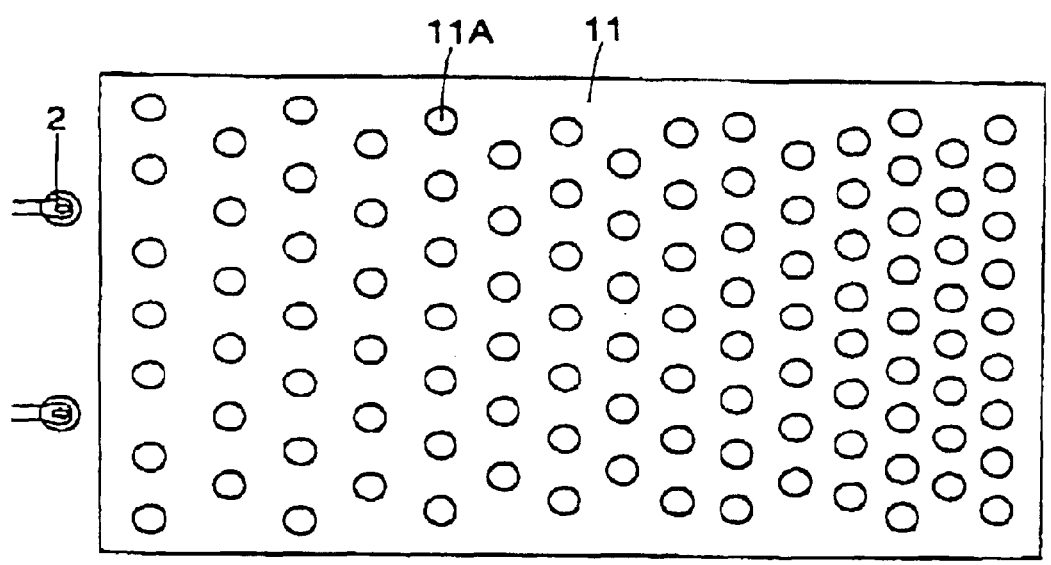
FIG. 18 is a diagrammatic plan view of a further modification of the fourth embodiment.

Regarding the size of convex shapes 11A, since the wavelength of visible light is from about 380 nm to 700 nm, the size should be at least about 5 $\mu$m if effects due to diffraction are not to occur and also should desirably be below about 300 $\mu$m in order that convex shapes 11 should not be noticeable to the naked eye. In addition to the above, from the point of view of convenience in manufacture, the size of convex shapes 11 is preferably more than about 10 $\mu$m and less than 100 $\mu$m. By means of the above construction, part-time illumination can be achieved in which with the present illumination device arranged at the front face of an illuminated body 6, illuminated body 6 can be observed with illumination extinguished when the external light is sufficiently bright and illuminated body 6 can be observed with illumination turned on under dark conditions when the external light is insufficient. Examples of such an illuminated body 6 to which an illumination device as above can be applied include printed material such as printed paper or liquid crystal displays etc. The modified example shown in FIG. 18 is an example in which convex shapes as described above (the case where these are conical shapes is shown in FIG. 18) are distributed sparsely in the vicinity of light sources 2 but more densely as the distance prom point light sources 2 increases. The optical flux density in light-guide plate 11 is high in the neighbourhood of light sources 2, but the optical flux density falls with distance going away from light sources 2 due to diffusion of the rays by convex shapes 11A, so convex shapes 11A are arranged more densely in continuous manner. Uniform illumination can thereby be achieved.

Figure 19:
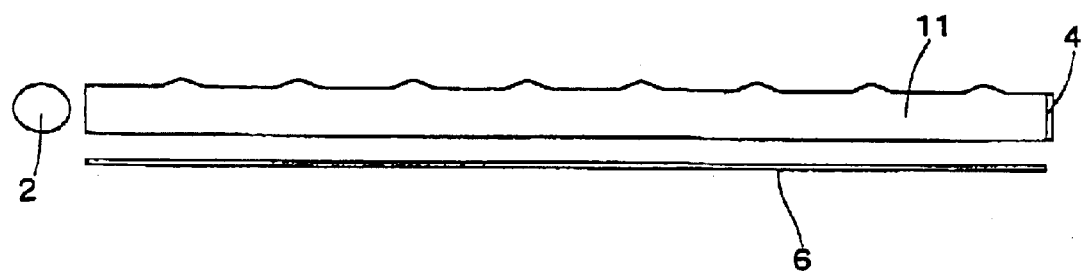
FIG. 19 is a diagrammatic cross-sectional view of a further modification of the fourth embodiment.

In the further modification shown in FIG. 19, reflecting member 4 is provided on faces, of the end faces of light-guide plate 11, other than the face where light sources 2 are arranged. This performs the action of returning once more into light-guide plate 11 rays that have been guided through light-guide plate 11 and have reached the end face.

Efficiency can thereby be improved. As reflecting member 4, a sheet or plate etc. having a white colour and/or a metallic lustre face is employed.

Figure 20:
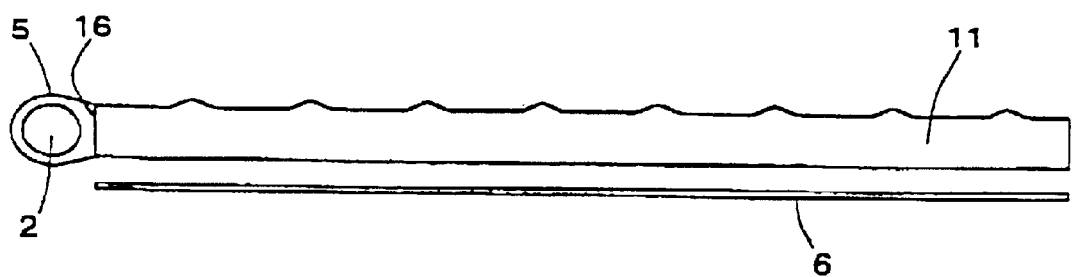
FIG. 20 is a diagrammatic cross-sectional view of a further modification of the fourth embodiment.

The modified example shown in FIG. 20 is an example in which a reflecting member 5 is arranged so as to cover end face 16 of light-guide plate 11 and light source 2. Rays from light source 2 can be directed effectively into end face 16, thereby contributing to improving illuminance and improving efficiency.

Figure 21:
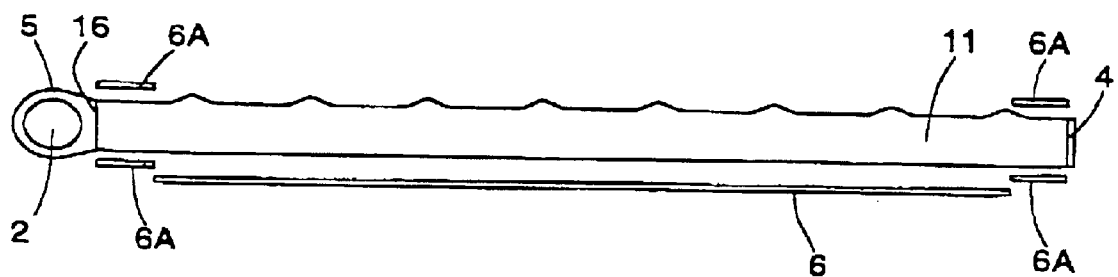
FIG. 21 is a diagrammatic cross-sectional view of a further modification of the fourth embodiment.

The modification shown in FIG. 21 is an example in which an optical absorbing member 6A is arranged at the periphery outside the range of illumination of light-guide plate 11. It would be possible to use for example double-sided tape or adhesive etc. at the junction of the reflecting member and light-guide plate as described above, but diffuse reflection due to micro particles or gas bubbles etc. within the adhesive layer might then allow rays other than the desired rays to escape from the light-guide plate. Optical absorbing members 6A have the function of absorbing such rays outside the range of illumination and making the illumination uniform.

Figure 22:
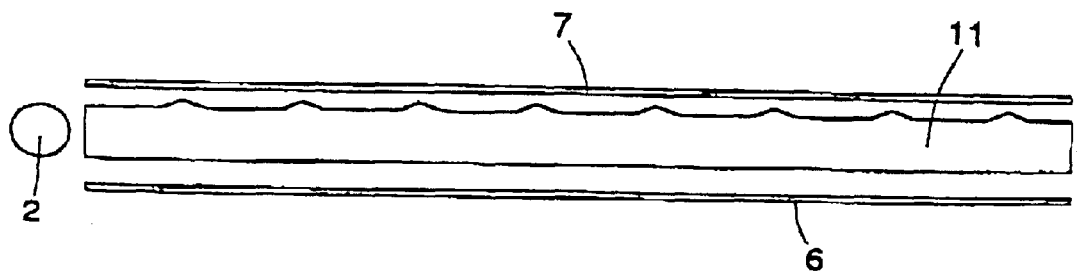
FIG. 22 is a diagrammatic cross-sectional view of a further modification of the fourth embodiment.

In the modification shown in FIG. 22, a transparent plate or transparent sheet 7 is arranged on the observer side of light-guide plate 11. Light-guide plate 11 and the transparent plate or transparent sheet are not stuck together and an air layer is present, so if there is even slight damage to the surface of light-guide plate 11, light rays guided through its interior are reflected thereat and the damage can be recognised as a bright point or bright line from the surface. Not only is this unattractive in transparent type illumination but it also severely lowers recognisability due to loss of contrast etc. However, due to the provision of an air layer between the transparent plate or transparent sheet 7 and light-guide plate 11, there is no possibility of optical flux from light-guide 2 entering, so even if damage occurs thereto, it cannot result in the appearance of bright points or bright lines. Also in this case, since the relative area of any damage is slight, it can have very little effect on recognisability in regard to illuminated object 6. Since this light-guide plate 11 is employed as illumination arranged at the front, the presence of such a transparent plate or transparent sheet 7 is indispensable. As the transparent plate or transparent sheet 7, transparent resin such as acrylic resin, polycarbonate resin or amorphous polyolefin resin, or inorganic transparent material such as glass may be employed.

Fifth Embodiment

Figure 23A:
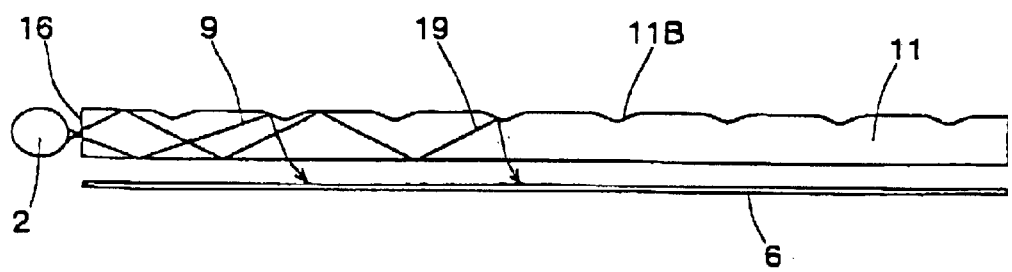
FIG. 23A and FIG. 23B are a diagrammatic cross-sectional view and perspective view of a fifth embodiment of the present invention.
Figure 23B:
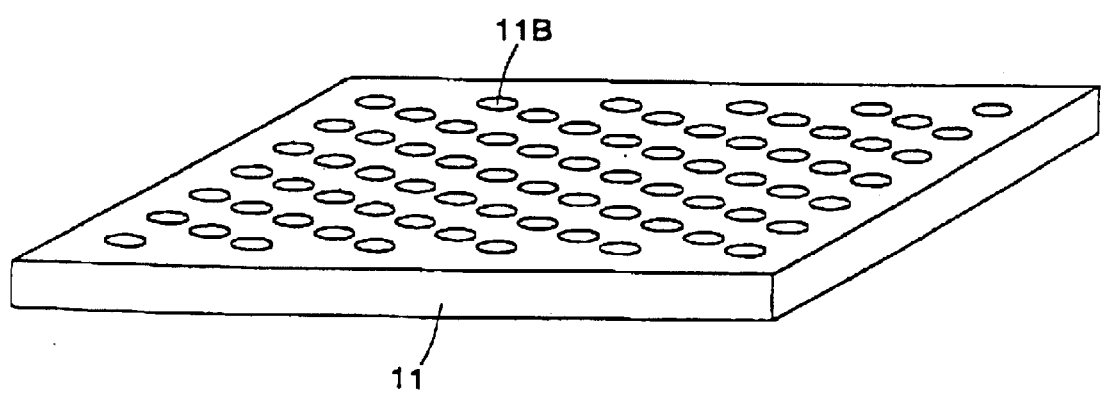

A fifth embodiment of the present invention is described with reference to the drawings. In FIG. 23A, a light source 2 is arranged at the end face of light-guide plate 11. As shown in FIG. 23B, light-guide plate 11 is provided with concave shapes 11B on one face of the transparent plate, the faces of concave shapes 11B in all cases being constituted of surfaces making an angle of less than about 30° with respect to the plane parallel to light-guide plate 11. Light-guide plate 11 is formed of transparent material of refractive index of about 1.4 or more; if for example the refractive index is 1.4, the critical angle is 45°, so rays input from end face 16 can all be guided through light-guide plate 11. Specifically, when optical flux from light source 2 is input from end face 16 as shown by ray 19a or ray 19b, it has a vector of less than about 45° with respect to the plane parallel to light-guide plate 11 and so undergoes repeated reflection within light-guide plate 11. When in due course it reaches a concave shape 11B, a ray reflected at the faces of concave shape 11B will have a much larger angle exceeding about 45° with respect to the plane parallel to the light-guide plate 11 and can therefore be output from light-guide plate 11. Considerable optical output is therefore obtained from the back face of the illumination device and illuminated object 6 can be effectively illuminated.

Figure 24:
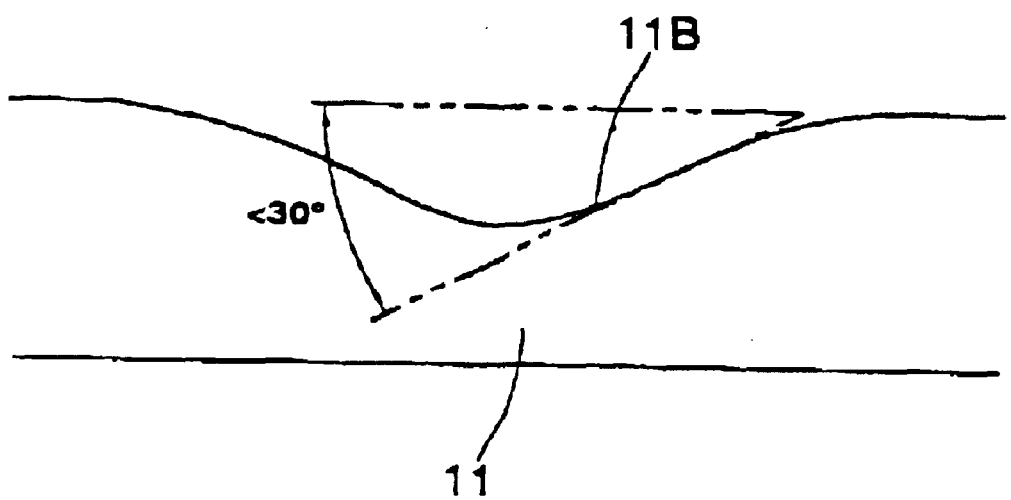
FIG. 24 is a detail diagram of a concave shape constituting a structural element for an extraction of light.

As shown in FIG. 24, the faces of concave shapes 11B are constituted by faces having an angle of less than about 30° with respect to the plane parallel to light-guide plate 11. Since most of the components of the rays travelling through light-guide plate 11 have angles under about 20° with respect to the plane parallel to light-guide plate 11, most of the rays guided through light-guide plate 11 reach the surfaces of concave shapes 11B at above the critical angle, and so this reflected light can be output from another face of light-guide plate 11.

Figure 25A:
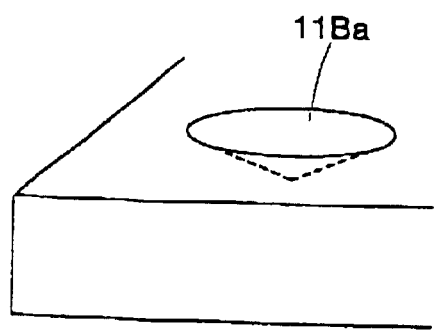
FIGS. 25A to 25D are diagrams of a further concave shape.
Figure 25B:
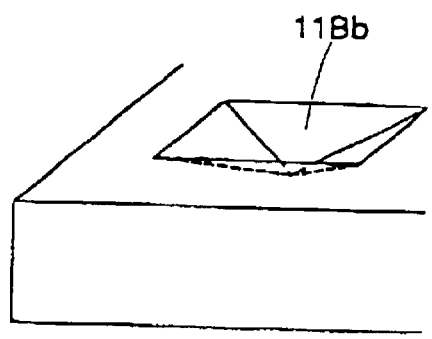
Figure 25C:
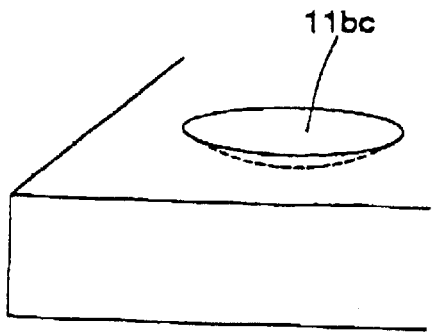
Figure 25D:
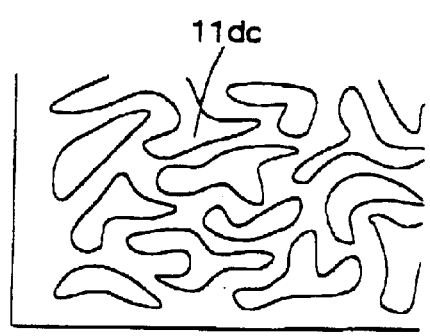

FIG. 25A shows an example in which the concave shapes are conical surfaces (concave shapes 11Ba); FIG. 25B shows an example in which they are pyramidal surfaces (concave shapes 11Bb); FIG. 25C shows an example in which they are spherical surfaces (concave shapes 11Bc); and FIG. 25D shows an example in which they are irregular-shaped surfaces (concave shapes 11Bd). So long as the angle which these faces make is below about 30° with respect to the plane parallel to light-guide plate 11 as above their shape can be freely selected but a conical surface as shown in FIG. 25A or surface of a shape based on this is advantageous since the angle can be fixed and directionality is eliminated.

Figure 26:
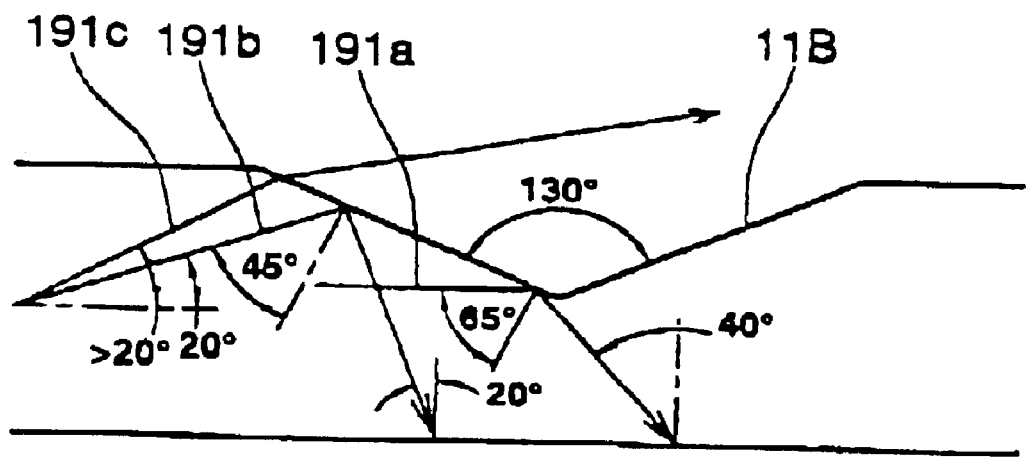
FIG. 26 is a diagram of a further concave shape.

FIG. 26 shows an example in which the concave shape is a conical surface of apex angle 130°. When a ray 191a parallel to light-guide plate 11 is reflected at the conical surface, it intersects the normal of light-guide plate 11 at 40° and so is output. Ray 191b making an angle of 20° intersects the conical face at 45° and so is reflected; this reflected light intersects the normal of light-guide plate 111 at 20° and so can be output. Ray 191c of angle exceeding 20° is output from the conical surface, but since such components represent only a small proportion of the whole, effective utilisation as illumination can be achieved by the choice of an apex angle of about 130°.

Details concerning the density and size of the concave shapes are in accordance with the description given for the case of the convex shapes above, without change.

Provision of concave shapes on the light-guide plate in this way has the characteristic feature that, in comparison with convex shapes as described above, these shapes do not affect the thickness.

They are therefore suitable for constructing a notice board device having, as a whole, an illumination function in which a notice is used as the illuminated object, enabling a notice board device of extremely small thickness to be provided.

Sixth Embodiment

Figure 27:
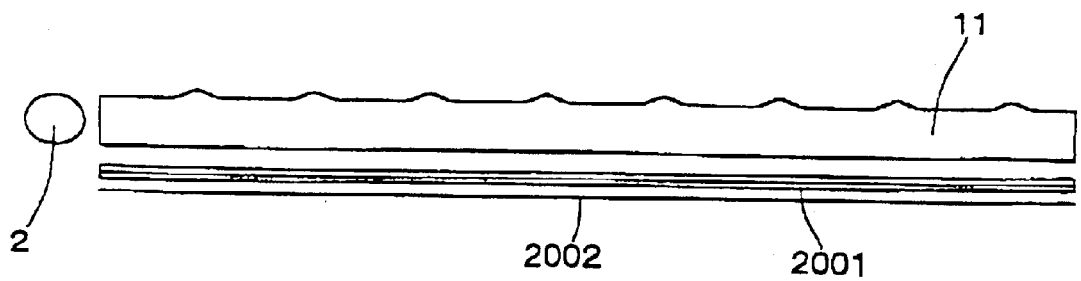
FIG. 27 is a diagrammatic cross-sectional view showing a sixth embodiment of the present invention.

FIG. 27 shows an example in which a liquid crystal display panel is employed for the illuminated body. Light-guide plate 11 is arranged at the front face of liquid crystal display panel 2001. A reflective type liquid crystal display device is constituted by arranging a reflecting plate 2002 at the back face of liquid crystal display panel 2001. Light-guide plate 11 has the function of directing rays of light towards liquid crystal display panel 2001 and of transmitting practically all of the rays reflected by reflecting plate 2002 without dispersion. This is effective when, if there is sufficient external light, it is used with light source 2 extinguished, as, in this case, light-guide plate 11 functions simply as a transparent plate and so does not lower recognisability and has no effect on display quality. Also, when it is turned on for use in dark locations where external light is insufficient, light-guide plate 11 illuminates liquid crystal display panel 2001 and the light reflected by reflecting plate 2002 is transmitted straight through with light-guide plate 11 functioning simply as a transparent plate in the same way as described above when extinguished, so this is effective in maintaining high recognisability.

Also, whereas, in the case of a transparent type liquid crystal display device in which the illumination device was arranged at the back face of the liquid crystal display panel, the bright/dark contrast was generated by the passage of rays from the illumination device once only through the liquid crystal display panel, with the present reflective type liquid crystal display device, in which the illumination device is arranged at the front face of the liquid crystal display panel, since rays of light from the illumination device pass through one more time by being reflected by the reflecting plate after they have first passed through the liquid crystal display panel, higher contrast is obtained; which is effective in achieving higher recognisability.

Figure 28:
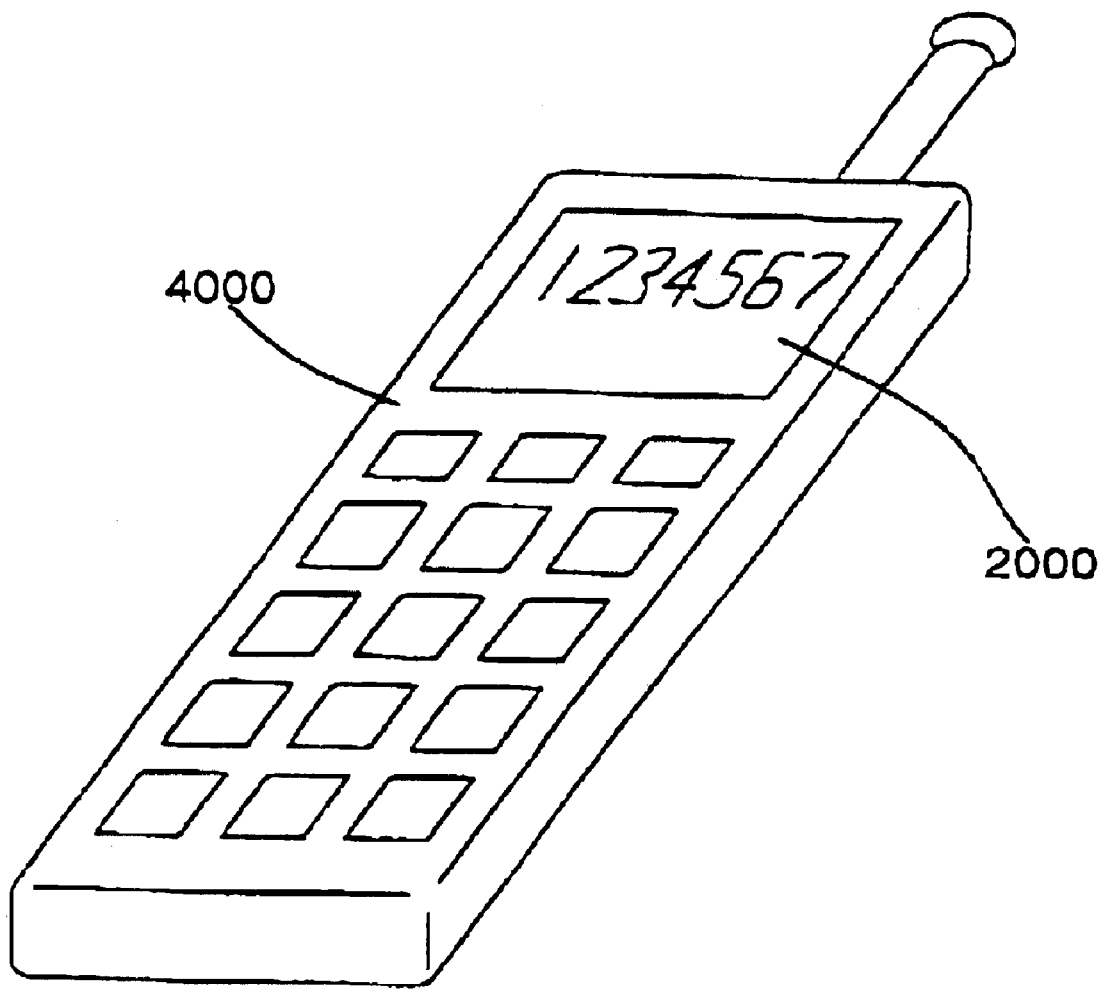
FIG. 28 is a diagrammatic perspective view of a device illustrating an example of application.

FIG. 28 shows an example in which a liquid crystal display device according to the present invention is employed in an electronic device such as a mobile telephone. The display section of mobile telephone 4000 has a display 2000 as described above. In particular this is beneficial in achieving power saving in portable electronic devices. As described above, small-thickness surface illumination can be provided suited for example to notice boards or liquid crystal displays that make use of external light. Also, a liquid crystal display device can be provided wherein, in applications such as portable electronic computer terminals, there is no loss of display quality even when used with illumination extinguished for power saving purposes in well lit locations and which is of high contrast when the illumination is turned on, with lower power consumption using a fluorescent tube, LEDs or electric light bulbs etc.

Seventh Embodiment

Figure 29A:
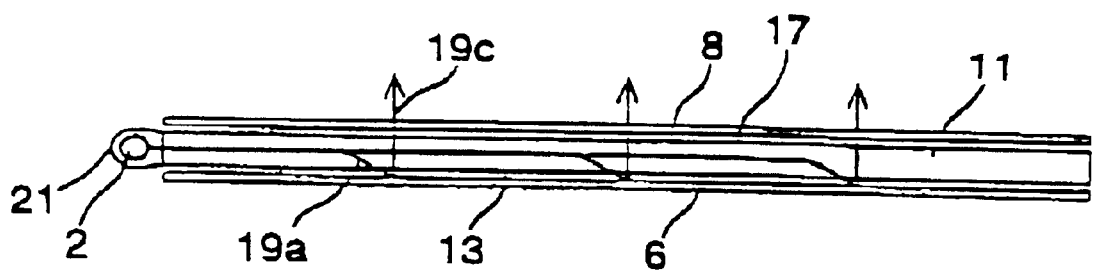
FIG. 29A and FIG. 29B are diagrammatic cross-sectional views showing a seventh embodiment of the present invention.

A seventh embodiment of the present invention is described with reference to the drawings. In FIG. 29A, light-guide plate 11 has a function of emitting optical flux from light source 2 arranged at an end face chiefly in the direction of one face i.e. optical output face 13 as illumination light 19a, and a function of transmitting rays 19c intersecting the planar direction of light-guide plate 111 practically without dispersion. A reflector 21 is arranged at the periphery of light source 2 to perform the function of guiding rays from light source 2 efficiently in the direction of light-guide plate 11. Illuminated body 6 is arranged adjacent to the optical output face 13 of light-guide plate 11 and transparent plate 8 is arranged adjacent to face 17 which is opposite the optical output face. By this means, when there is sufficient external light, it can be used with light source 2 extinguished; in this case, light-guide plate 11 functions simply as a transparent plate. And when external light is insufficient, illuminated object 6 can be illuminated by turning on light source 2.

Figure 29B:
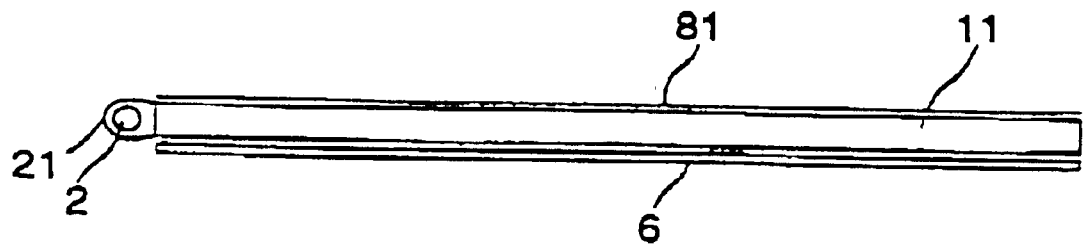

In FIG. 29B, transparent plate 8 is replaced by a transparent film 81.

Printed matter such as printed paper or liquid crystal display etc. could be employed as illuminated body 6 of an illumination device as described above.

Figure 30A:
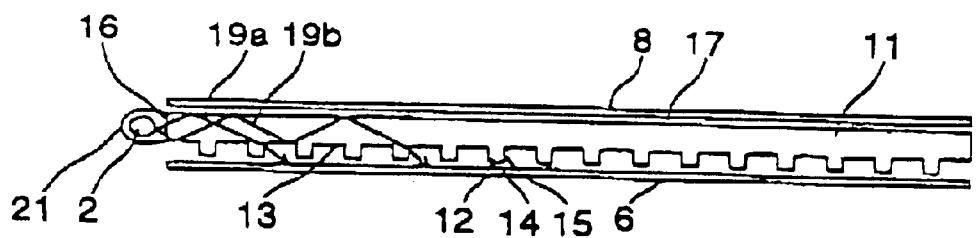
FIG. 30A and FIG. 30B are a diagrammatic cross-sectional view and perspective view showing a seventh embodiment.
Figure 30B:
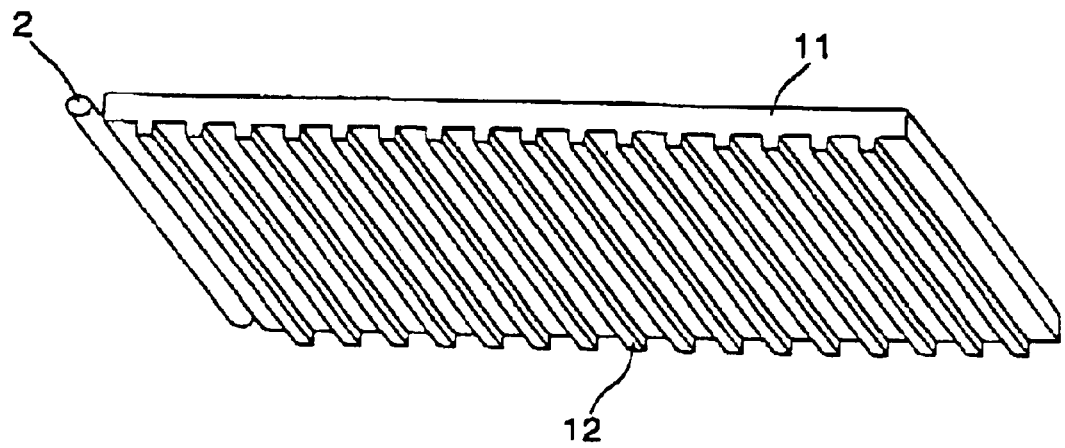

FIG. 30A shows an embodiment for implementing an illumination device using such a light-guide plate 11. A light source 2 is arranged at at least one end face of light-guide plate 11. As shown in FIG. 30B, light-guide plate 11 is provided on one face of the transparent plate with rib-shaped projections 12 generally parallel to light source 2, all of the faces of projections 12 being constituted solely by faces that are approximately parallel to optical output plane 13 (bottom face 14) and faces that are approximately perpendicular thereto (side face 15). Light-guide plate 11 is formed of transparent material of refractive index about 1.4 or more. After the optical flux from light source 2 is input from end face 16 as shown by ray 19a or ray 19b, it undergoes total reflection within light-guide plate 11 and exits solely from side face 15 of projections 12, so the optical output from the back face of the illumination device is large and illuminated body 6 is effectively illuminated.

Also, for the transparent material forming light-guide plate 11, transparent resin such as acrylic resin, polycarbonate resin, or amorphous polyolefin resin, inorganic transparent material such as glass, or a composite of these may be employed; it is formed by a method such as joining a film on to an extrusion moulding, heat setting resin, photosetting resin, etching, transparent resin or flat glass plate.

A reflector 21 is arranged at the periphery of light source 2 and performs the function of effectively guiding rays from light source 2 into light-guide plate 11. For reflector 21 a resin film or resin moulding is chiefly employed; colouring or aluminium and/or silver evaporated film is applied to a white colour. These are of high ray reflectivity and are effective for improving the efficiency of the power/illuminance ratio. A transparent plate 8 is arranged on the face 17 opposite the optical output face of light-guide plate 11. There is no adhesion between light-guide plate 11 and transparent plate 8 and an air layer is present. If there were even slight damage to the surface of light-guide plate 11, the rays guided through the interior thereof would be reflected thereat and this would be recognisable as a bright point or bright line from the surface. Not only would such damage be unattractive as illumination of the transparent type, but also recognisability would be severely lowered due to the lowered contrast. However, thanks to the interposition of an air layer between transparent plate 8 and light-guide plate 11, there is no possibility of optical flux from light source 2 entering, so that even if it is subjected to damage bright points or bright lines cannot appear. Also in this case, since the relative area of any damage is very slight, the effect in terms of recognisability on illuminated body 6 is extremely small. In order to employ this light-guide plate 11 as illumination placed at the front face, the presence of such a transparent plate 8 is indispensable. For transparent plate 8, transparent resin such as acrylic resin, polycarbonate resin, or amorphous polyolefin resin, or inorganic transparent material such as glass may be employed.

Figure 31:
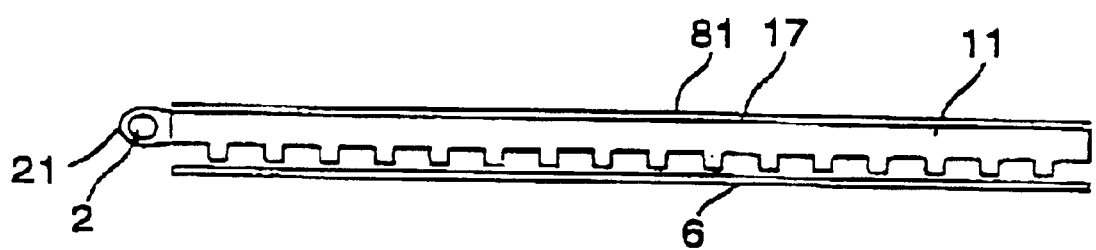
FIG. 31 is a diagrammatic cross-sectional view of a modification of the seventh embodiment.

In the modification shown in FIG. 31, a transparent film 81 is arranged on face 17 opposite to the optical output face of light-guide plate 11. As in the case of transparent plate 8 described above, light-guide plate 11 and transparent film 81 are not stuck together but have an air layer interposed between them. As transparent film 81, a transparent resin film of for example polyester, polycarbonate, polypropylene or acetate etc. could be employed.

Figure 32A:
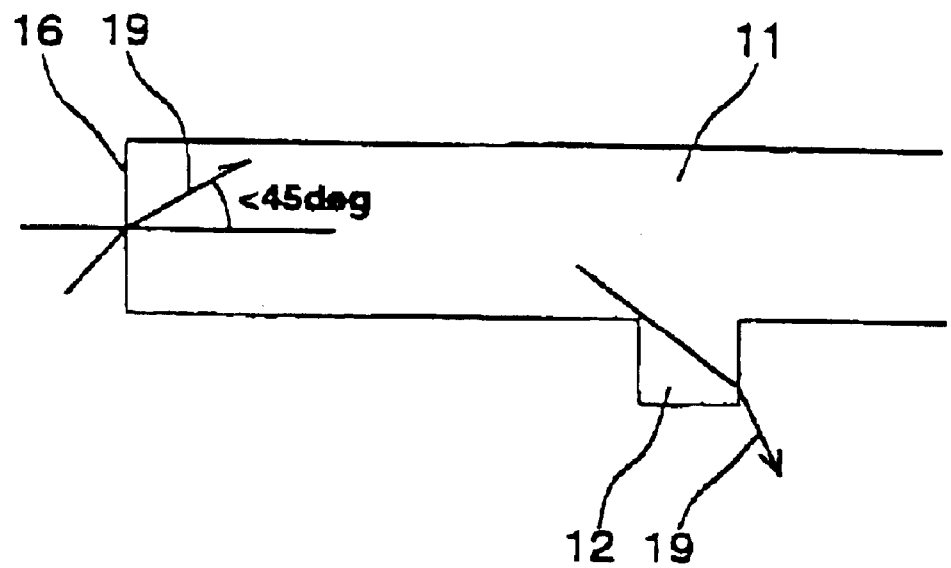
FIG. 32A and FIG. 32B are diagrammatic cross-sectional views of a modification of the seventh embodiment.
Figure 32B:
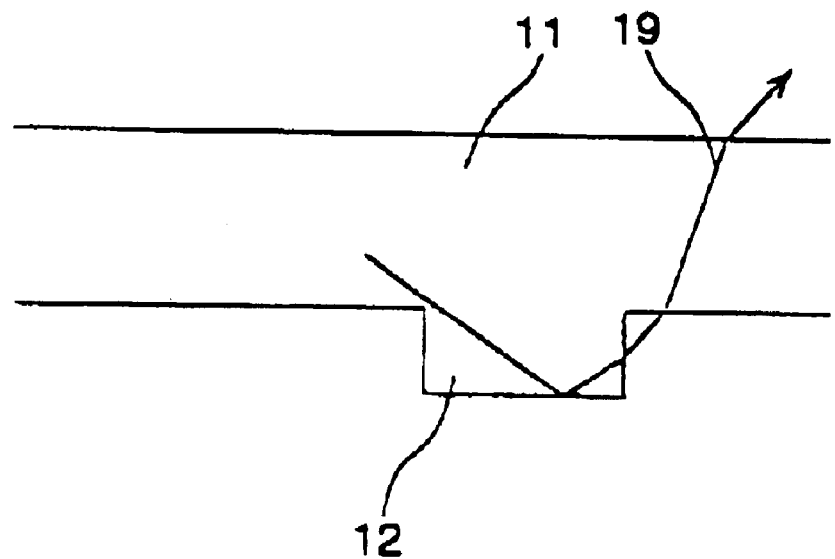

A ray 19 input from end face 16 as shown in FIG. 32A has an optic axis of less than 45° due to refraction with respect to the axis of the longest-side direction of light-guide plate 11, so it must have a height of more than the width of projection 12 in order to be incident on the side face of projection 12. If it is less than this, ray 19 is output at the upper face of light-guide plate 11 by the path shown in FIG. 32B and severely lowers recognisability. However if, [the ratio] is much greater than one-to-one, not only is this pointless from the point of view of the optics but it also gives rise to the problem of making manufacture difficult. Also, viewing this illumination device from an inclined direction is a factor lowering recognisability. Because of the above, it is desirable that the ratio of the width and height of projections 12 should be just about one-to-one.

Regarding the magnitude of the width and height of projections 12, since the wavelength of visible light is about 380 nm to 700 nm, in order to avoid spectral fringe patterns due to interference caused by diffraction, these must be at least about 5 µm, and, since the size of the pixels of the liquid crystal display panel is 200 µm to 300 µm, should be less than 100 µm in order to prevent occurrence of fringe patterns due to interference with these pixels. In addition to the above, it is desirable from the point of view of convenience in manufacture that the size of projections 12 should be above about 10 µm and less than 50 µm.

Uniformity of illumination brightness can be improved by regulating the density of projections 12 on light-guide plate 11. In fact, projections 12 are arranged sparsely in the vicinity of light source 2 and arranged more densely in continuous manner going further away from it. In this case, the method of keeping the size of projections 12 fixed and altering the density, the method of keeping the density fixed and altering the size, or the method of altering both of these could be adopted; however, in practical processing, the method of keeping the size of projections 12 fixed and varying the density is easy and advantageous.

Eighth Embodiment

Figure 33A:
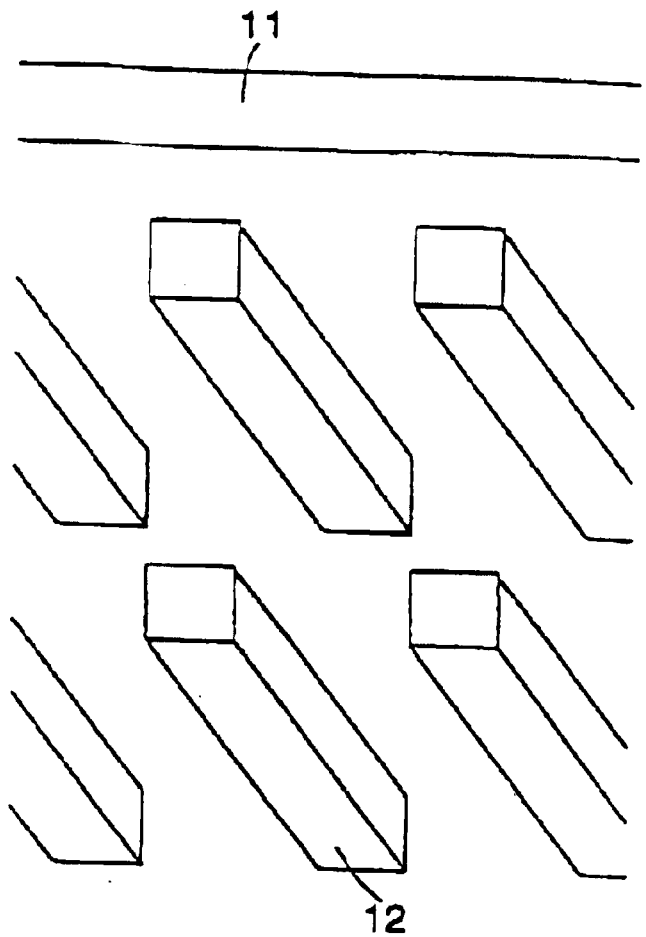
FIG. 33A and FIG. 33B are diagrammatic perspective views showing an eighth embodiment of the present invention.
Figure 33B:
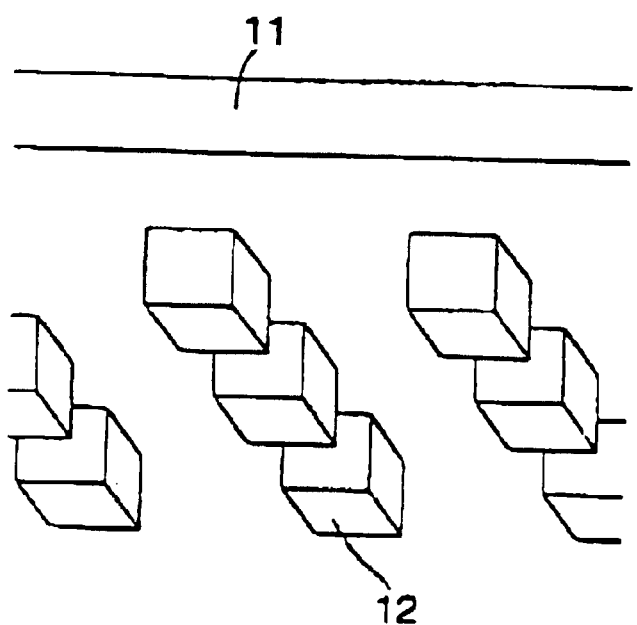

An eighth embodiment of the present invention is shown in FIG. 33A. If projections 12 are formed in prismatic shape, the same benefit as in the case of ribs is obtained. Since, at the side faces of projections 12 that are perpendicular to the light source 2, the rays are incident at more than the critical angle, they are totally reflected and have no relationship at all to the optical output. If, as shown in FIG. 33B, a prism is formed having a bottom face of square shape on a light-guide plate 11 of approximately rectangular shape, light sources 2 are arranged on two adjacent sides and rays incoming from the two sides can be delivered as optical output from each side face of projections 12.

Figure 34A:
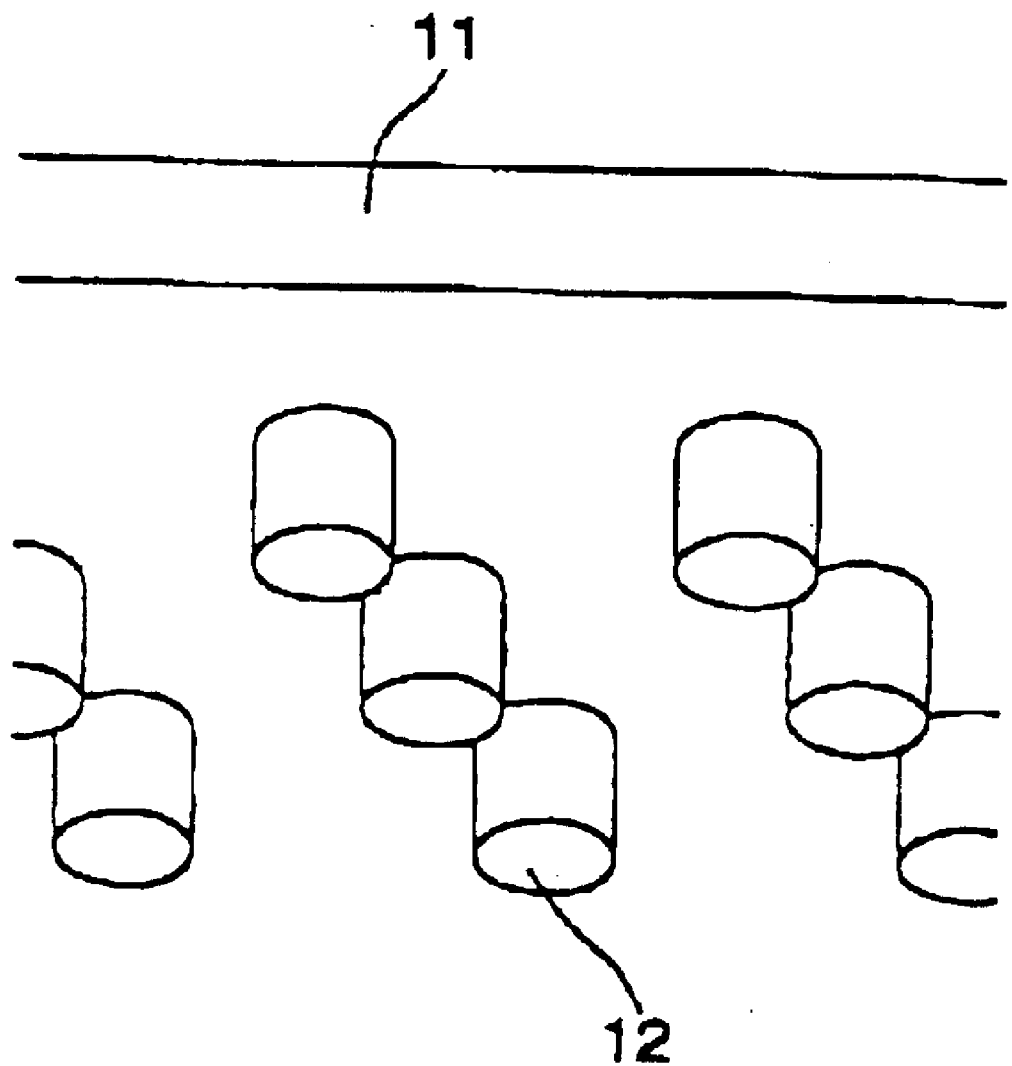
FIG. 34A is a diagrammatic perspective view of a modification of the eighth embodiment.
Figure 34B:
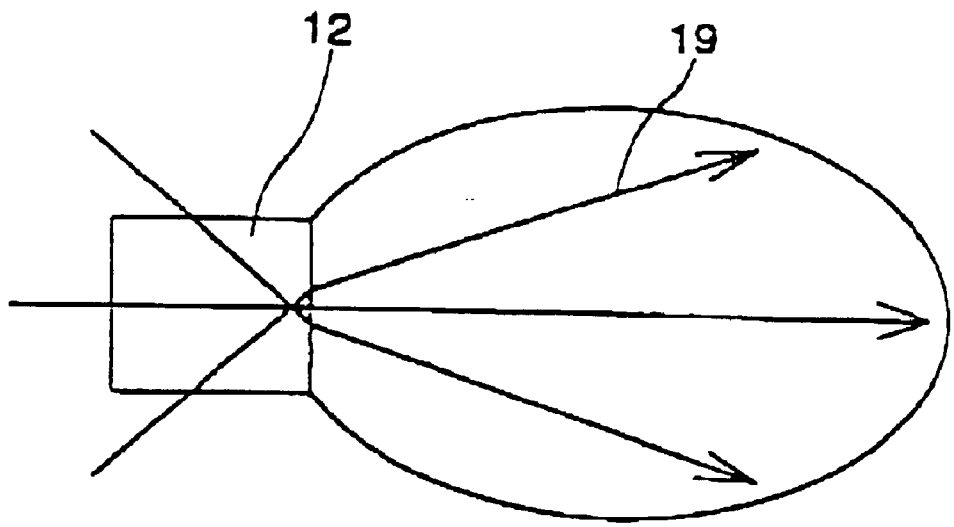
FIG. 34B and FIG. 34C are diagrams of a modification of the eighth embodiment.
Figure 34C:
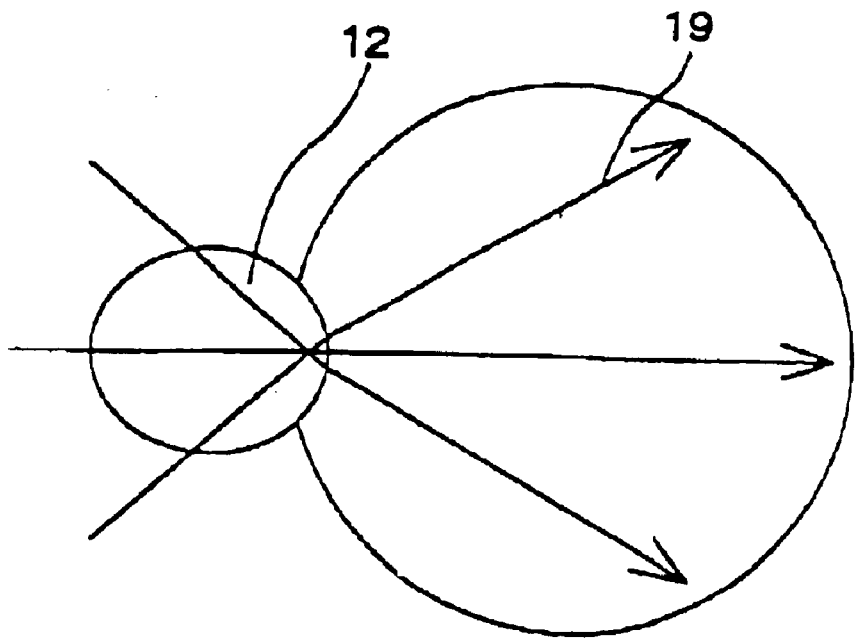

As another embodiment, a case where projections 12 are formed in the form of cylinders is shown in FIG. 34A. Rays 19 that are incident at below the critical angle on to the cylindrical face of projections 12 are delivered as optical output while rays that are incident at above the critical angle are repeatedly reflected by the cylindrical surfaces and then inverted at the bottom faces of projections 12, then further repeatedly reflected at the cylindrical surfaces and again follow a path advancing through the light-guide plate. The range of illumination achieved by rays 19 output from the cylindrical surface can thereby be widened as shown in FIG. 34C in comparison with the case where a prism is adopted as shown in FIG. 34B.

Ninth Embodiment

Figure 35:
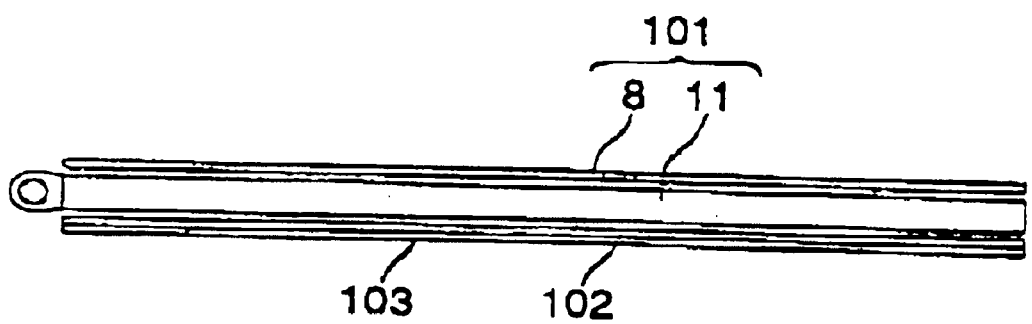
FIG. 35 is a diagrammatic cross-sectional view showing a ninth embodiment of the present invention.

A ninth embodiment in which a liquid crystal display panel is employed as the illuminated body is shown in FIG. 35A. Illumination device 101 is arranged at the front face of liquid crystal display panel 102. A reflective type liquid crystal display device is constituted by arranging a reflecting plate 103 at the back face of liquid crystal display panel 102. Illumination device 101 has the function that it directs rays on to liquid crystal display panel 102 and transmits rays reflected by reflective plate 103 with scarcely any dispersion. This is employed when external light is sufficient and illumination device 101 is extinguished; in this case, illumination device 101 acts simply as a transparent plate and so does not impair recognisability and is effective in that display quality is not affected. Also when used with the illumination lit in dark locations where there is insufficient external light, illumination device 101 illuminates liquid crystal display panel 102 and, with illumination device 101 functioning simply as a transparent plate in the same way as in the case described above where illumination was extinguished, reflected light originating from reflecting plate 103 is directly transmitted, thereby conferring the benefit that high recognisability is maintained.

Also, in comparison with a transmission type liquid crystal display device in which the illumination device is arranged at the back face of the liquid crystal display panel and light/dark contrast is produced by rays from the illumination device passing through the liquid crystal display panel once only, with the reflective type liquid crystal display device wherein, as in the present invention, the illumination device is arranged at the front face of the liquid crystal display panel, there is the benefit in terms of obtaining high recognisability that contrast is further increased owing to the fact that rays of light from the illumination device pass through the liquid crystal display panel a further time by reflection by the reflecting plate after they have passed through the liquid crystal display panel once.

Figure 36:
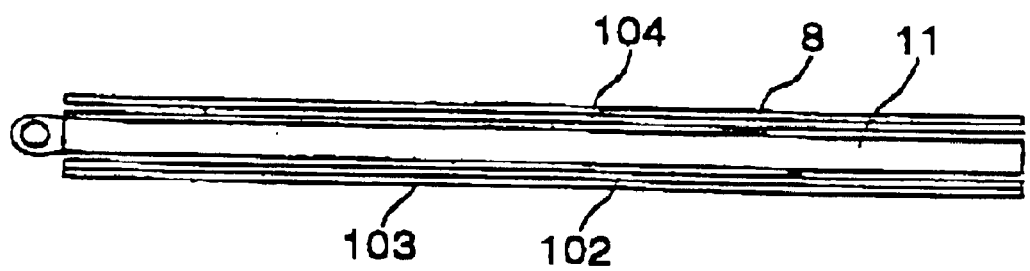
FIG. 36 is a diagrammatic cross-sectional view of a modification of the ninth embodiment.

A further embodiment is shown in FIG. 36. A light-guide plate 11 is superimposed directly on top of the liquid crystal display and a polarising plate 104 is further superimposed on light-guide plate 11. Liquid crystal displays include one polarising plate on top and one polarising plate below, respectively; the axis of polarisation of polarising plate 104 on top of the light-guide plate is made to correspond with these. Since this polarising plate cuts the amount of light scattered to above the light-guide plate, it can improve recognisability of the liquid crystal display.

As described above, with the seventh to ninth embodiments and their modifications, thin surface illumination can be provided that is suited to notices or displays etc. using external light. Also, in applications such as portable electronic computer terminals, a liquid crystal display device can be provided wherein display quality is not lowered when used with the illumination extinguished in well lit locations for purposes of power saving and which provides high contrast when illuminated.

Tenth Embodiment

Figure 37A:
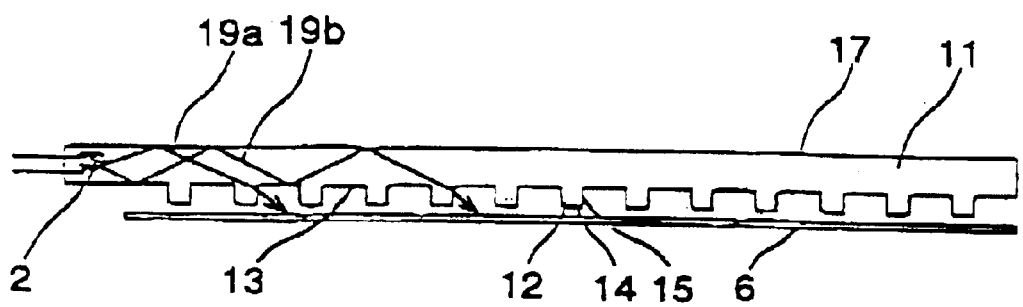
FIG. 37A and FIG. 37B are a diagrammatic cross-sectional view and perspective view showing a tenth embodiment of the present invention.
Figure 37B:
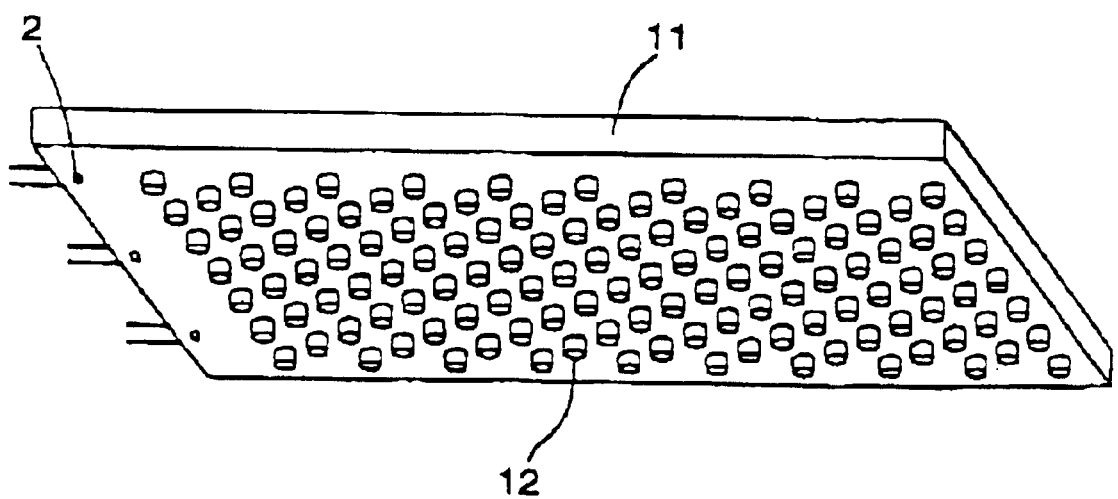

A tenth embodiment is described below with reference to the drawings. In FIG. 37A, one or a plurality of light-emitting diodes (LEDs) 2 are arranged at the end face of a light-guide plate 11. Light-guide plate 11 is provided with projections 12 on one face of the transparent plate, as shown in FIG. 37B; in all cases, the faces of projections 12 comprise faces practically parallel to optical output face 13 (bottom face 14) and faces practically perpendicular thereto (side faces 15). Light-guide plate 11 is formed of transparent material of refractive index at least 1.4. As shown by ray 19a and ray 19b, the optical flux from LED 2 undergoes repeated total reflection within light-guide plate 11 and is emitted solely from the side faces 15 of projections 12, so a considerable amount of light is emitted from the back face of the illumination device, enabling illuminated body 6 to be effectively illuminated.

Also, since light-guide plate 11, is formed integrally with the LED, epoxy may be used as the transparent material; however, apart from this, transparent resin such as acrylic resin, polycarbonate resin, or amorphous polyolefin resin, inorganic transparent material such as glass or composites of these could be employed; it could also be formed by a method such as joining a film or resin layer on to an injection moulding, heat setting resin, photosetting resin, etching, transparent resin or flat glass plate.

For the light source, compared with the conventionally employed fluorescent tubes, LEDs do not require special mechanisms such as voltage step-up devices and are light and compact and furthermore have excellent safety since they do not employ high frequencies or high voltages. Also, power control is easy and they can easily be applied to low power consumption applications. Also, LEDs have a semi-permanent life and as regards colour have recently become available in red, yellow, green, blue, mixtures of these and white.

By means of the above construction, by arranging the present illumination device at the front face of an illuminated body 6, part-time illumination can be achieved in which illuminated body 6 is observed with illumination extinguished under bright conditions when there is sufficient external light and illuminated body 6 can be observed with the illumination turned on under dark conditions when external light is insufficient.

Printed matter such as printed paper or a liquid crystal display etc. could be used for the illuminated body 6 of the illumination device as above.

Regarding the size of projections 12, since the wavelength of visible light is from about 380 nm to about 700 nm, in order not to be affected by diffraction, a size of at least about 5 $\mu$m is necessary, while, in order not to be so large as to be noticeable to the naked eye, projections 12 should desirably be of a size less than about 300 $\mu$m. In addition to the above, from the point of view of convenience in manufacture it is desirable that the size of the projections should be above about 10 $\mu$m and below 100 $\mu$m. And regarding the ratio of height and width (i.e., in the case of cylinders, the diameter) of projections 12, since the angle of elevation of rays in light-guide plate is less than 45° with respect to the planar direction, a ratio of one-to-one or less is satisfactory; since in fact rays of under 20° represent at least 90%, satisfactory performance can be obtained with a ratio down to about one to two.

Figure 38:
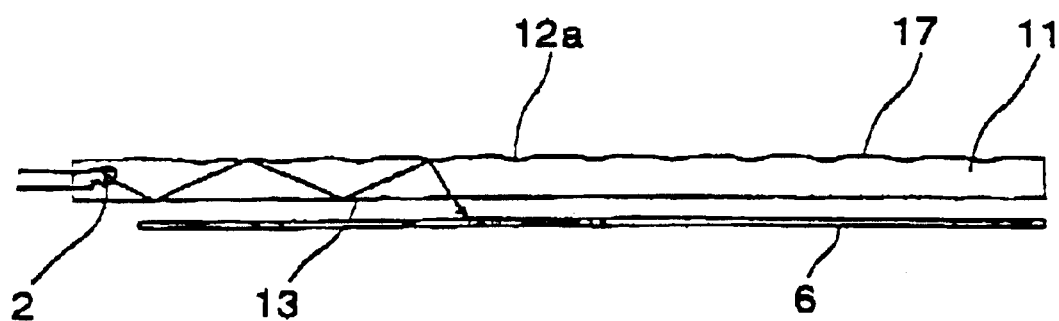
FIG. 38 is a diagrammatic cross-sectional view of a modification of the tenth embodiment.
Figure 39:
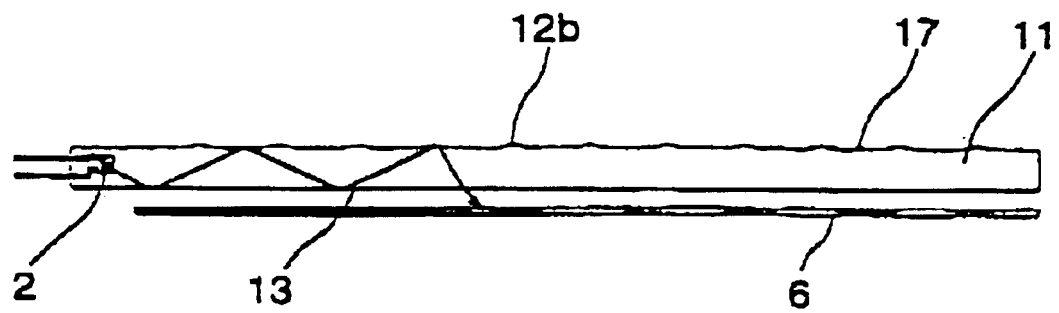
FIG. 39 is a diagrammatic cross-sectional view of a further modification of the tenth embodiment.

In the modification shown in FIG. 38, concave shapes 12a are provided on the side of face 17 opposite to the optical output face of light-guide plate 11. Concave shapes 12a have any desired size or shape and their function is to convert optical flux arriving at these concave shapes 12a into optical flux having a large angle of elevation with respect to the plane of light-guide plate 11; however, it has been found that good characteristics are obtained by making these shapes approximately spherical faces of centre angle less than 90°. The optical flux that is directed into light-guide plate 11 from LED 2 undergoes repeated total reflection within light-guide plate 11 as it is guided through it but, owing to the provision of concave shapes 12a on face 17 opposite to the optical output face of light-guide plate 11, optical flux arriving thereat is converted to optical flux having a large angle of elevation with respect to the plane of the light-guide plate 11 and so can be output from optical output face 13. By arranging illuminated body 6 at optical output face 13 of light-guide plate 11, this construction can provide a planar illumination function. Also, since the rest of face 17 opposite to the optical output face apart from the concave shapes is parallel to optical output face 13, it also has a perpendicular ray transmission function of transmitting rays in directions intersecting the flat plate.

These concave shapes 12a can be provided in any desired area ratio with respect to the area of the illumination section. However, although illumination efficiency can be raised by increasing the area ratio of the concave shapes 12a, decreasing the proportion of perpendicularly transmitted rays lowers recognisability. In fact it is not realistic to set the area ratio above 50% and, for part-time illumination under dark conditions, the area ratio may suitably be set about 10%. Also, if, as described above, the density is regulated in order to achieve uniformity of illumination brightness, if the ratio is about 10%, the area ratio of the perpendicular transmission portion will be about 80–90% and so will not give rise to unevenness of recognisability depending on position.

Regarding the size of concave shapes 12a, since the wavelength of visible light is about 380 nm to 700 nm, they must be at least about 5 $\mu$m in order to avoid diffraction effects and should desirably be less than 300 $\mu$m in order not to be of such a size as to be noticeable to the naked eye. In addition to the above, from the point of view of convenience in manufacture, the size of the concave shapes is desirably at least about 10 $\mu$m and below 100 $\mu$m.

In the modification shown in FIG. 29, convex shapes 12b are provided on the side of face 17 opposite to the optical output face of light-guide plate 11. Convex shapes 12b may have any desired size or shape and have the function of converting optical flux reaching these convex shapes 12b into optical flux having a large angle of elevation with respect to light-guide plate 11; however, it has been found that good performance can be obtained by making them approximately conical surfaces of apex angle less than 120°. The density and size of convex shapes 12b are the same as in the case of the concave shapes described above.

Figure 40:
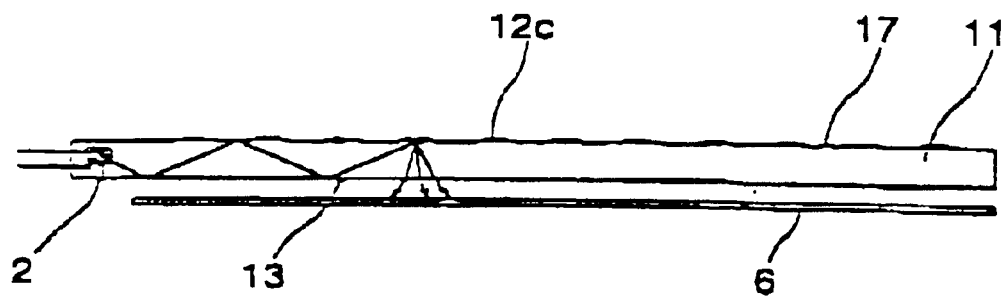
FIG. 40 is a diagrammatic cross-sectional view of a further modification of the tenth embodiment.

In the modification shown in FIG. 40, an optical diffusion member layer 12c is provided on the side of face 17 opposite to the optical output face of light-guide plate 11. Optical diffusion member layer 12c can have any desired size and shape and has the function of converting optical flux arriving at this optical diffusion member layer 12c into optical flux having a large angle of elevation with respect to the plane of light-guide plate 11. Specifically, this optical diffusion member layer 12c has a function of optical diffusion in the direction of optical output face 13 and an optical screening capability in the direction of face 17 opposite to the optical output face. In order to ensure the optical screening capability, a further optical screening layer may also be provided. The density and size of optical diffusion member layer 12c are in accordance with those of the concave shapes described above.

Figure 41:
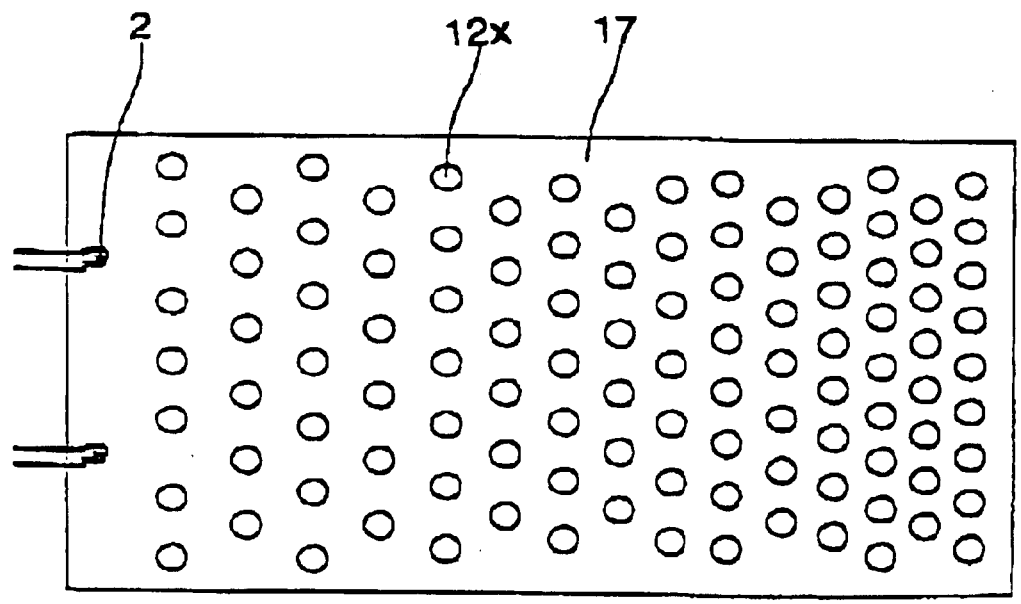
FIG. 41 is a diagrammatic plan view of a further modification of the tenth embodiment.

The modification shown in FIG. 41 is an example in which point-shaped optical extraction shapes 12x as described above are distributed sparsely in the vicinity of LED 2 on light-guide plate 11 and more densely as distance from point light source 2 is increased. The optical flux density in light-guide plate 11 is high in the vicinity of LED 2 but the rays are diffused by optical extraction shapes 12x with the result that the optical flux density falls as the distance from LED 2 increases, so optical extraction shapes 12x are therefore provided with progressively greater density. More uniform illumination can thereby be achieved.

Figure 42A:
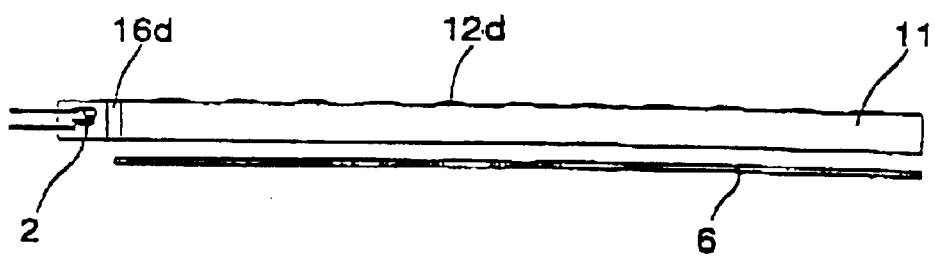
FIG. 42A and FIG. 42B are a diagrammatic cross-sectional view and perspective view of a further modification of the tenth embodiment.
Figure 42B:
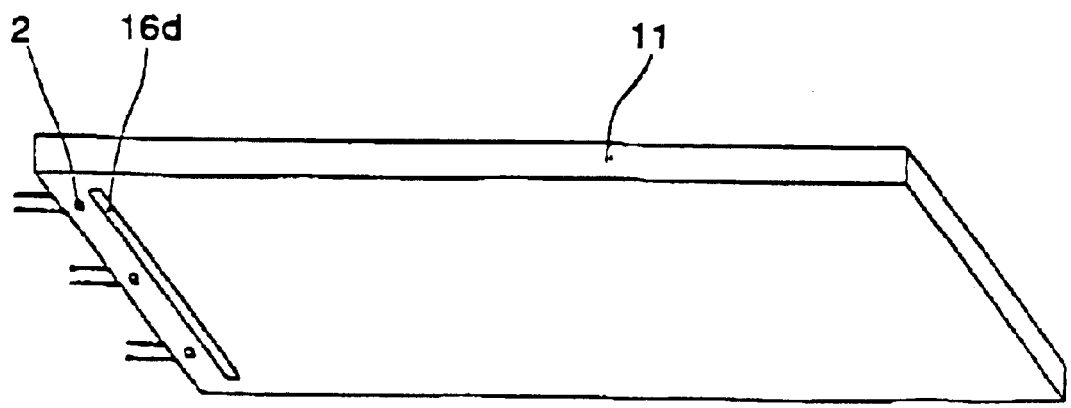

FIG. 42A or FIG. 42B shows a modification in which a gap 16d is provided between the part where optical extraction shapes 12d are formed on light-guide plate 11 and the part of LED 2. LED 2 is a point light source and emits light within the interior of light-guide 11 so rays are emitted in all directions but the components that are guided by total reflection within the interior of light-guide plate 11 are only those whose angle of elevation with respect to the planar direction of light-guide plate 11 is less than about 45°. Air gap 16d enables the angles of the rays to be kept below an angle of elevation of 45° when they are re-input to light-guide plate 11 by transmitting rays from LED 2 once through the air interface.

Figure 43:
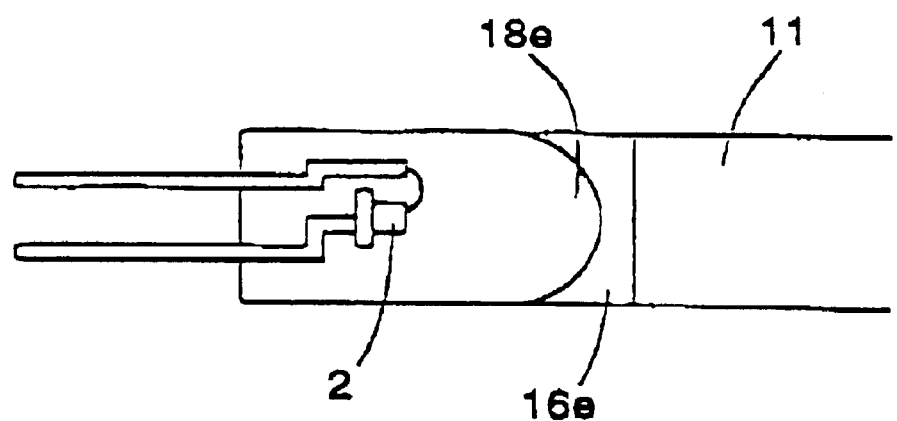
FIG. 43 is a partial diagrammatic cross-sectional view showing a modification of the tenth embodiment.

The modification shown in FIG. 43 is an example in which a lens shape 18a is formed on the side face nearest LED 2 of gap 16e. Lens shape 18e prevents dispersion when rays from LED 2 are emitted into gap 16e and has the action of causing them to be effectively re-input to light-guide plate 11.

Figure 44:
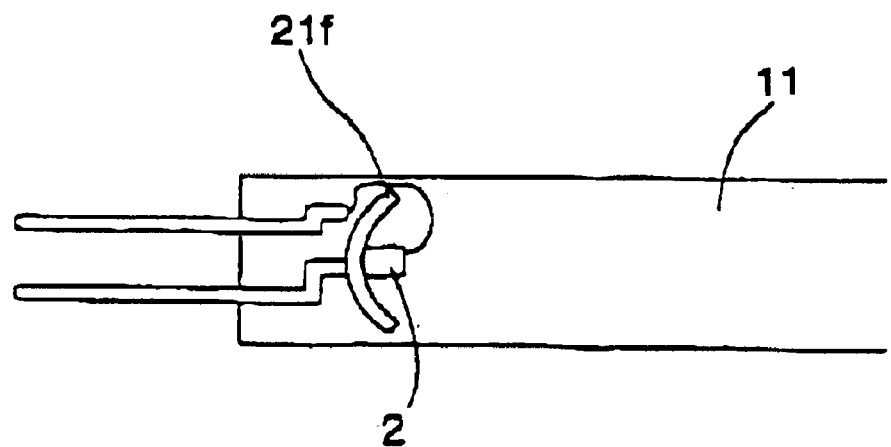
FIG. 44 is a partial diagrammatic cross-sectional view showing a modification of the tenth embodiment.

In the modification shown in FIG. 44, a reflecting member 21f is arranged behind LED 2. Since LED 2 is a point light source, some light is also guided in the backwards direction of light-guide plate 11; this is therefore reflected forwards by means of reflecting member 21f. Also, by making reflecting member 21f a concave mirror, the angle of elevation with respect to the plane of light-guide plate 11 can be condensed to below 45° or an angle close to this.

Figure 45:
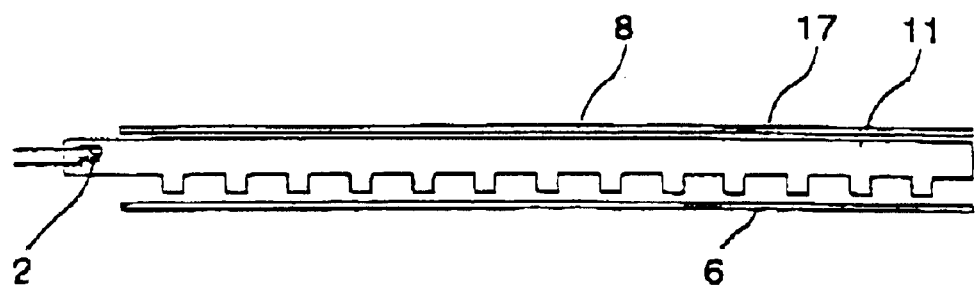
FIG. 45 is a diagrammatic cross-sectional view of a further modification of the tenth embodiment.
Figure 46:
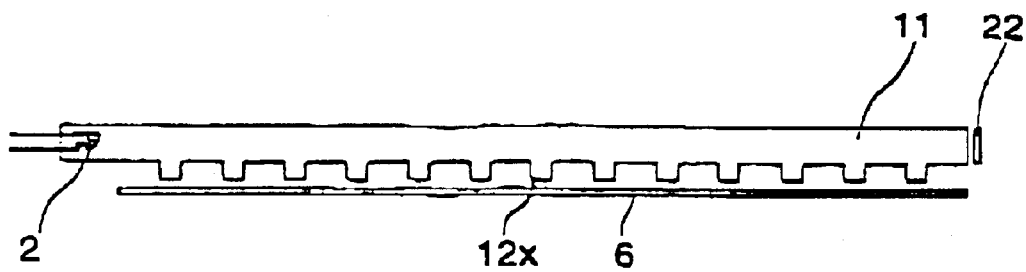
FIG. 46 is a diagrammatic cross-sectional view of a further modification of the tenth embodiment.
Figure 47:
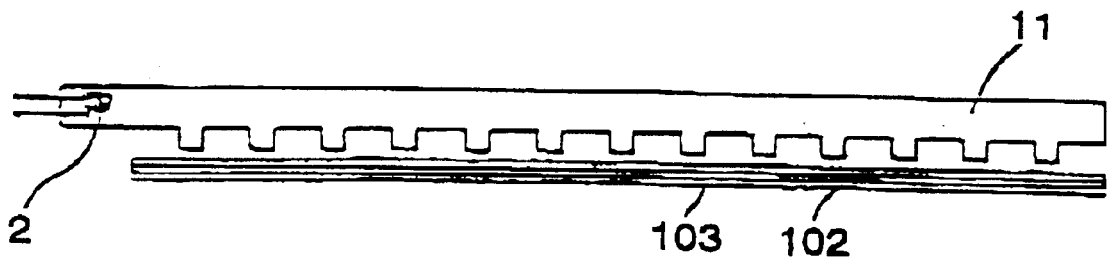
FIG. 47 is a diagrammatic cross-sectional view showing an eleventh embodiment of the present invention.

In the modification shown in FIG. 45, a transparent plate or transparent sheet 8 is arranged at the side of face 17 opposite to the optical output face of light-guide plate 11. Light-guide plate 11 and transparent plate or transparent sheet 8 are not stuck together and an air gap is present. If there is even slight damage to the surface of light-guide plate 11, the rays that are being guided through its interior are reflected thereat, and can be recognised from the surface as bright points or bright lines. Not only is this unattractive as illumination of the transparent type but it also severely lowers recognisability due to the loss in contrast etc. With transparent plate or transparent sheet 8 an air layer is interposed with respect to light-guide plate 11, no there is no possibility of optical flux from light source 2 entering and any such damage cannot cause bright points or bright lines. Also in this case, since the relative area of the damage is slight, there is very little effect in terms of recognisability on illuminated object 6. Since the present light-guide plate 11 is employed as illumination arranged at the front face, such a transparent plate or transparent sheet 8 is indispensable. For transparent plate or transparent sheet 8, transparent resin such as acrylic resin, polycarbonate resin, or amorphous polyolefin resin or inorganic transparent material such as glass may be employed. In the modification shown in FIG. 46, a reflective member 22 is arranged adjacent the end face of light-guide plate 11. Since, apart from the rays that are diffused by optical extraction shapes 12x and delivered as optical output from the optical output face, a lot of rays reach this end face where they are output, effective utilisation of the rays can be achieved by returning them once more into light-guide plate 11 by reflecting member 22.

Eleventh Embodiment

An eleventh embodiment is described below with reference to the drawings. As a further embodiment, FIG. 17 shows an example in which a liquid crystal display panel is employed as the illuminated object. Light-guide plate 11 is arranged at the front face of liquid crystal display panel 102. A reflective type liquid crystal display device is constituted by arranging a reflective plate 103 at the back face of liquid crystal display panel 102. Light-guide plate 11 has a function of projecting rays towards liquid crystal display panel 102 and of transmitting rays reflected by reflecting plate 103 practically without dispersion. This is effective in that, when used with light source 2 extinguished, as when there is sufficient external light, light-guide plate 11 acts simply as a transparent plate, so recognisability is not impaired and display quality is not affected. And when used in illuminated condition in dark locations where there is insufficient external light, liquid crystal display panel 102 is illuminated, while reflected light from reflecting plate 103 is directly transmitted since light-guide plate 11 functions as a simple transmission plate just as in the case where the illumination was extinguished as described above, so this is effective in maintaining high recognisability.

Figure 48:
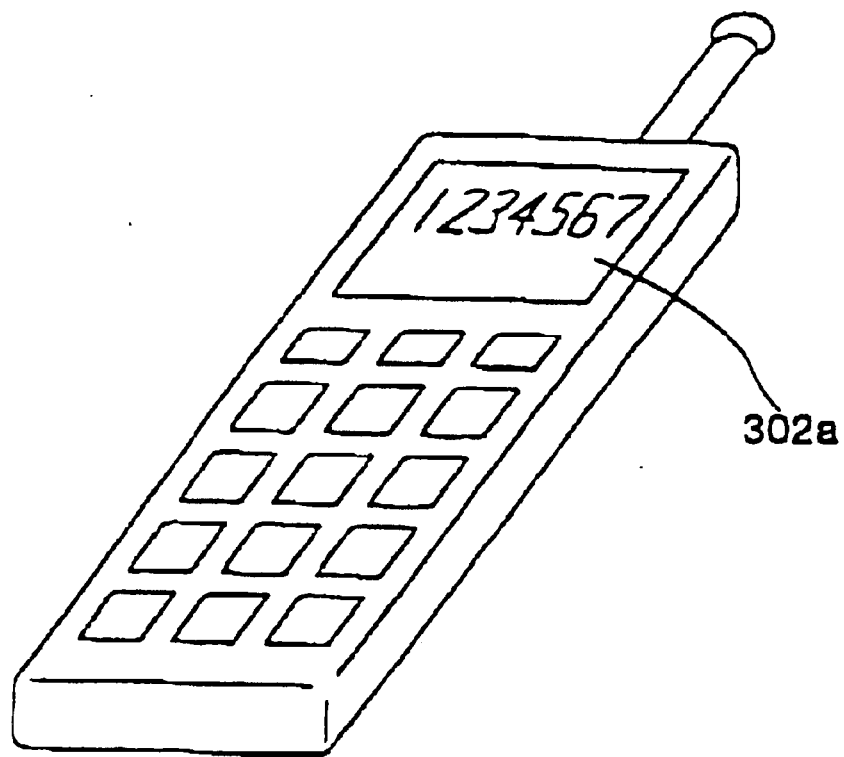
FIG. 48 is a perspective view showing an example of application of the eleventh embodiment.
Figure 49:
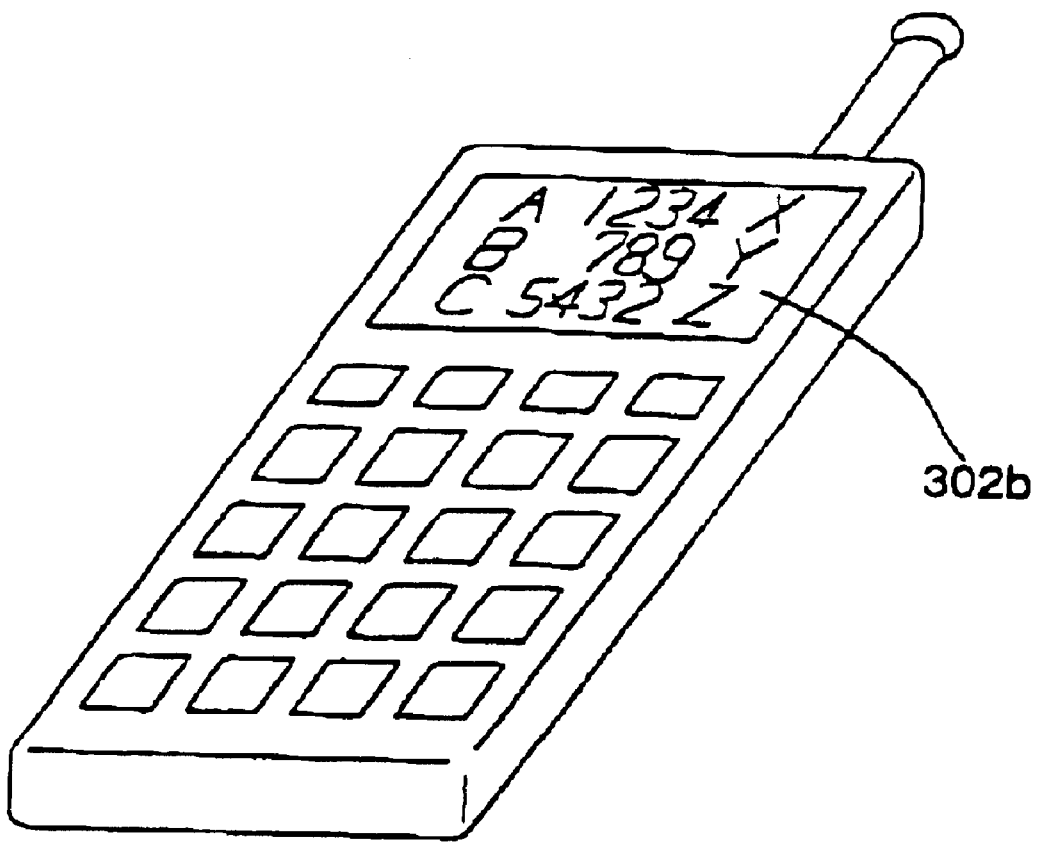
FIG. 49 is a perspective view showing a further example of application of the eleventh embodiment.
Figure 50:
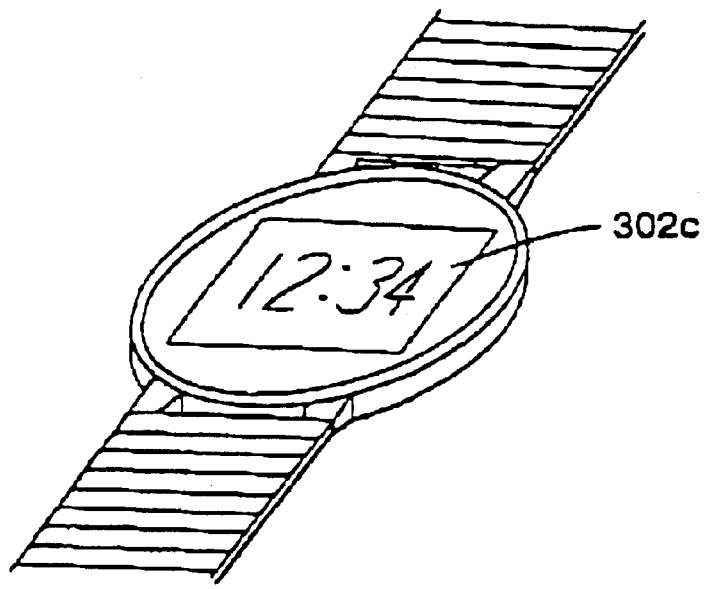
FIG. 50 is a perspective view showing a further example of application of the eleventh embodiment.
Figure 51:
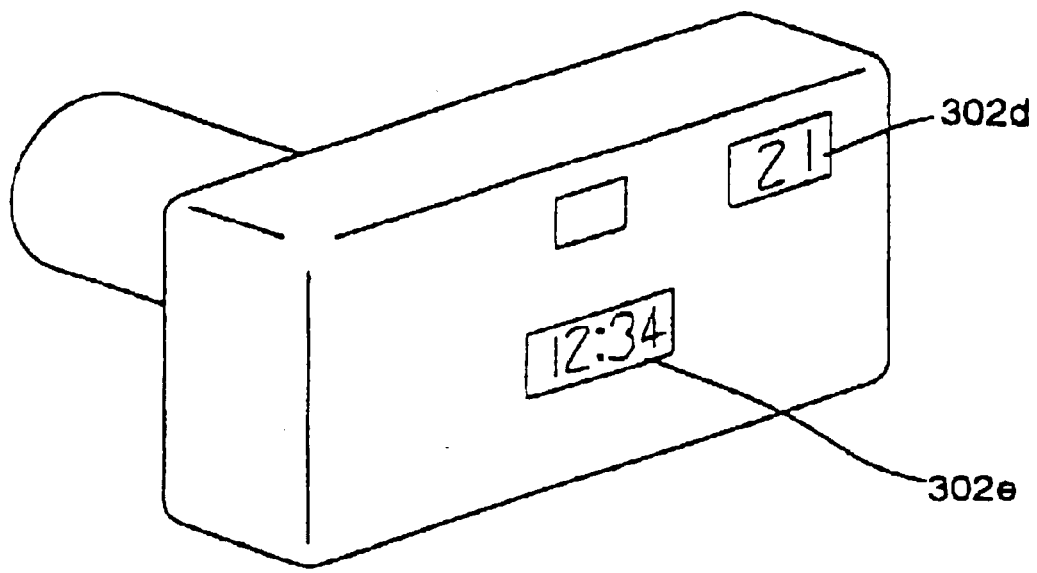
FIG. 51 is a perspective view showing a further example of application of the eleventh embodiment.

Also, in comparison with the transmission type liquid crystal display device in which the illumination device was arranged at the back face of the liquid crystal display panel and light/dark contrast was generated by rays from the illumination device passing once only through the liquid crystal display panel, since, with the reflective type liquid crystal display device wherein, as in the present invention, the illumination device is arranged at the front face of the liquid crystal display panel, allowing the rays from the illumination device to pass through once more by being reflected by the reflecting plate after passing once through the liquid crystal display panel, this is beneficial in obtaining higher recognisability since contrast is raised. An electronic device according to the present invention is described below with reference to the drawings. Since, with the liquid crystal display device of the present invention, a display can be performed having an illumination function with very low power consumption, it is beneficial in respect of portable electronic devices. Portable electronic devices include mobile telephones (FIG. 48), information terminals (FIG. 49), watches (FIG. 50), or cameras (FIG. 51).

As described above, with the tenth to eleventh embodiments and their modifications, thin surface illumination can be provided suited to notices or displays etc. that make use of external light. Also, in applications such as portable information terminals, a liquid crystal display device can be provided wherein display quality is not lost even when used with the illumination extinguished in well lit locations for purposes of power saving and which provides high contrast with lower power consumption when the display is illuminated, by using LEDs or electric light bulbs.

Also, electronic devices such as portable telephones or information terminals can be provided having long battery life with low power consumption.

Twelfth Embodiment

Figure 52A:
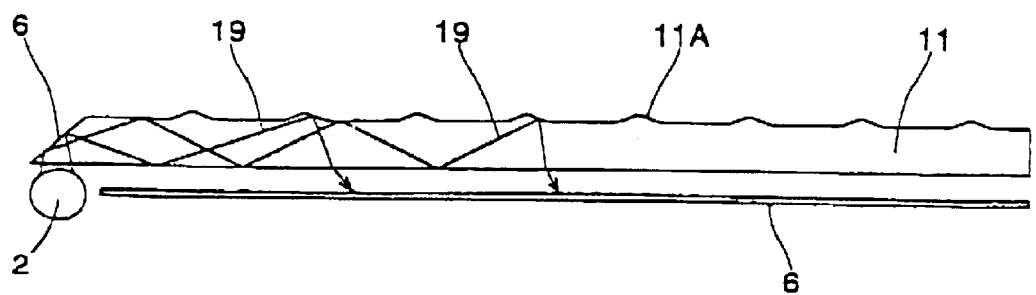
FIG. 52A and FIG. 52B are a diagrammatic cross-sectional view and perspective view showing a twelfth embodiment of the present invention.
Figure 52B:
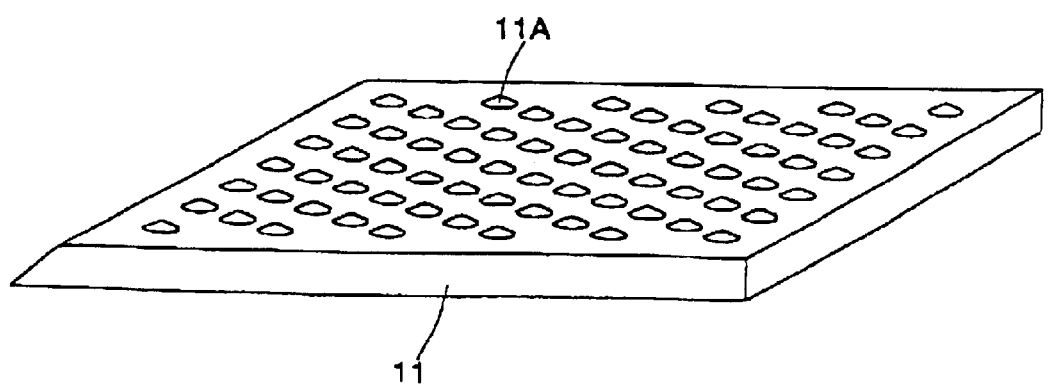

An embodiment of the present invention is described below with reference to the drawings. In FIG. 52A, there is provided an inclined face 16 at an end face of light-guide plate 11, and light source 2 is arranged adjacent a larger face of the light-guide plate. As shown in FIG. 52B, light-guide plate 11 is provided with convex shapes 11A on one face of the transparent plate, all the faces of convex shapes 11A being formed by surfaces of angle less than about 30° with respect to the plane parallel to light-guide plate 11. Light-guide plate 11 is formed by transparent material of refractive index at least about 1.4; if the refractive index is for example 1.4, the critical angle is 45°, and incoming rays from light source 2 make angles of less than 45° with respect to the normal direction of light-guide plate 11; however, in practice, most components make an angle of less than 20°. Inclined face 60 makes an angle of from about 30° to 50° with respect to the plane parallel to light-guide plate 11 and has an action of converting rays directed into light-guide plate 11 from light source 2 into rays of angle less than 45° with respect to the plane parallel to light-guide plate 11.

Specifically, as shown by ray 19a or ray 19b, when optical flux from light source 2 is input into light-guide plate 11, it is reflected by inclined face 16 and converted into rays having vectors of less than about 45° with respect to the plane parallel to light-guide plate 11 and undergoes repeated total reflection within light-guide plate 11. When in due course it reaches a convex shape 11A, the ray reflected by the faces of convex shape 11A makes a fairly large angle exceeding 45° with the plane parallel with light-guide plate 11 and can thus be output from light-guide plate 11. In this way, a large amount of optical output is obtained from the back face of the illumination device, and illuminated body 6 can be effectively illuminated.

Just as in the case of FIG. 15 described above, the faces of convex shapes 11A are constructed by faces of angle less than about 30° with respect to the plane parallel to light-guide plate 11. Of rays travelling within light-guide plate 11, most of the components are of angle less than 20° with respect to the plane parallel to the light-guide plate 11, so most of the rays guided through light-guide plate 11 arrive at the faces of convex shapes 11A with angles above the critical angle and the reflected light can therefore be output from another face of light-guide plate 11. The shape can be freely chosen so long as they make an angle of less than about 30° with respect to the plane parallel to light-guide plate 11 as mentioned above but it is beneficial if these faces are conical faces or of a shape based thereon since the angle of the faces can be fixed and directionality of the direction of the faces is eliminated.

Just as in the case of FIG. 17 described above, convex shapes 11A can be formed in the shape of conical faces of apex angle about 130°. When a ray 91a parallel to light-guide plate 11 is reflected by a conical face, it intersects the normal of light-guide plate 11 at 40° and is output. A ray 91b making an angle of 20° intersects the conical face at 45° and so is reflected; this reflected light intersects the normal of the light-guide plate 11 at 20° and so can be output. A ray 91c of angle exceeding 20° would be output from the conical face, but such components represent only a small proportion of the whole and so [the light] can be effectively utilised as illumination by choosing an apex angle of about 130°.

For the transparent material forming light-guide plate 11, transparent resin such as acrylic resin, polycarbonate resin, amorphous polyolefin resin, or inorganic transparent material such as glass or composites thereof can be employed; these can be formed by a method such as joining a film or resin layer on to an injection moulding, heat setting resin, photosetting resin, etching, transparent resin or flat glass plate.

As light source 2, a fluorescent tube, electric light bulb or light emitting diode (LED) etc. may be employed. Fluorescent tubes have the characteristic features that high illuminance can be expected at low power and white light can easily be obtained. LEDs have a semi-permanent life and the circuitry is simple since they can be driven at low voltage; they are also of high safety in regard to catching fire and electric shock. Regarding colour, they have recently become available in mixed colours and white apart from red, green and blue, so a wide choice is available depending on the application. Electric light bulbs have the drawback of a short life, but they are cheap and can easily be replaced.

These convex shapes 11A can be provided in any required area ratio with respect to the area of the illumination section. However, although the efficiency of illumination can be raised by increasing the area ratio of convex shapes 11A, diminution of the proportion of perpendicularly transmitted rays lowers recognisability. In fact it is not realistic to set the area ratio to more than 50% and, for part-time illumination under dark conditions, it may suitably be set to an area ratio of about 10%. Also, if the density is regulated in order to achieve uniformity of illumination brightness as described above, if the ratio is about 10%, the area ratio of the perpendicular transmission portion is within a range of about 80–90%, so unevenness of recognisability depending on position is not experienced.

Regarding the size of convex shapes 11A, since the wavelength of visible light is about 380 nm to 700 nm, the size should be at least about 5 μm in order to avoid diffraction effects and should also desirably be under about 300 μm in order that convex shapes 11A are not noticeable to the naked eye. In addition to the above, from the point of view of convenience in manufacturing, the size of convex shapes 11A is preferably above about 10 μm and below 100 μm.

With the above construction, part-time illumination can be achieved by arranging an illumination device according to the present invention at the front face of an illuminated body 6, with illuminated body 6 being observed with the illumination extinguished under well lit conditions when there is sufficient external light and illuminated body 6 being observed with the illumination lit under dark conditions with insufficient external light.

As illuminated body 6 of an illumination device as above, printed material such as printed paper or a liquid crystal display etc. may be employed.

Figure 53:
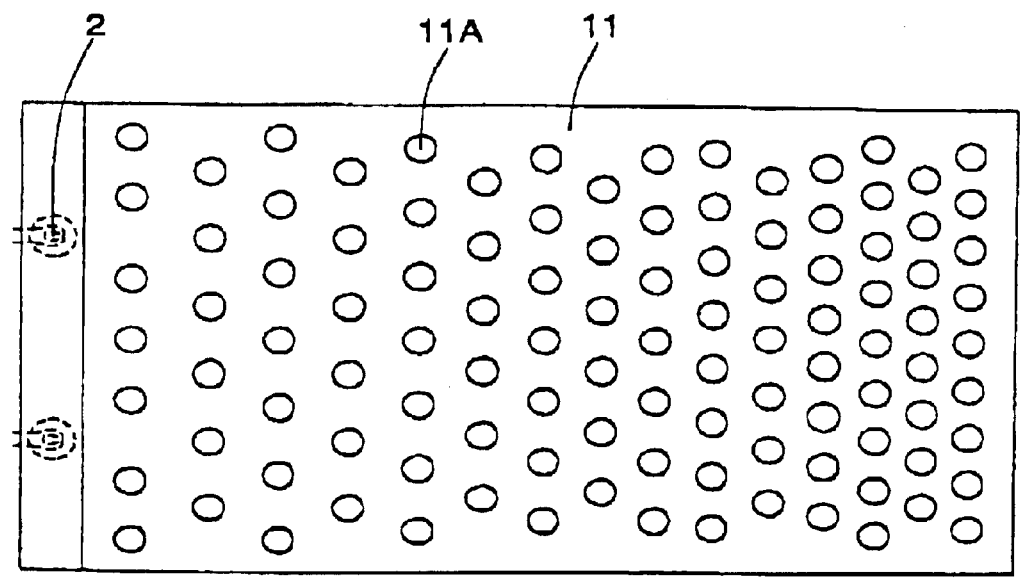
FIG. 53 is a diagrammatic plan view of a modification of the twelfth embodiment.

In the modification shown in FIG. 53, an example is shown in which convex shapes as described above (in the case shown in FIG. 53; these are of conical shape) are distributed sparsely in the vicinity of light source 2 and more densely going further away from point light source 2. Although the optical flux density is higher in light-guide plate 11 in the vicinity of light source 2, the rays are diffused by convex shapes 11A, so that, with increasing distance from light source 2, the optical flux density gets lower, so convex shapes 11A are arranged with progressively greater density. In this way, more uniform illumination can be achieved.

Figure 54:
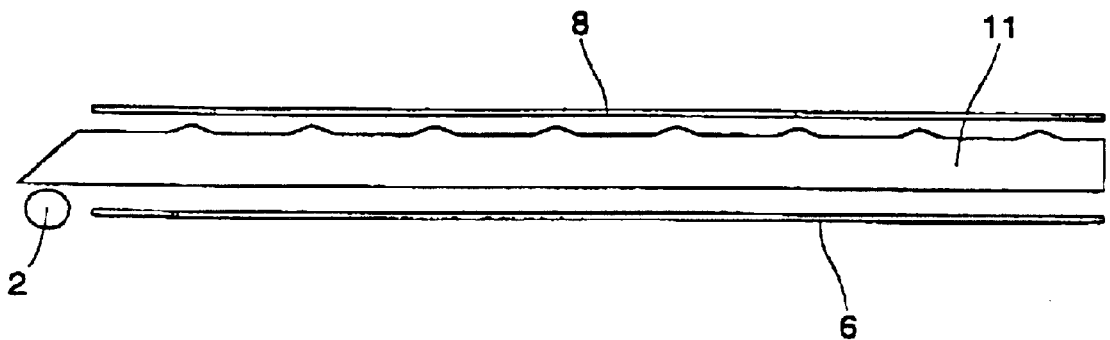
FIG. 54 is a diagrammatic cross-sectional view of a further modification of the twelfth embodiment.

In the modification shown in FIG. 54, a transparent plate or transparent sheet 8 is arranged on the observer's side of light-guide plate 11. Light-guide plate 11 and transparent plate or transparent sheet 8 are not stuck together but an air layer is present between them. If there is even slight damage to the surface of light-guide plate 11, rays guided through its interior are reflected thereat and can be recognised from the surface as bright points or bright lines. Not only are these unattractive for illumination of the transparent type, but also recognisability is severely lowered on account of the lowered contrast. However, since an air layer is interposed between transparent plate or transparent sheet 8 and light-guide plate 11, optical flux from light source 2 cannot enter and even if such damage is present it cannot appear in the form of bright points or bright lines. Also in this case, since the relative area of the damage is slight, there is very little effect in terms of recognisability on illuminated body 6. In order to employ the present light-guide plate 11 as illumination arranged at the front face, such a transparent plate or transparent sheet 8 is indispensable. For transparent plate or transparent sheet 8, transparent resin such as acrylic resin, polycarbonate resin, or amorphous polyolefin resin, or inorganic transparent material such as glass may be employed. Also, when used actually assembled into an electronic device or mobile telephone or the like, transparent plate or transparent sheet 8 may be used together with a glass cover.

Thirteenth Embodiment

Figure 55:
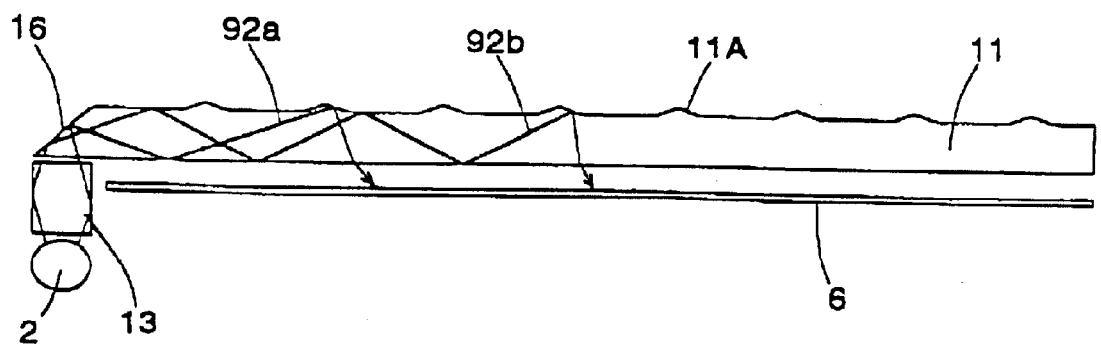
FIG. 55 is a diagrammatic cross-sectional view showing a thirteenth embodiment of the present invention.

A thirteenth embodiment is described below with reference to the drawings. In FIG. 55, a light-guide member 13 is arranged between light-guide plate 11 and light source 2.

Light-guide member 13 is a transparent body of approximately rectangular prismatic shape, or cylindrical shape etc. and consists of material such as acrylic resin, just like light-guide 11. It has the characteristic feature that, if there is some distance between light-guide plate 11 and light source 2, it can enable rays from light source 2 to be effectively directed into light-guide plate 11.

Figure 56:
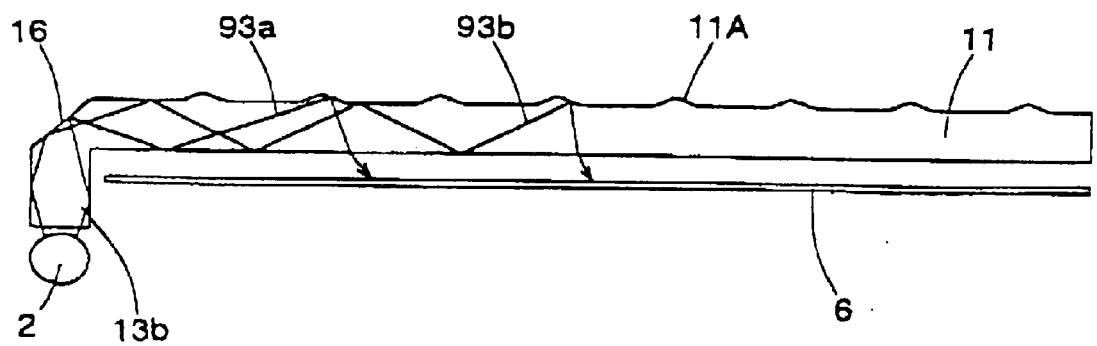
FIG. 56 is a diagrammatic cross-sectional view of a modification of the thirteenth embodiment.

FIG. 56 shows an example in which light-guide member 13b is formed integrally with the light-guide plate. This is suitable in the cane of manufacture by for example infection moulding.

Fourteenth Embodiment

Figure 57A:
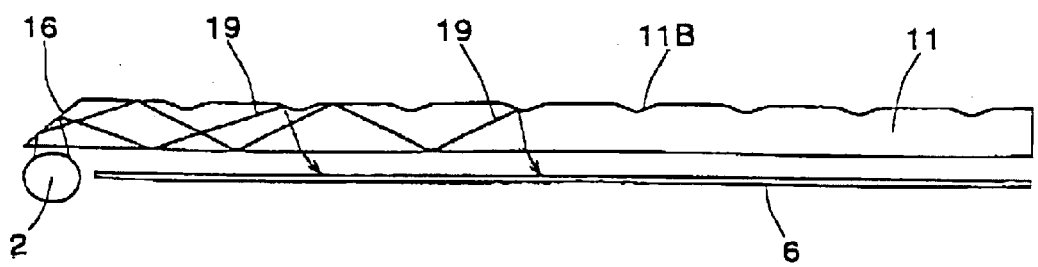
FIG. 57A and FIG. 57B are a diagrammatic cross-sectional view and perspective view showing a fourteenth embodiment.
Figure 57B:
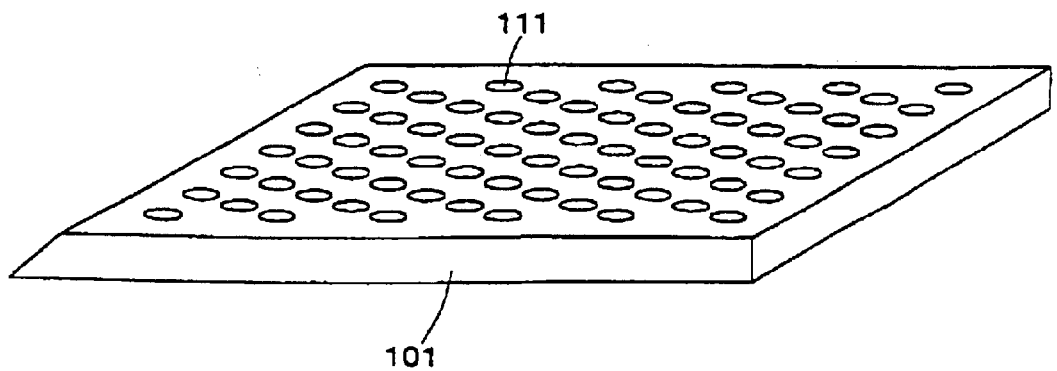

A fourteenth embodiment is described with reference to the drawings. In FIG. 57A, a light source 2 is arranged at the end face of light-guide plate 11. Light-guide plate 11 is provided with concave shapes 11H as shown in FIG. 57B on one face of the transparent plate, all the faces of concave shapes 11H being constituted by faces of angle less than about 30° with respect to the plane parallel to light-guide plate 11. Light-guide plate 11 is formed of transparent material of refractive index about 1.4 or more; if for example the refractive index is 1.4, the critical angle is 45°. Specifically, as shown by ray 19a or ray 19b, when optical flux from light source 2 is input from the end face and reflected by inclined face 16, it is converted into rays having vectors of under about 45° with respect to the plane parallel to light-guide plate 11 and so undergoes repeated total reflection within light-guide plate 11. When in due course it arrives at a concave shape 118, a ray reflected by the faces of concave shape 11H makes a fairly large angle, exceeding about 45° with the plane parallel to the light-guide plate 11, and so can be output from light-guide plate 11. In this way, a large amount of optical output is obtained from the back face of the illumination device, and illuminated body 6 can be effectively illuminated. Just as is the case of FIG. 24 described above, the faces of concave shapes 11B are constituted by faces of angle less than about 30° with respect to the plane parallel to light-guide plate 11. Since most of the components of the rays travelling through light-guide plate 11 are less than about 20° with respect to a plane parallel to light-guide plate 11, most of the rays guided through light-guide plate 11 arrive at the faces of concave shapes 11B at more than the critical angle and so their reflected light can be output from another face of light-guide plate 11. Although the shape of the surfaces can be freely chosen so long as they make an angle of less than about 30° with respect to the plane parallel to the light-guide plate 11 as described above, a conical surface of shape based on this is advantageous since the angle of the surface can be fixed and directionality is eliminated. An example is shown in which the concave shapes are conical shapes of apex angle 130° as in the case of FIG. 26 described above. When a ray 191a parallel to light-guide plate 11 is reflected by a conical face, it intersects the normal of light-guide plate 11 at 45° and is output. Ray 191b making an angle of 20° intersects the conical face at 45° and so is reflected, the reflected light intersecting the normal of the light-guide plate 11 at 200 and so being able to be output. Ray 191c of angle exceeding 20° would be output from the conical face, but such components represent only a small proportion of the whole and so [the light] can be effectively utilised as illumination by choosing an apex angle of about 130°.

Details regarding density and size of the concave shapes are based on those for the convex shapes described above, without change.

When such concave shapes are provided in the light-guide plate, there is the characteristic feature that, in contrast with the convex shapes described above, these shapes do not affect the thickness.

Fifteenth Embodiment

Figure 58A:
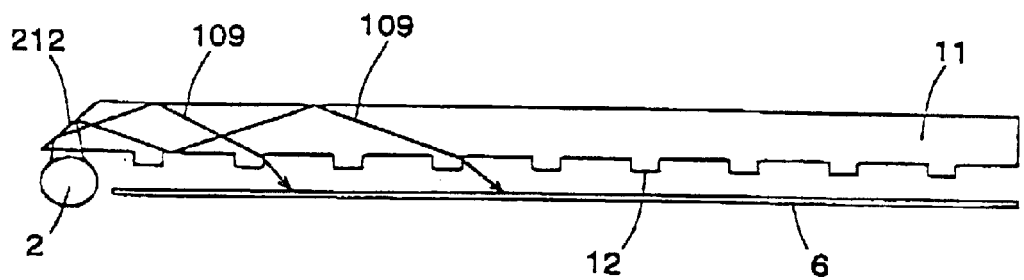
FIG. 58A and FIG. 58B are a diagrammatic cross-sectional view and perspective view showing a fifteenth embodiment of the present invention.
Figure 58B:
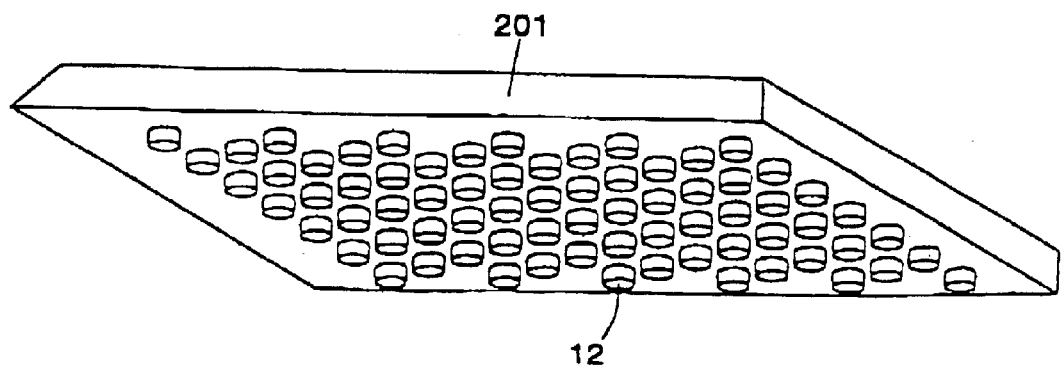

A further embodiment of the present invention is described below with reference to the drawings. In FIG. 58A, light source 2 is arranged at the end of light-guide plate 11. As shown in FIG. 58B, light-guide plate 11 is provided with projecting shapes 12 on one face of the transparent plate; all the faces of projecting shapes 12 are constituted by faces practically perpendicular to light-guide plate 111 and faces practically parallel thereto. Light-guide plate 11 is formed of transparent material of refractive index above about 1.4; if the refractive index is for example 1.4, the critical angle is 45°. Specifically, optical flux from light source 2, as shown by ray 109a and ray 109b, when it is input from the end, is reflected at inclined face 212 and is thus converted into rays having a vector of less than about 45° with respect to the plane parallel to light-guide plate 11, and these undergo repeated total reflection within light-guide plate 11. When in due course they reach the side face of a projecting shape 12, they can be output. In this way, large optical output is obtained from the back face of the illumination device and so illuminated body 6 can be effectively illuminated.

The faces of projecting shapes 12 are constituted by faces that are approximately perpendicular to light-guide plate 11 and a face that is approximately parallel thereto. Most of the components of the rays travelling through light-guide plates 11 are of angle less than about 20° with respect to the plane parallel to light-guide plate 11, so most of the rays guided through light-guide plate 11 arrive at the side faces of projecting shapes 12 at above the critical angle and can thus be output from light-guide plate 11. The shapes of the faces practically perpendicular to light-guide plate 11 as described above and the faces practically parallel thereto can be chosen freely but a cylindrical surface or shape based thereon is advantageous in that the angle of the surface can be made fixed and directionality is eliminated.

Details regarding the density and size of the projecting shapes are in accordance with those of the convex shapes or concave shapes described above, without change.

When such projecting shapes are provided on a light-guide plate, the characteristic feature is obtained that efficiency is excellent in that there is little optical output towards the observer in comparison with the convex shapes or concave shapes described above.

Sixteenth Embodiment

Figure 59:
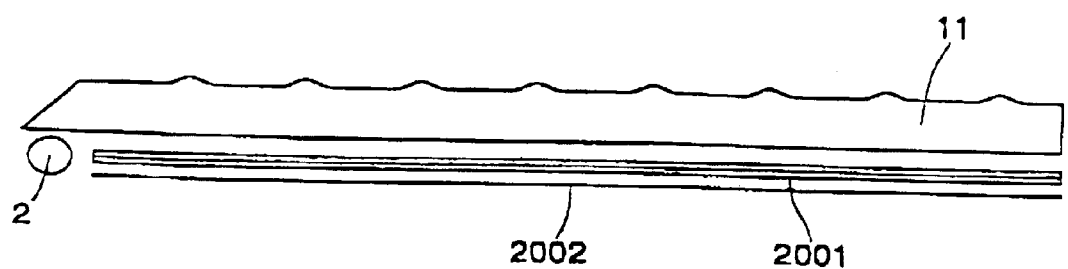
FIG. 59 is a diagrammatic cross-sectional view of a sixteenth embodiment of the present invention.

An example in which a liquid crystal display panel is employed as the illuminated body is shown in FIG. 59. Light-guide plate 11 is arranged at the front face of liquid crystal display panel 2001. A reflective type liquid crystal display device is constituted by arranging a reflecting plate 2002 at the back face of liquid crystal display panel 2001. Light-guide plate 11 has a function of directing rays towards liquid crystal display panel 2001 and of transmitting rays reflected by reflecting plate 2002 with scarcely any dispersion. This is effective when used with light source 2 extinguished as when there is sufficient external light as in this case there is no effect on display quality since light-guide plate 11 functions simply as a transparent plate and does not impair recognisability. It is also effective in maintaining high recognisability when used with the light source extinguished in dark locations where there is insufficient external light, as light-guide plate 11 illuminates liquid crystal display panel 2001 and light reflected by reflecting plate 2002 is directly transmitted, with light-guide plate 3001 functioning simply as a transparent plate in the same way as when illumination is extinguished as described above.

Figure 60:
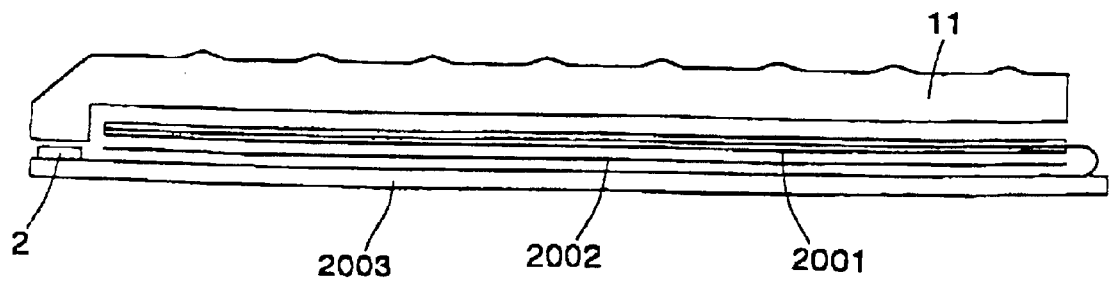
FIG. 60 is a diagrammatic cross-sectional view showing a modification of the sixteenth embodiment.

Also, in comparison with a transparent type liquid crystal display device in which the illumination device was arranged at the back face of the liquid crystal display panel and light/dark contrast was obtained by rays from the illumination device passing through the liquid crystal display panel once only, with the reflective type liquid crystal display device in which this illumination device is arranged at the front face of the liquid crystal display panel, benefits in terms of higher recognisability due to higher contrast are obtained since rays from the illumination device, after having passed through the liquid crystal display panel once, are reflected by the reflecting plate and so pass through one more time. FIG. 60 shows an example in which a light emitting diode (LED) 2 is arranged as light source on circuit board 2003 and liquid crystal display panel 2001, reflecting plate 2002 and light-guide 11 are constituted as a unit. Such a construction can be achieved by an illumination device according to the present invention.

This liquid crystal display device is used in electronic devices such as mobile telephones; a display 2000 as described above can be provided in the display section of a mobile telephone. This is effective in particular in power saving in a portable electronic device.

As described above, with the twelfth to sixteenth embodiments and modifications thereof, this surface illumination can be provided suitable for notices and liquid crystal displays etc. that utilise external light. Also, in applications such as electronic computer terminals for portable use, a liquid crystal display device can be provided wherein, when used with illumination turned off in well lit locations in order to save power display quality is not adversely affected, while, when used with illumination turned on, high contrast can be obtained with lower power consumption, using a fluorescent tube, LEDs or electric light bulbs etc.

Seventeenth Embodiment

First of all, with regard to the seventeenth to twenty-eighth embodiments, a description of the background of the invention will be given in order to put these embodiments in a concrete context.

From the point of view of a display device on which is mounted an illumination device constituting an aspect of the present invention, prior art techniques relating to such display devices will be described taking a reflective type liquid crystal display device as an example.

Reflective type liquid crystal display devices are display devices that can be operated by minute currents and have achieved considerable development and popularity as information transfer media in for example watches, electronic calculators, portable telephones, small-size information devices, and various types of domestic electronic products. Various display modes have been developed, including the TN type (twisted nematic), STN type (super twisted nematic) and ferroelectric type.

Figure 62:
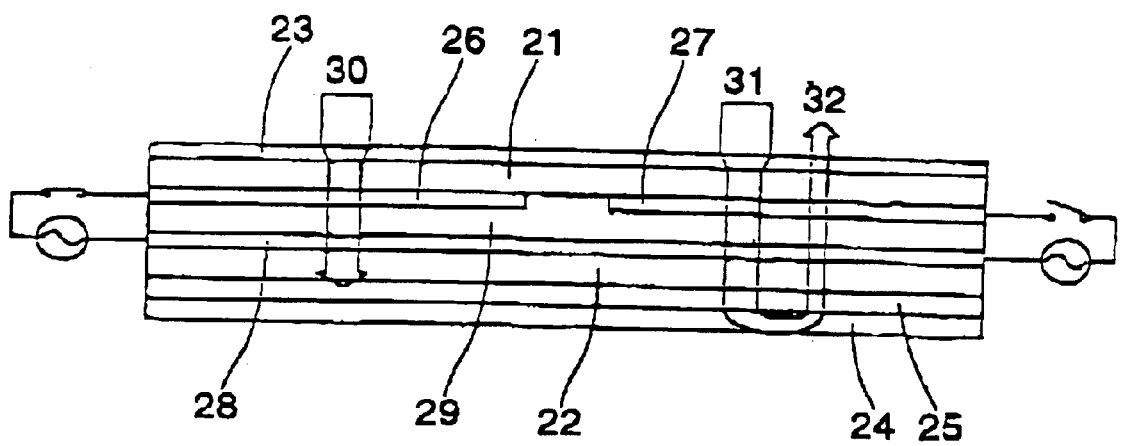
FIG. 62 is a cross-sectional view showing a diagram of a prior art reflective type liquid crystal display device.

FIG. 62 is a cross-sectional view of a reflective type liquid crystal display device that is currently generally employed. 21 and 22 are respectively upper and lower circuit boards and these are provided with respective transparent electrode films 26, 27 and 28 on their mutually opposite surfaces. 29 is a liquid crystal layer inserted between these upper and lower circuit boards 21 and 22; the display mode such as TN mode, STN mode, or ferroelectric mode as described above may be selected at will by selecting the liquid crystal material and liquid crystal molecular arrangement of this liquid crystal layer 29, but the basic cross-sectional structure of the reflective type liquid crystal display device is as shown in FIG. 62. 23 is an upper polarising plate, 24 is a lower polarising plate and 25 is a reflecting plate. Next, the basic operation will be described. Incoming light 30, 31 is polarised by passing through the upper polarising plate 23. After this, its optical properties are changed within the liquid crystal layer in portions where voltage is applied (in this case, assumed to be regions sandwiched between transparent electrode 26 and transparent electrode 28) and portions where no voltage is applied (in this case, assumed to be regions sandwiched by transparent electrode 27 and transparent electrode 28) and, as a result, the axes of polarisation of respective polarised beams 30 and 31 assume practically mutually orthogonal orientations before they reach the lower polarising plate 24. By optimally setting the orientation of the polarisation axis of lower polarising plate 24, as shown in FIG. 62, incoming beam 30 is absorbed by this polarising plate 24 producing a black display appearance, while incoming light 31 passes through this lower polarising plate 24 and is reflected by reflecting plate 25 so that, by once more passing through lower polarising plate 24, it is output to the outside through liquid crystal layer 29 and upper polarising plate 23. The display appearance of portions where voltage is applied is therefore white (or, more specifically, grey). The above action is common to all of the liquid crystal layers, whether of TN type, STN type or ferroelectric type, described above. A detailed description of the principles of the operation is given in reference 1 ("Liquid Crystal Device Handbook", published by the Japanese Institute for the Advancement of Technology (Nippon Gakujutsu Shinkokai) No. 142, published by Nikkan Kogyo Shinbunsha page 303–386). An important challenge in regard to reflective type liquid crystal display devices is how to implement a bright reflective type display device. In current reflective type liquid crystal display devices as described above, although a reasonably satisfactory black colour is displayed in the black display portions, the white display portions completely fail to attain the whiteness of ordinary paper, producing a display that is extremely difficult to view in slightly ill-lit locations. The reasons why this desired white display cannot be obtained are as follows:

(1) About 60% of the incoming light 31 is absorbed by upper polarising plate 23, so that only the remainder of about 40% of the light reaches liquid crystal layer 29.

(2) Furthermore, at lower polarising plate 24, about 5% of the light is absorbed, and then, at reflecting plate 25 abut 10% is absorbed, then, at lower polarising plate 24 about 5% is again absorbed, and at upper polarising plate 23 about 5% is absorbed. As a result, the intensity I of the light 32 returning to the outside as white light is:

$$I \cong 0.40 \times 0.95 \times 0.9 \times 0.95 \times 0.95 \times I0 \qquad (1)$$

$$\cong 0.3 \times I0$$

(where I0 is the intensity of the incoming light 31).

As a result, a screen of brightness only about 30% that of the incoming light is obtained. Thus, compared with paper, which displays a white colour having a reflected brightness of 70–80% of the incoming light, the conventional reflective type liquid crystal display device was a display device which was dark and difficult to view.

Figure 63:
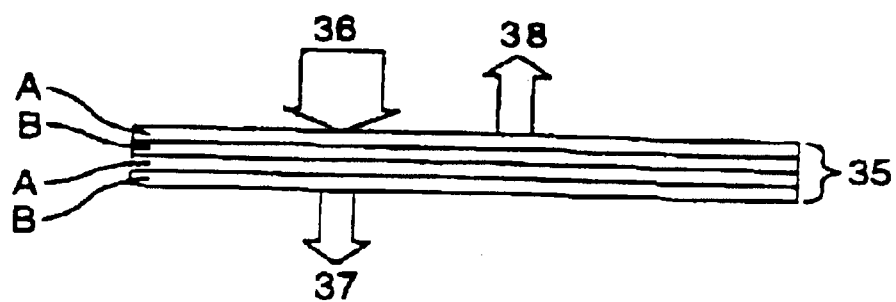
FIG. 63 is a cross-sectional view for purposes of functional description of a polarisation separating plate used in the present invention.

However, recently, if polarisation separating plates having a polarisation separating function as shown in reference example 1 (PCT WO 95/17692) and reference example 2 (J. Phys, D: Appl. Phys. Vol. 8, 1975, p 1441–1448) are employed instead of reflecting plate 25, the intensity of the output light can in principle be raised to about 36% of the incoming light; this represents an improvement in brightness of about 20% compared with the conventional reflective type liquid crystal display device shown in FIG. 62. It is hoped that this will represent a promising reflective type liquid crystal display device in the future. FIG. 63 is an example of a novel polarisation separating plate based on the above reference example 1 and is a functional diagram of a multi-layer film polarising reflecting plate. This multi-layer film polarisation reflecting plate 35 comprises a multi-layer film of more than 100 layers (in FIG. 63, only four layers are shown) in which transparent films of two types, A and B are alternately laminated. This multi-layer film polarisation reflecting plate 35 has a polarisation separating function whereby, of the light 36 that is input from the top of multi-layer film polarisation reflecting plate 35, it transmits (37) only one polarisation component (S wave or P wave) and reflects the other polarisation component (P wave or S wave) (38). It is therefore clear that, in contrast to the conventional polarising plate, light is not absorbed, and the light can be efficiently utilised.

Figure 64:
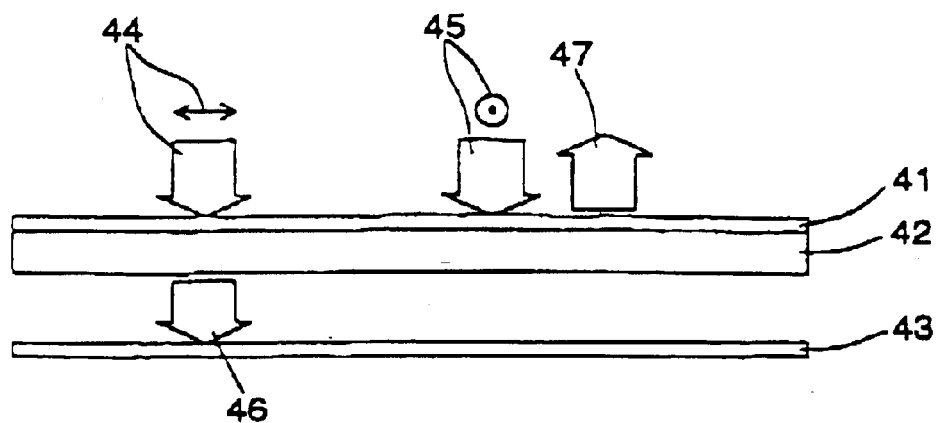
FIG. 64 is a cross-sectional view for purposes of functional description of a further polarisation separating plate used in the present invention.

FIG. 64 is an example of a further polarisation separating plate based on reference example 2 above; this has a structure in which a ¼ wavelength plate 41, cholesteric liquid crystal layer 42 and optical absorption plate 43 are laminated. Its function is the same as that of the multi-layer polarisation reflecting plate described above; one polarisation component 44 (in this case, light having a polarisation axis parallel to the plane of the figure) is transmitted (46) through ¼ wavelength plate 41 and cholesteric liquid crystal layer 42, reaching optical absorption layer 43 underneath. The other polarisation component 45 (light having a polarisation axis perpendicular to the plane of the figure) is reflected by ¼ wavelength plate 31 and cholesteric liquid crystal layer 42, becoming reflective light 47. For the detailed principles of the polarisation separation described above, reference examples 1 and 2 mentioned above should be referred to.

Figure 65:
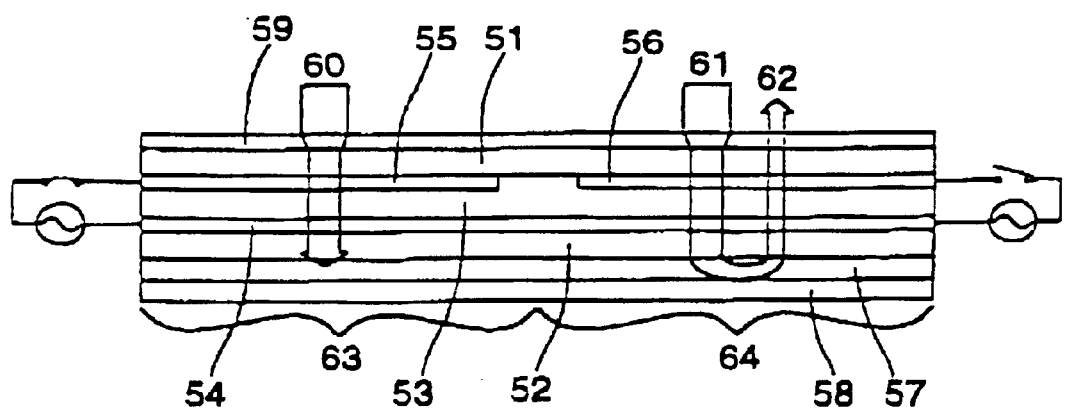
FIG. 65 is a cross-sectional view showing a diagram of a reflective type liquid crystal display device using a polarisation separating plate used in the present invention.

FIG. 65 is a cross-sectional view of a reflective type liquid crystal display device using this polarisation separating plate. 51 and 52 are respectively upper and lower circuit boards and have transparent electrode films 55, 56 and 54 on mutually opposite faces. The multi-layer film polarisation separating plate described above is employed here, 59 being an upper polarising plate, 53 a liquid crystal layer and 57 a polarisation separating plate. Of course, the basic action would be unaltered it a polarisation separating plate consisting of a combination of the ¼ wavelength plate described above with a cholesteric liquid crystal layer were employed instead. 58 is a light-absorbing part which can have any desired colour such as red, green or blue apart from black. Next, the display action will be described. Incoming beams 60, 61 are converted to polarised light by upper polarising plate 59 and respectively advance in liquid crystal layer 53. As described above, the optical condition of this liquid crystal layer 53 is different in region 63 in which voltage is applied and region 64 in which voltage is not applied, so respective incoming beams 60 and 61, after passing through this liquid crystal layer 53, reach this multi-layer film polarisation reflecting plate 57 with polarisation in which their respective polarisation axes are directed approximately mutually at right angles. The optic axis of this multi-layer film polarisation reflecting plate 57 is set such that incoming beam 60 passes unaltered through this multi-layer film polarisation reflecting plate 57 and is absorbed when it reaches light-absorbing part 58. Black i.e. the coloration of light-absorbing part 58 is therefore produced in region 63 in which voltage is applied. In contrast, incoming beam 61 is reflected at multi-layer film polarisation reflecting plate 57 and is output to the outside as output beam 62. Region 64 where voltage is not applied therefore presents a white-coloured appearance (more specifically, a grey appearance). Since in this case multi-layer film polarisation reflecting plate 57 and light-absorbing part 58 are employed instead of lower polarisation plate 24 and reflecting plate 25 in FIG. 62, incoming beam 61 is reflected without undergoing loss due to optical absorption and a reflective type liquid crystal display devise is thereby obtained that is brighter than the conventional display device of FIG. 62. That is, whereas about 60% of the incoming beam 61 was absorbed by upper polarising plate 59, with multi-layer film polarisation reflecting plate 59, the light is reflected unaltered without optical absorption and so can be emitted to the outside as reflected light 62, subjected merely to optical absorption of about 5% by upper polarising plate 59 on its passage therethrough a second time. The intensity of reflected light 62 is therefore indicated by equation (2) below.

$$I \approx 0.4 \times 0.95 \times I0 \approx 0.38 \times I0 \quad (2)$$

where I is the optical intensity of output beam 62 and I0 is the optical intensity of input beam 61).

Even allowing for a further 5% of optical loss due to scattering of light etc. at the polarisation separating plate, a reflective type liquid crystal display device can be obtained in which brightness is improved by about 20% in comparison with equation (1). It is therefore desirable that polarisation separating plates as described above should be employed in future reflective type liquid crystal display devices in place of the conventional lower polarisation plate, in order to improve brightness and ease of viewing. However, there is a considerable problem.

Figure 66:
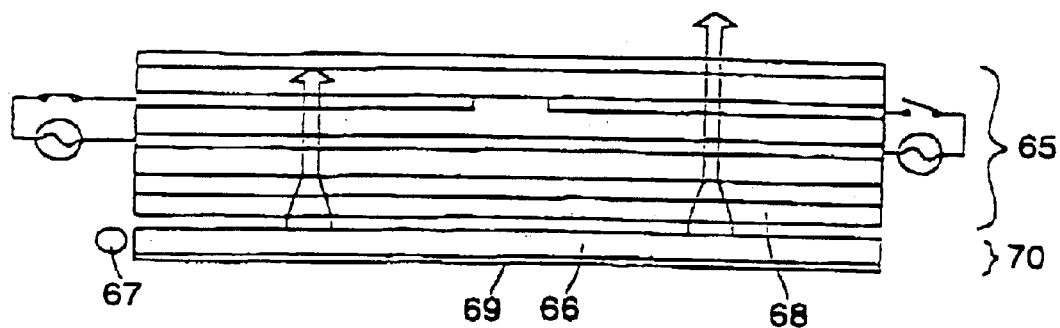
FIG. 66 is a cross-sectional view showing a diagram of a prior art semi-transparent liquid crystal display device.

This is the method of illumination under dark conditions. As described above, in most cases, with a reflective type liquid crystal display device, an illumination device must be mounted on an electronic device such as a watch, portable telephone or data terminal in order to achieve satisfactory display function at night. In order to satisfy this demand, in a conventional reflective type liquid crystal display device as shown in FIG. 62, a semi-transparent type reflecting plate 68 is employed as the reflecting plate of a liquid crystal display device 65 as in the semi-transparent type liquid crystal display device shown in FIG. 66. Many types of such semi-transparent reflective plates 68 have been marketed but typically 80% of the light is reflected and 10% of the light is transmitted (the remaining 10% represents optical absorption loss in the reflecting layer). Consequently, in a well lit environment, the device functions as a reflective type liquid crystal display device in which 80% of the incoming light from the upper face is reflected. In contrast, in a dark environment, the light from a light emitting body 70 arranged at the back face of liquid crystal display device 65 is directed thereonto from the back face through this semi-transparent reflective plate 68 of 10% transparency, enabling the display to be read. The light emitting body 70 arranged at the back face, as shown in FIG. 66, comprises at least a light-guide plate 66 and a reflecting plate 69 arranged at the undersurface like light emitting source 67 arranged at the end of this light-guide 66. As this light emitting body, typically light emitted from a light emitting source 67 is guided into this light-guide plate 66 and is scattered by an optical scattering grating provided on this light-guide plate 66 so that light is output from the upper face of this light-guide plate 66; however, as an alternative type of light emitting body, a planar EL (electroluminescent) light emitting body is often used in watches etc.

Such a light emitting body arranged at the back face cannot be employed in the new improved reflective type liquid crystal display device shown in FIG. 65. The reason is that, as shown in FIG. 65, light from the back face is cut off by the light-absorbing layer 58, so light cannot be introduced into the upper surface. Of course, if light-absorbing layer 58 is made partially transparent (for example optical transmissivity of 10%), back face illumination would be possible in the same way as conventionally; however, there are two problems. The first of these is that since, in reflective display, 100% of the light cannot be absorbed by the black display portions, a rather greyish black display is produced so the display contrast ratio is lowered. Secondly, as is clear from the principles of a polarisation separating plate, white/black display on the display screen is completely inverted (white display→black display, black display→white display) when the light strikes it from the front face and when the light strikes it from the back face; this is not particularly desirable.

As above, with the method of illumination in a dark environment of a reflective type liquid crystal display device in which brightness is improved using a polarisation separating plate, considerable problems remained in that the conventional back face illumination method cannot be used. Accordingly, in a bright reflective type liquid crystal display device in which a polarisation separating plate as described above is employed instead of the conventional lower polarisation plate and reflecting plate, the use of front lighting as shown in Early Japanese Patent Publication No. H.6-289391 or Early Japanese Patent Publication No. H6-324331 i.e. an illumination device of the transparent type arranged at the front face of the liquid crystal display device is advantageous in achieving a display reading function in a dark environment.

On the other hand, as light emission sources for liquid crystal display devices employed in small-size portable electronic devices such as portable telephones, watches, cameras or data terminals as described above, point light sources such as LEDs (light emitting diodes) or electric light bulbs are widely used. In comparison with the fluorescent tubes which were employed conventionally, these do not require special voltage step-up devices and are lightweight and compact; also, they have excellent safety since they do not use high frequencies or high voltages and do not constitute sources of radio interference. Also, power control is easy and they can easily cope with low power consumption applications. In particular the life of LEDs is semi-permanent and, regarding colour, recently, red, green, blue, mixtures of these, and white have become possible. If electric light bulbs are employed, their life is short, but they are cheap and can easily be replaced. For these reasons, point light sources such as LEDs or electric light bulbs are most preferred as light sources for illuminating the displays of small-size portable devices as described above.

Accordingly, when a light-guide plate (FIG. 2A is a partial cross-sectional view and FIG. 28 is a perspective view of the whole) using rib-shaped projections as shown in FIG. 2A and FIG. 2B described above in a front-lighting arrangement shown in Early Japanese Patent Publication No. H.6-289391 and Early Japanese Patent Publication No. H.6-324331 as described above and front lighting in which a point light source such as an LED or electric light bulb was arranged as light emitting source at the end of this light-guide plate were employed, it was found that, since the intersecting line section of optical output face 13 of light-guide plate 11 and side face 15 of projections 12 has, in construction, a minute curved surface, some reflected light 19c leaks towards face 17 opposite the optical output face (i.e. towards the observer) and this can be observed by the observer as bright points. As shown in FIG. 2B, if projections 12 are in the form of ribs so that these intersection line portions are straight lines, point light source 14, the aforesaid bright points, and the observer are arranged in the same plane so that specific positions on the light-guide plate appear to the observer as bright points; these bright points appear at the root of the rib-shaped projections and so, overall, appear to generate continuous bright lines and these bright lines move with movement of the observer's eyes. It has been found that these severely effect the recognisability of a reflective type liquid crystal display device in which the illuminated object is arranged below this front lighting.

Accordingly, in a display device according to the seventeenth to twenty-eighth embodiments, in a bright reflective type liquid crystal display device employing a polarisation separating plate as described above, an object is to prevent the occurrence of these bright lines produced by regular reflection at the root of the rib shapes generated when a point light source such as an LED or light bulb is used as the light emission source, using front lighting as the means for illumination, and furthermore to solve the problem of eliminating unevenness of illuminance produced by one-dimensional arrangement of the projection pattern owing to the light source being a point light source; also, an object is to provide a liquid crystal display device wherein power consumption can be saved by using a point light source and which is provided with means for illumination of high quality and furthermore to provide various types of electronic devices such as portable telephone devices, watches, cameras, or data terminal devices wherein the display section is provided with such a liquid crystal display device.

Against the above background, a seventeenth embodiment will now be described.

Figure 61A:
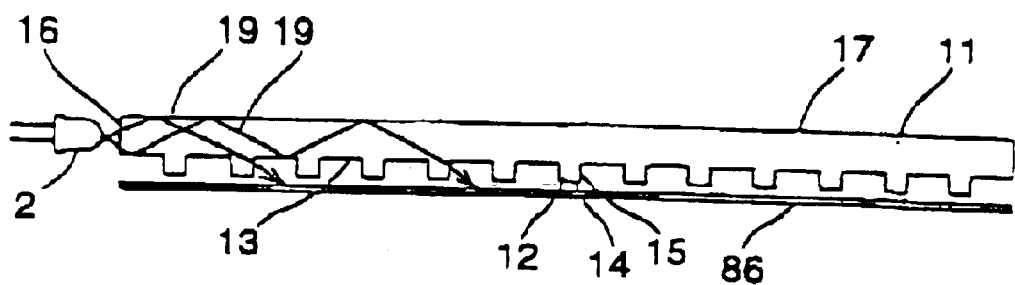
FIG. 61A and FIG. 61B are a diagrammatic cross-sectional view and perspective view showing a seventeenth embodiment of the present invention.
Figure 61B:
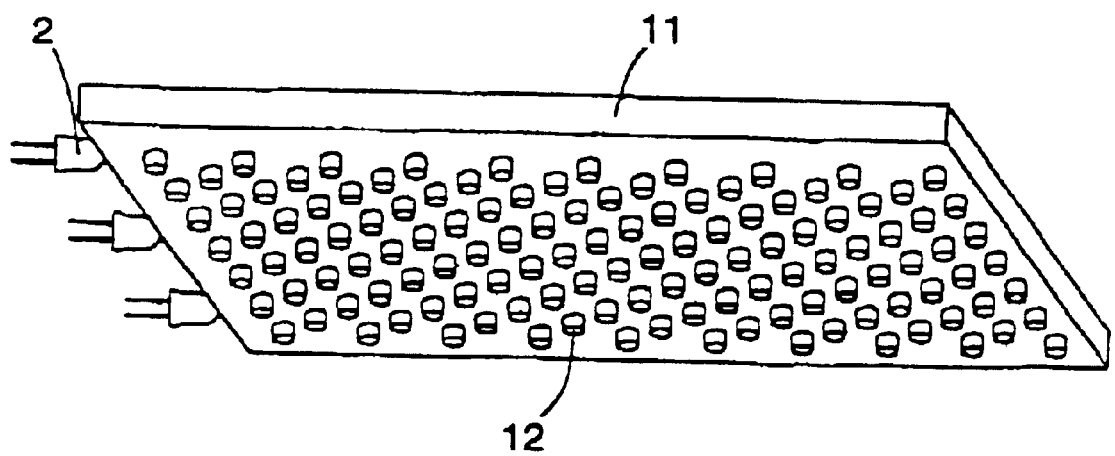

FIGS. 61A and 61B are a cross-sectional view and external view of a front light in accordance with the present invention; one or a plurality of point light sources 2 are arranged at an end face of light-guide plate 11. As shown in FIG. 61B, light-guide plate 11 is provided with projections 12 on one face of the transparent plate, all the faces of projections 12 being constituted by faces (bottom faces 14) approximately parallel with optical output face 13 and faces (side faces 15) approximately perpendicular thereto. Light-guide plate 11 is formed by transparent material of refractive index above about 1.4. After the optical flux from point light sources 2 has been input from end face 16 as shown by ray 19a and ray 19b, it undergoes repeated total reflection within light-guide plate 11 until it reaches a side face 15 of a projection 12; it can only be output therefrom, so the optical output from the bottom face of the illumination device is large and can effectively illuminate illuminated body 86 (this is a reflective type liquid crystal display device wherein a polarisation separating plate as described above is arranged underneath. Herein below, in the present embodiment, "illuminated body" indicates this reflective type liquid crystal display device).

As the transparent material forming light guide plate 1, for example the name material as described above may be employed.

Also, as point light sources 2, light emitting diodes (LEDs) or electric light bulbs etc. may be employed.

In accordance with the above construction, this illumination device is arranged at the front face of illuminated body 86; part-time illumination can be achieved in that illuminated body 86 can be observed with illumination turned off in well lit locations where there is sufficient external light (in this case, this light-guide plate 11 has the same external appearance as if it were a transparent plate arranged on illuminated body 86; it has been confirmed that it has scarcely any effect on the display performance of the illuminated body) and illuminated body 86 can be observed with the illumination lit in dark locations where there is insufficient external light.

Furthermore, in this embodiment, a plurality of point-shaped optical diffusion portions 12 are provided at the bottom face of light-guide plate 11; by making their shape approximately cylindrical like that of the projections, the bright points which constituted a problem as described above can be uniformly distributed within the light-guide plate 11 and it has been confirmed that, in this way, the intense straight bright lines that impaired ease of viewing of the display as mentioned above are not produced. Furthermore, it has been confirmed that uniform recognisability is obtained irrespective of viewing position.

Also, as described above, with the conventional reflective type liquid crystal display device in which a semi-transparent reflective plate is employed, brightness of the reflective type display is sacrificed and, since even in night-time illumination illumination is still effected from the back face through this semi-transparent reflective plate, only about 10% or less of the energy of the light emitted by the illumination source contributes to illumination, so there is considerable waste of energy, resulting in the problem in particular of reduced battery life of electronic devices that rely on batteries as an energy source such as for example portable telephones, watches, cameras or data terminal devices; however, if a front light in accordance with the present invention is employed, since 50% or more of the illumination energy can be utilised as illuminating light, an effective means is provided of extending battery life of such electronic devices.

With an electronic device having in the display section a liquid crystal display device having a front light as above, compared with the prior art electronic device having a liquid crystal display device using a semi-transparent reflective plate, an electronic device can be provided in which a bright reflective display is obtained during the day time and having bright, uniform display illumination with no generation of specific bright lines in which saving of power consumption can be achieved due to a high utilisation rate of the energy required for illumination at night.

Regarding the size of projections 12 (diameter of the bottom face 14 of the cylinders), since the wavelength of visible light is about 380 nm to 700 nm, in order to avoid diffraction effects, it is desirable that this should be at least about 5 $\mu$m in order that projections 12 should not be so large as to be noticeable to the naked eye should be less than about 300 $\mu$m. In addition to this, from the point of view of convenience in manufacture, the size of the projections should desirably be at least about 10 $\mu$m and below 100 $\mu$m. Also, since the angle of elevation of the rays within light-guide plate 11 with respect to the plane direction (angle that the rays make with the plane (plane of 13 or 17 in FIG. 61A)) is less than 45°, the ratio of the height and width (diameter of bottom face 14 of the cylinder) of projections 12 can be one-to-one or less; in fact, since rays of angle lees than 20° represent more than 90%, satisfactory performance is exhibited down to about 1 to 2.

Eighteenth Embodiment

Figure 67:
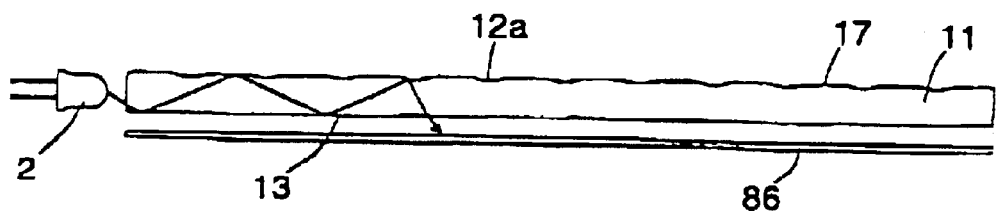
FIG. 67 is a diagrammatic cross-sectional view given in explanation of an eighteenth embodiment of the present invention.

In FIG. 67, concave shapes 12a are provided on the side of face 17 opposite to the optical output face of light-guide plate 11. Concave shapes 12a can have any desired size or shape (pyramidal, conical, spheroidal or spherical etc.); they have the function of converting flux arriving at these concave shapes 12a into flux having a large angle of elevation with respect to the plane of light-guide plate 11; however, it has been found that good performance is obtained by making them approximately spherical surfaces of centre angle less than 90°.

Flux fed into light-guide plate 11 from point shaped light source 2 is guided by repeated total reflection within light-guide plate 11; however, since concave shapes 12a are provided in face 17 opposite to the optical output face of light-guide plate 11, flux reaching these is converted into flux having a large angle of inclination with respect to the plane of light-guide 11 and so can be output from optical output face 13. By arranging illuminated body 86 on the optical output face 13 of light-guide plate 11, this construction can function as planar illumination. Also, since the rest of the surface of face 17 opposite to the optical output face i.e. apart from the concave shapes is parallel with optical output lace 13, it provides a perpendicular beam transmission function of transmitting rays in respect of light from a direction intersecting the flat plate (i.e. light from above or below). Consequently, when the liquid crystal display is observed by external light with the point light source 2 turned off in a bright environment, light-guide plate 11 appears practically the same as a transparent flat plate and so cannot particularly adversely affect the appearance of the display. These concave shapes 12a can be provided in any desired area ratio with respect to the area of the illumination section. However, although illumination efficiency can be raised by increasing the area ratio of concave shapes 12a, this lowers the proportion of perpendicularly transmitted rays, and so adversely affects recognisability of the display. In fact it is not realistic to set an area ratio of above 50% and for part-time illumination under dark conditions an area ratio of about 10% may suitably be set. Also, if the density is regulated in order to achieve uniform illumination brightness as described above, if the ratio is about 10%, the area ratio of the perpendicular transmission section is in a range of about 80–90% so unevenness in regard to recognisability dependent on position is not experienced.

Regarding the size of concave shapes 12a (diameter or maximum diameter), since the wavelength of visible light is from about 380 nm to about 700 nm, this should be at least about 5 $\mu$m in order to avoid diffraction effects and should desirably be less than about 300 $\mu$m if concave shapes 12a are not to be so large as to be noticeable with the naked eye. In addition to the above, from the point of view of convenience in manufacture, it is desirable that the size of the concave shapes should be above about 10 $\mu$m and less than about 100 $\mu$m. In this embodiment also, the bright points that were mentioned above as constituting a problem are uniformly distributed within the plans of the light-guide plate 11 and the intense bright straight linen that impair ease of viewing of the display that were mentioned as being a problem were not observed to appear. Furthermore, it was confirmed that uniform recognisability was obtained irrespective of viewing position. In particular in this embodiment it was found that the angle of incidence of rays output to illuminated body 86 was closer to perpendicular than in the case of the light-guide plate shown in the seventeenth embodiment, so illumination efficiency was further improved.

With an electronic device having in the display section a liquid crystal display device having a front light as above, compared with an electronic device having a liquid crystal display device using a conventional semi-transparent reflecting plate, an electronic device can be realised whereby during the day time a bright reflective display can be obtained and during the night having uniform bright display illumination with no specific bright lines being generated and little power required for the illumination.

Nineteenth Embodiment

Figure 68:
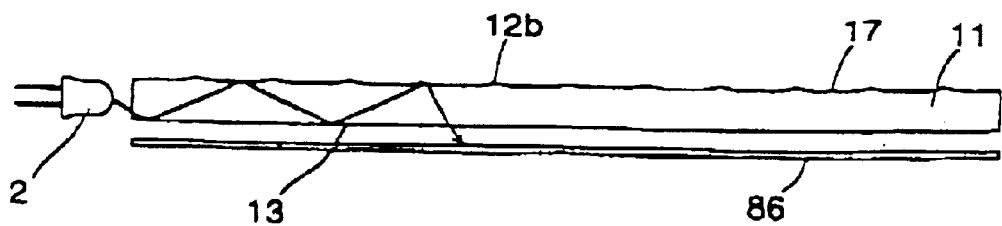
FIG. 68 is a diagrammatic cross-sectional view given in explanation of a nineteenth embodiment of the present invention.

In FIG. 68, convex shapes 12b are provided on side 17 opposite the optical output side of light-guide plate 11. Convex shapes 12b may have any desired size or shape (pyramidal, conical, spheroidal, or spherical etc.) and have the function of converting optical flux arriving at these convex shapes 12b into optical flux having a large angle of elevation with respect to the plane of light-guide plate 17; however, it has been found that excellent characteristics are displayed by making these approximately conical surfaces of apex angle less than 120°. The density and size of convex shapes 12b are in accordance with those for the concave shapes described above. In this embodiment also, the aforementioned bright points are uniformly distributed on the surface of light-guide plate 11 and no intense linear bright lines which impair ease of viewing of the display and created a problem as described above are observed to be generated. It has also beers confirmed that uniform recognisability is obtained irrespective of viewing position. Also it was found that the illumination efficiency was improved compared with the seventeenth embodiment in the same way as in the eighteenth embodiment.

With an electronic device having in its display section a liquid crystal display device having a front light as described above, in comparison with an electronic device having a liquid crystal display device employing a conventional semi-transparent reflective plate, an electronic device can be realised having a bright display illumination that is uniform with no specified bright lines being generated and wherein a bright display is obtained during the day and little power is required for illumination-at night.

Twentieth Embodiment

Figure 69:
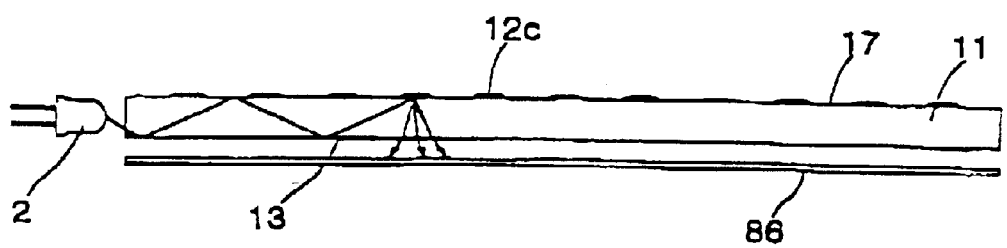
FIG. 69 is a diagrammatic cross-sectional view given in explanation of a twentieth embodiment of the present invention.

In FIG. 69, an optical diffusion member layer 12c is provided on face 17 opposite to the optical output face of light-guide plate 11. Optical diffusion member layer 12c can have any desired size, and shape and has the function of converting optical flux arriving at this optical diffusion member layer 12c into optical flux having a large angle of elevation with respect to light-guide plate 11. Specifically, [the members of] this optical diffusion member layer 12c has an optical diffusion function in respect of optical output face 13 and optical screening capability in respect of the face opposite to the optical output face. It can be further clad with an optical screening layer to protect optical screening capability. The density and size of optical diffusion member layer 12c are in accordance with those of concave shapes described above.

In this embodiment also, it was found by observation that the bright points described above are uniformly distributed on the surface of light-guide plate 11 and intense linear bright lines that impair ease of viewing of the display and presented a problem as described above are not generated. Furthermore, it was confirmed that uniform recognisability can be obtained irrespective of viewing position.

Also, it was confirmed that, with an electronic device using the front light shown in this embodiment, the benefits of brightness and power saving illumination can be obtained in the same way as in the embodiments described above.

Twenty-first Embodiment

Figure 70:
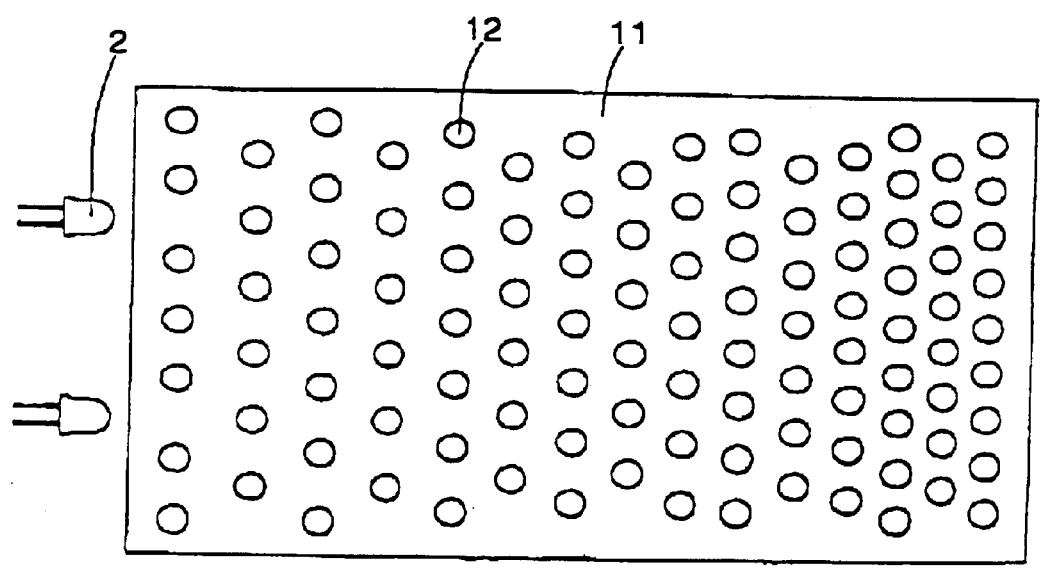
FIG. 70 is a diagrammatic plan view given in explanation of a twenty-first embodiment of the present invention.
Figure 71:
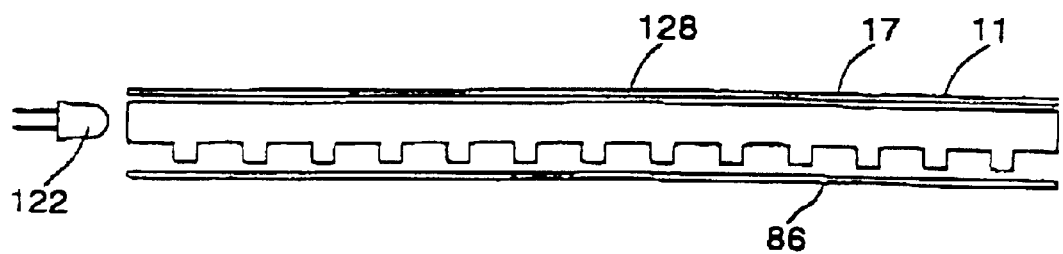
FIG. 71 is a diagrammatic cross-sectional view given in explanation of a twenty-second embodiment of the present invention.

FIG. 70 shows an example in which, on light-guide plate 11, optical extraction shapes 12x of point shape as described above are distributed sparsely in the vicinity of point light sources 2 and more densely going away from point light sources 2. Although the optical flux density in light-guide plate 17 in the vicinity of point light sources 2 is high, the rays are diffused by optical extraction shapes 12x, so that as distance from point light sources 2 is increased the optical flux density falls; optical extraction shapes 12x are therefore arranged with progressively greater density. More uniform illumination can thereby be obtained.

With this embodiment also, it was found that the bright points described above were uniformly distributed on the surface of light-guide plate 11 and the intense linear bright lines that impair ease of viewing the display and which previously created a problem are not generated. Furthermore, it was found that uniform recognisability is obtained irrespective of viewing position. Thus, with an electronic device using a front light according to this embodiment, the same benefits were confirmed.

Twenty-second Embodiment

Figure 72:
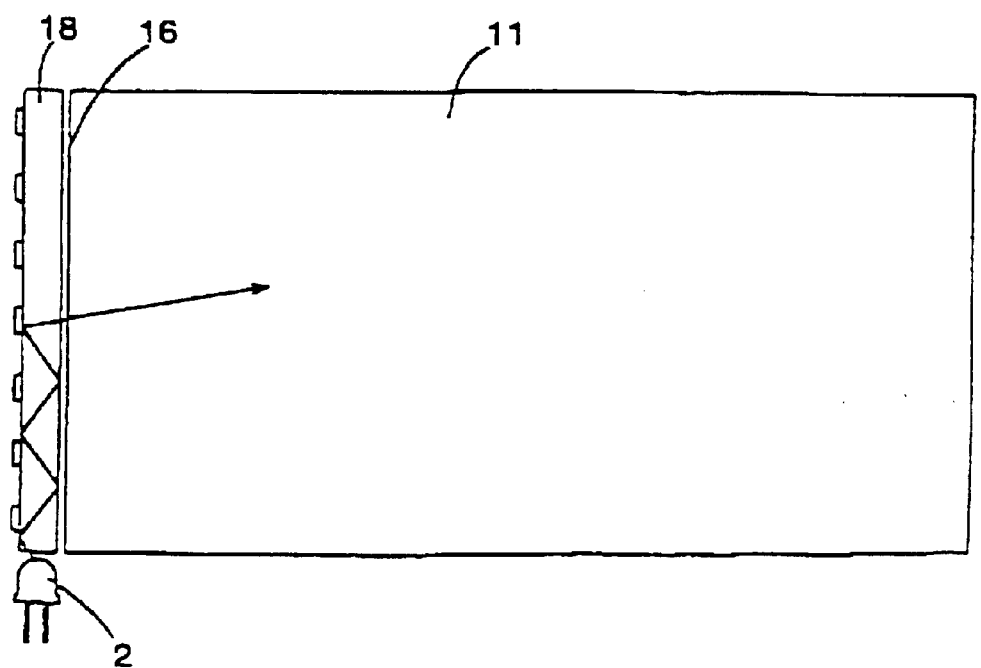
FIG. 72 is a diagrammatic plan view given in explanation of a twenty-third embodiment of the present invention.

In FIG. 72, a transparent plate or transparent sheet 128 is arranged at face 17 opposite the optical output face of light-guide plate 11. Light-guide plate 11 and transparent plate or transparent sheet 128 are not stuck together but have an air layer between them. If there is even only slight damage to the surface of light-guide plate 11, the rays that are being guided through its interior are reflected and the damage can be recognised as bright points or bright lines from the surface. Not only are these unattractive as illumination arranged at the front face of illuminated body 86 but they also severely lower recognisability due to lowered display contrast. However, since an air layer is interposed between transparent plate or transparent sheet 128 and light-guide plate 11, optical flux from light sources 2 cannot enter therein, so even if there is damage thereto, this cannot appear as bright points or bright lines. Also in this case, since the relative area of the damage is very small, there is very little effect in terms of recognisability on illuminated body 86. In order for this light-guide plate 11 to be used for front face illumination, the presence of such a transparent plate or transparent sheet 128 is desirable. As transparent plate or transparent sheet 128, transparent resin such as acrylic resin, polycarbonate resin, or amorphous polyolefin resin, or inorganic transparent material such as glass may be employed.

It should be noted that if this transparent sheet 128 is made to also serve the purpose of a transparent cover plate for protecting the liquid crystal display section typically used in electronic devices such as portable telephone devices, watches, cameras or data terminal devices, the number of components can be reduced and lowering of the performance of the reflective display due to surface reflection can be reduced, which is desirable.

Twenty-third Embodiment

In FIG. 73, a rod-shaped optical diffuser 18 is arranged as a light-guide at at least one end face of light-guide plate 11; furthermore, point light sources 2 are arranged at the end face of rod-shaped optical diffuser 1318. Rod-shaped optical diffuser 1318 has the function of dispersing the optical flux from the surface of the rod-shaped diffuser 18 uniformly to produce a linear light source, by means of optical diffusion shapes arranged at its surface and diffusion members kneaded into its interior. Light that is input from the surface of rod-shaped optical diffuser 18 is guided to the end face 16 of light-guide 11 and is guided within light-guide plate 11. Optical extraction shapes as described above are formed on the surface of light-guide plate 11, but, even if the optical extraction shapes are rib shapes or cylindrical shapes as shown in Early Japanese Patent Publication No. H.6-289391 or Early Japanese Patent Publication No. H.6-324331, it has been confirmed that bright points at specific positions as when a point light source is directly shone thereon as shown in FIG. 2B cannot appear.

Figure 73A:
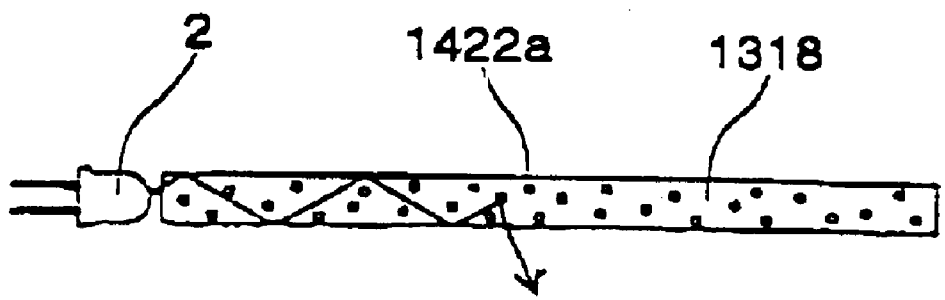
FIG. 73A and FIG. 73B are diagrammatic cross-sectional views of a modification of the twenty-third embodiment.
Figure 73B:
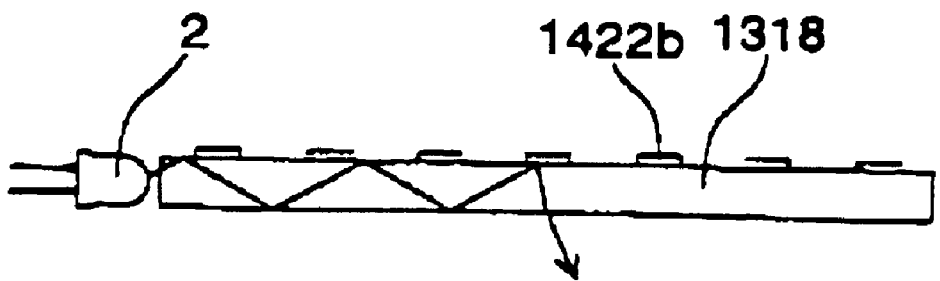

In rod-shaped optical diffuser 1318, as in FIG. 73A, transparent bodies 1422a having different refractive index are kneaded into the transparent resin, or an optical diffusion pattern 1422b could be formed by printing on the surface of transparent rein as in FIG. 73B.

Figure 74:
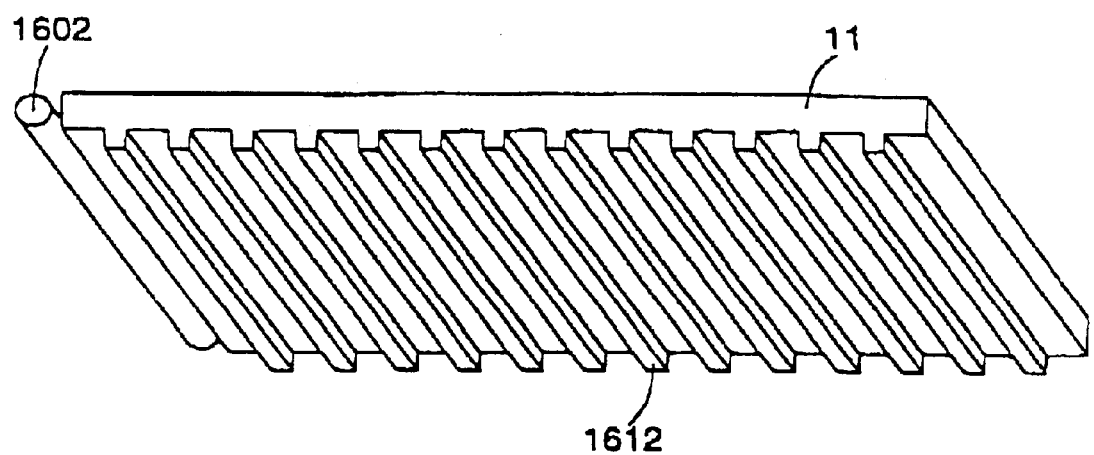
FIG. 74 is a diagrammatic cross-sectional view of a modification of the twenty-third embodiment.

FIG. 74 shows a front light comprising a rod-shaped optical diffuser 1602 like those shown in FIG. 73A or 73B and a light-guide plate 11 having rib shaped projections 1612; apart from these, point light sources much as LEDs are arranged at the end faces of this rod-shaped optical diffuser 1602, though these are not shown in the drawing. As described above, light from the side face of rod-shaped optical diffuser 1602 is output practically uniformly and input into light-guide plate 11 and illuminates the illuminated object by being output downwards from the side faces of the rib shaped projections. In this way, since the light from the point light sources is converted as it were into a linear light source by means of the rod-shaped optical diffuser before being input to light-guide plate 11, a bright front light can be realised that is uniform with no production of bright points or bright lines such as were a problem as described above, even with a light-guide plate having rib shaped projections.

Twenty-fourth Embodiment

Figure 75:
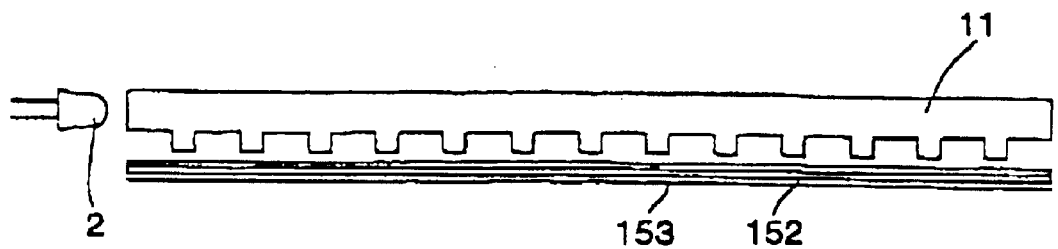
FIG. 75 is a diagrammatic cross-sectional view given in explanation of a twenty-fourth embodiment of the present invention.

The above description was given with reference to embodiments of various types of front light according to the present invention; however, FIG. 75 shown an embodiment in which a front light based on the specific examples described above is mounted on a reflective type liquid crystal display device having a polarisation separating plate underneath. Light-guide plate 11 together with point light sources 12 arranged at its end are arranged at the front face of liquid crystal display panel 152. A reflective type liquid crystal display device is constituted by arranging 153 consisting of a coloured optical absorption layer and the polarisation separating plate at the back face of liquid crystal display panel 152. Light-guide plate 11 has the function of directing rays to liquid crystal-display panel 152 and of transmitting with scarcely any dispersion rays reflected by polarisation separating plate 153. Also, when there is sufficient external light, it is used with light sources 12 extinguished and in this case light-guide 11 functions simply as a transparent plate; it therefore does not impair recognisability and has little effect on display quality.

With a reflective type liquid crystal display device according to this embodiment, since a light-guide plate in accordance with the embodiments described above is employed, no bright lines are generated on illumination such as previously caused problems and a reflective type liquid crystal display device is obtained wherein the display is bright and easy to recognise.

Whereas, with a conventional transparent type liquid crystal display device in which an illumination device is arranged at the back face of the liquid crystal display panel, light-dark contrast is obtained by rays from the illumination device that are transmitted once only through the liquid crystal display panel, with the reflective type liquid crystal display device wherein, as in the present invention, the illumination device is arranged at the front of the liquid crystal display panel, after the rays from the illumination device have passed once through the liquid crystal display panel they are reflected by the reflecting plate and pass therethrough once again, so this is beneficial in that higher recognisability is obtained due to better contrast.

Furthermore, with the conventional semi-transparent liquid crystal display device in which a light emitting body is arranged at the back face, as described above, since illumination is effected from the back face through the semi-transparent reflecting plate of transmissivity about 10%, only about 10% of the illumination light contributes to illumination of the liquid crystal display device. In comparison, when this front light is employed, more than 50% of the illumination light can contribute to illumination of the reflecting type liquid crystal display device, thereby enormously improving the energy utilisation efficiency as enabling power to be reduced. This is particularly beneficial for miniature portable electronic devices whose energy sources are chiefly batteries.

Twenty-fifth Embodiment

Figure 76:
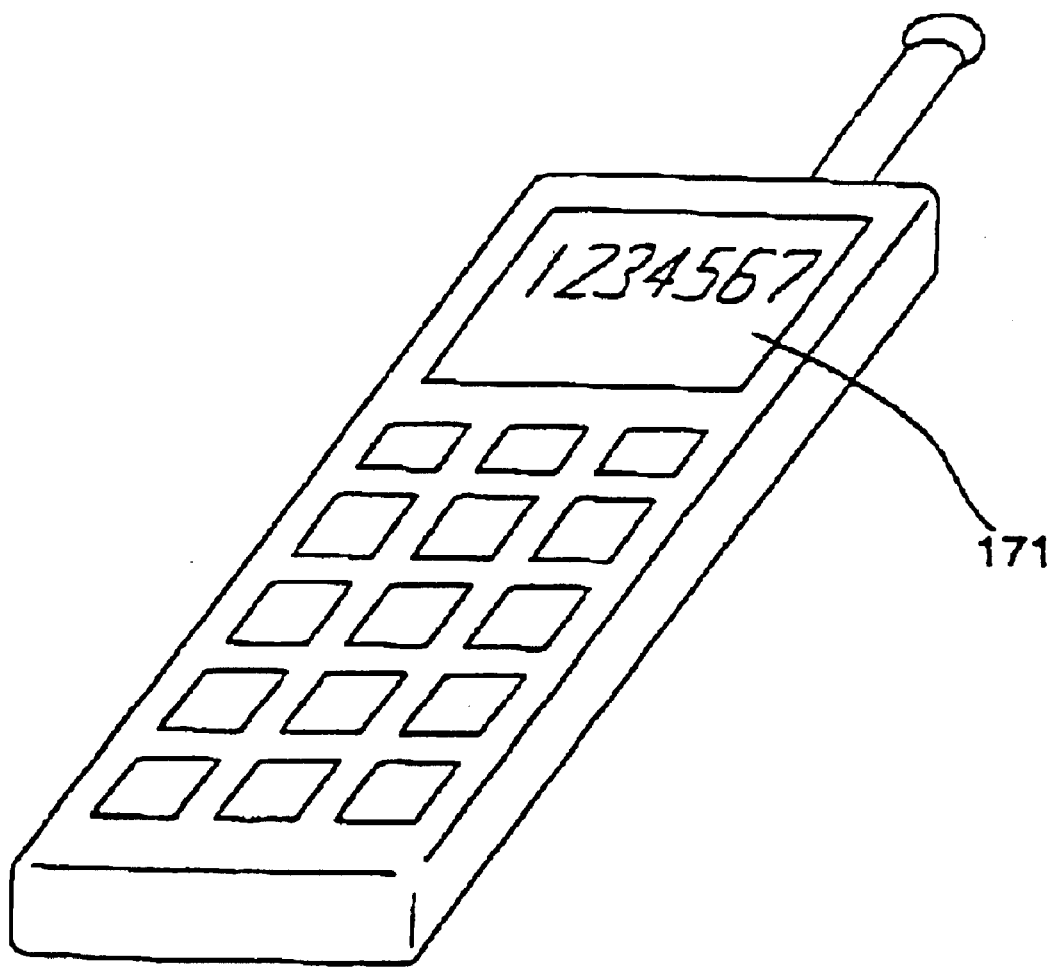
FIG. 76 is a perspective view showing an example of a display device according to a twenty-fifth embodiment of the present invention.

FIG. 76 shows a portable telephone device wherein there is mounted a liquid crystal display device 171 comprising a bright reflective type liquid crystal display in which a polarisation separating plate and optical absorbing layer as described above are employed instead of the conventional lower polarising plate and reflecting plate, and a front light according to any of embodiments 17 to 24 illustrating the present invention arranged on the top face of this liquid crystal display.

In a bright environment, a bright and easy to view display appearance is obtained by means of external light by turning off the front light light source, while, in a dark environment, display reading can be achieved by lighting the light source of this font light. In this case, power consumption can be restricted and the battery life lengthened since, as mentioned above, the display screen can be illuminated with little power compared to the conventional semi-transparent type liquid crystal display device. Furthermore, as mentioned above, night-time illumination can be achieved which is bright and easy to view and also uniform with no production of bright lines even though, point light sources such as LEDs or electric light bulbs are employed.

Twenty-sixth Embodiment

Figure 77:
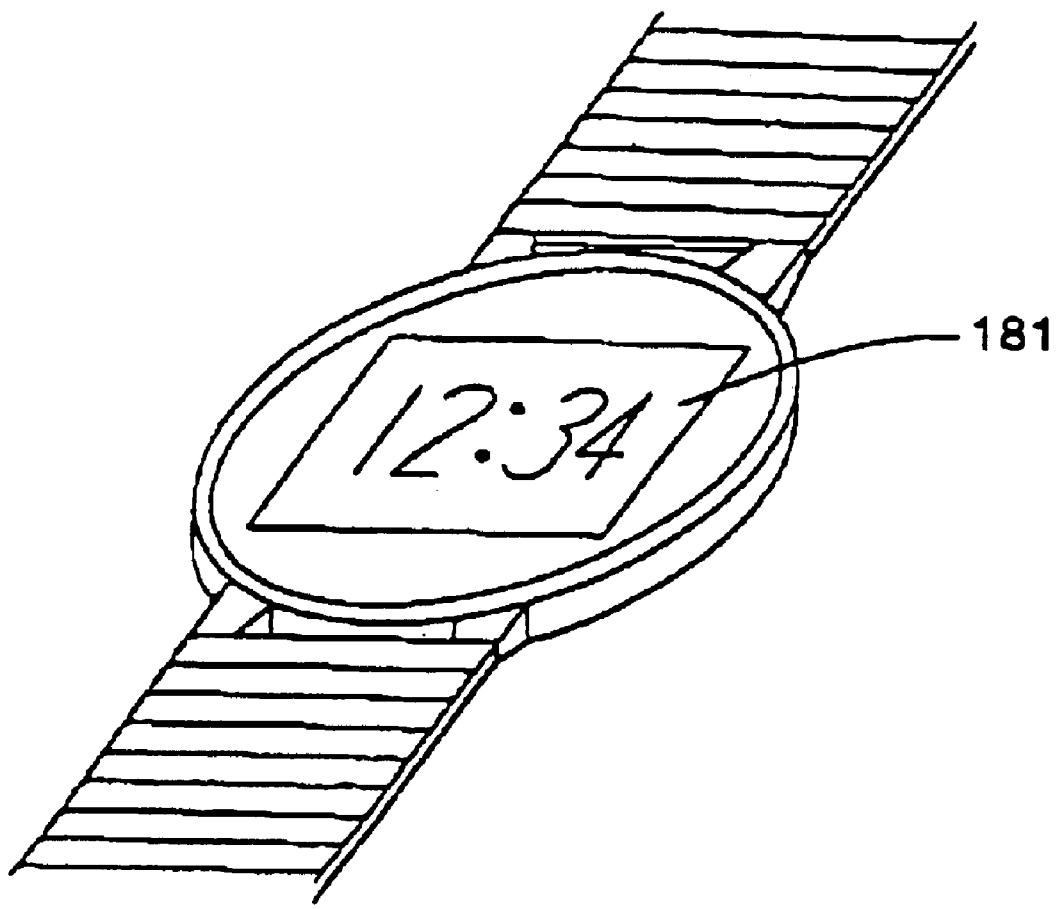
FIG. 77 is a perspective view showing a further example of a display device according to a twenty-sixth embodiment of the present invention.
Figure 78:
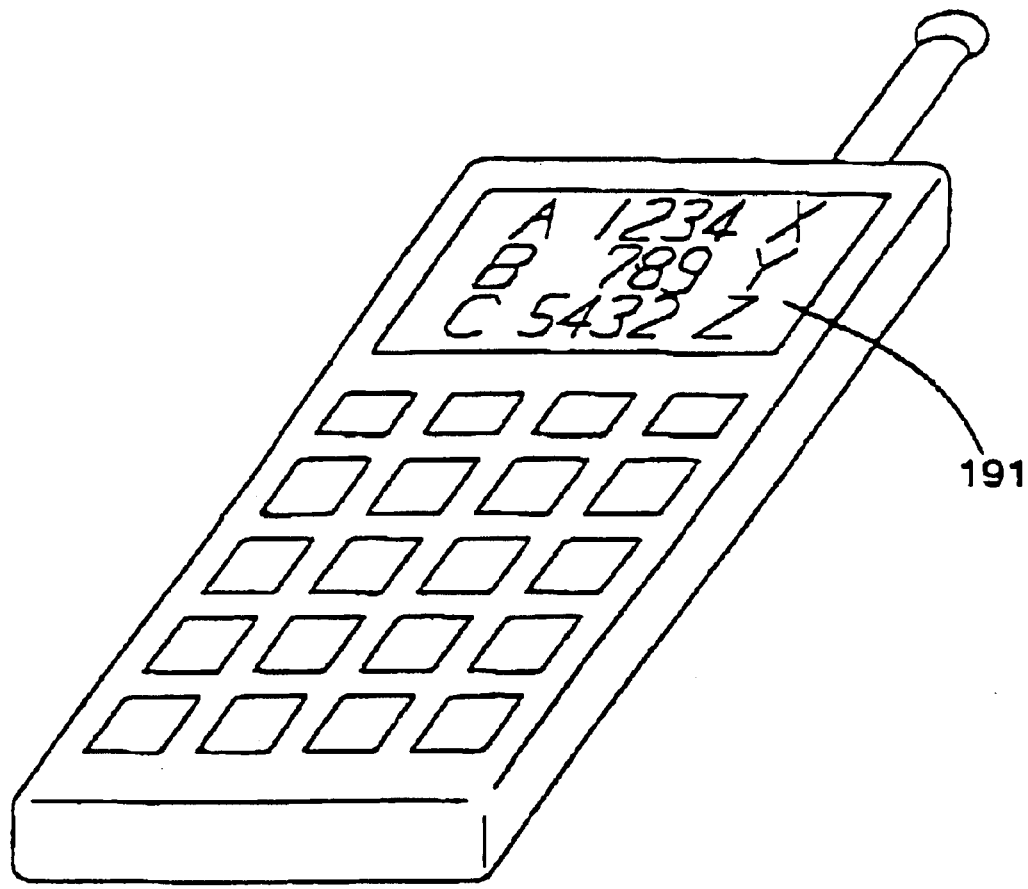
FIG. 78 is a perspective view showing a further example of a display device according to a twenty-seventh embodiment of the present invention.

FIG. 77 shows a watch on which is mounted a liquid crystal display device 181 comprising a bright reflective type liquid crystal display in which a polarisation separating plate and optical absorption mirror as described above are employed instead of the prior art lower polarising plate and reflecting plate, and a front light as shown in any of embodiments 17 to 24 arranged on the front face of this liquid crystal display. In this embodiment also, a watch can be realised wherein [the display] is uniform and easy to view without bright lines being generated as described above, and wherein power consumption can be restricted and battery life extended.

Twenty-seventh Embodiment

Figure 79:
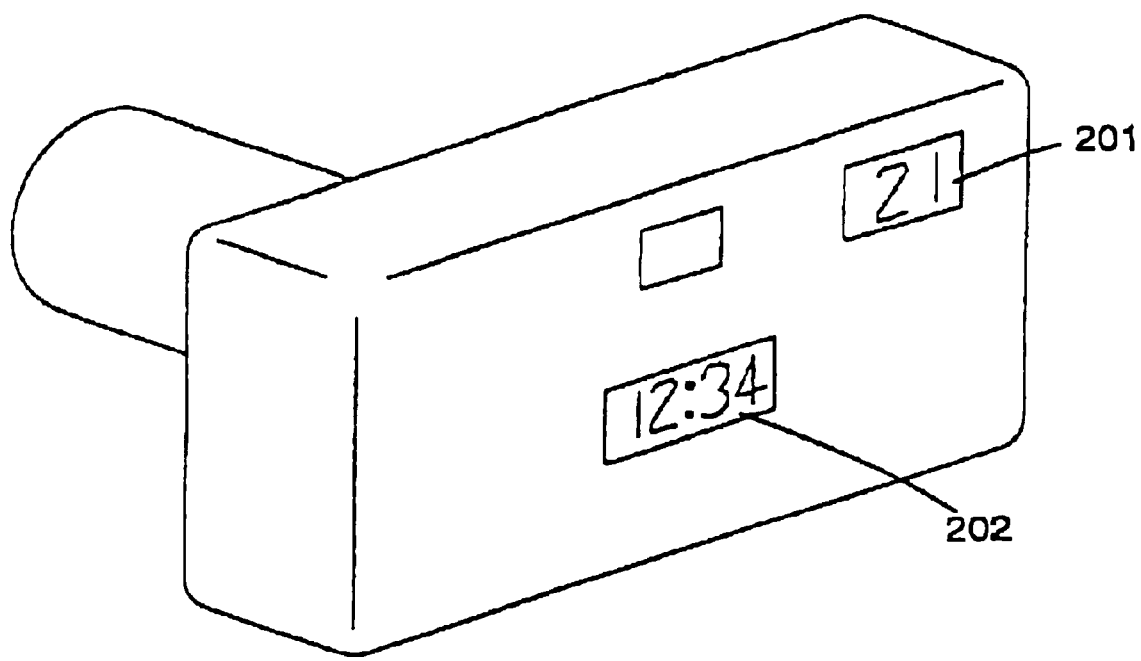
FIG. 79 is a perspective view showing a further example of a display device according to a twenty-eighth embodiment of the present invention.

FIG. 79 shows a data terminal device on which is mounted a liquid crystal display device 191 comprising a liquid crystal display of the bright reflective type wherein a polarisation separating plate and optical absorbing layer as described above are employed in place of the prior art lower polarising plate and reflective plate, and a front light according to any of embodiments 17 to 24 arranged on the upper face of this liquid crystal display. In this example also, a data terminal device can bee realised wherein the display is uniform and easy to view with no generation of bright lines as described above and yet wherein power consumption is restricted and battery life extended. The present invention is beneficial in particular for data terminal devices that are often used in comparatively dark environments such as warehouses.

Twenty-eighth Embodiment

FIG. 79 shows a camera wherein there are mounted liquid crystal display devices (201 and 202) comprising a bright reflective type liquid crystal display device wherein a polarisation separating plate and optical absorbing layer as described above are used instead of the prior art lower polarising plate and reflecting plate and a front light as shown in any of embodiments 17 to 24 arranged on the front face of this liquid crystal display. In this example, a camera can be realised wherein the display is uniform and easy to view with no production of bright lines as described above and yet in which power consumption is restricted and battery life extended.

As described above, with the seventeenth to twenty-eighth embodiments and their modifications, liquid crystal display devices can be realised having a uniform and bright front light which is operated with power saving arranged at the front face of a bright reflective type liquid crystal display using a polarisation separating plate. Furthermore, it is effective to mount this liquid crystal display device on a portable device such as a portable telephone, watch, data terminal device or camera in particular which are often used in dark environments.

Twenty-ninth Embodiment

Figure 80:
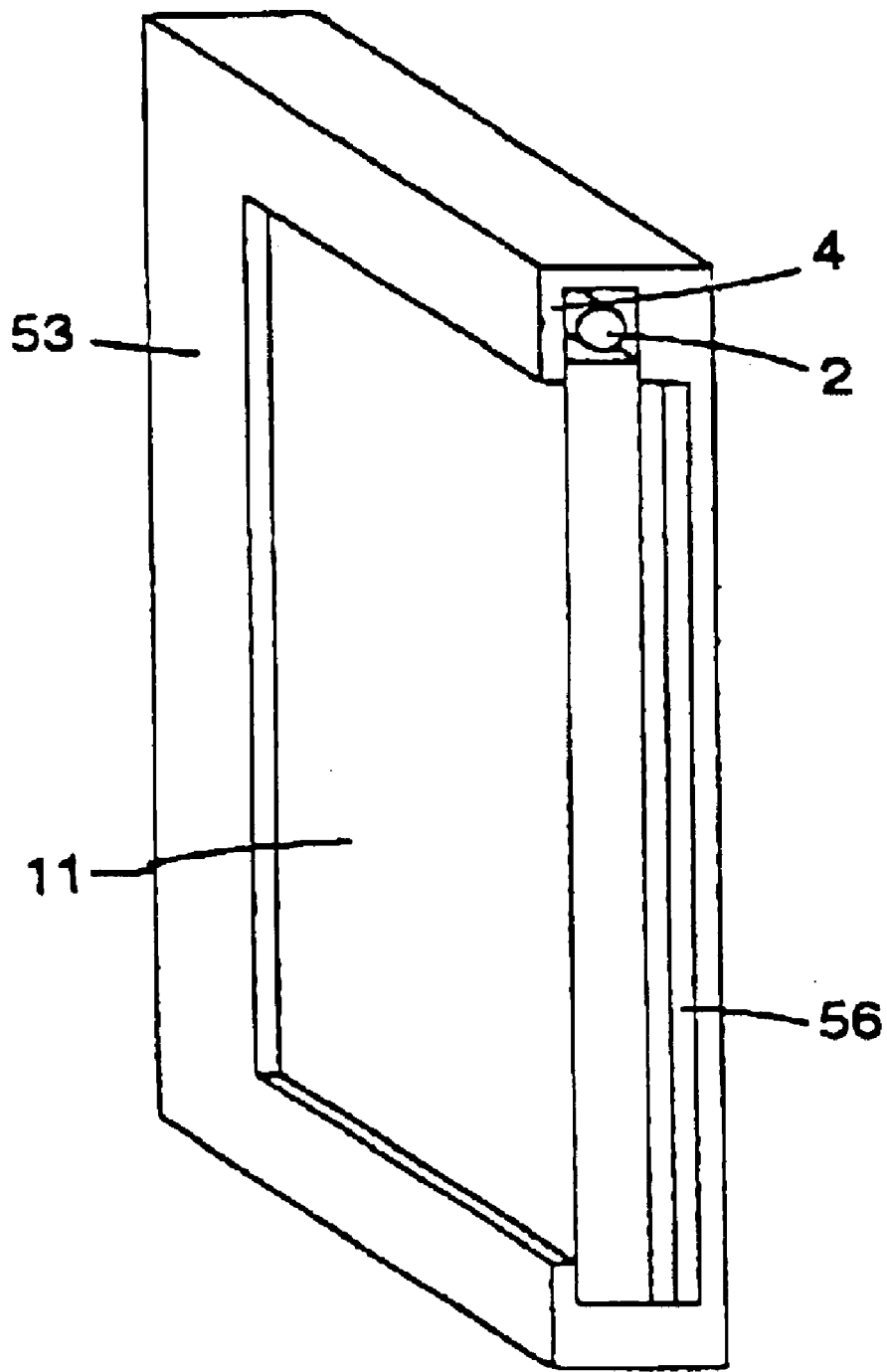
FIG. 80 is a perspective view showing an example of a display device according to a twenty-ninth embodiment of the present invention.
Figure 81A:
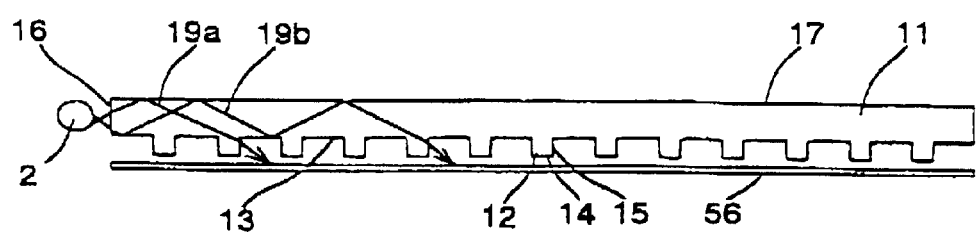
FIG. 81A and FIG. 81B are a diagrammatic cross-sectional view and a perspective view showing the twenty-ninth embodiment of the present invention.
Figure 81B:
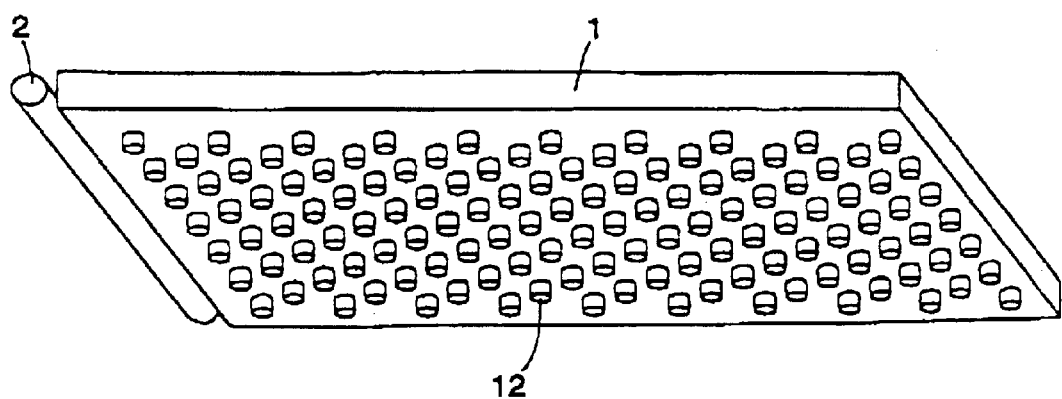

A twenty-ninth embodiment is described below with reference to the drawings. In FIG. 80, a notice 56 is arranged within a thin box-shaped casing 53 and a light-guide plate 11 is arranged an the observer side of the notice completely covering it. Light sources 2 are accommodated at the edge of casing 53, and are arranged adjacent to the end face 16 of light-guide plate 11. Light sources 2 cannot be directly viewed since they are hidden by a screening part 54 of the edge front face of caning 53 from the observer. Light-guide plate 11 is provided with projections 12 on one face of the transparent plate as shown in FIG. 81A or 81B; all the faces of projections 12 are comprised by faces practically parallel to optical output face 13 (bottom faces 14) and faces approximately perpendicular thereto (side faces 15). The light-guide plate 1 is formed of transparent material of refractive index above about 1.4. Optical flux from light sources 2 is input from end face 16 as shown by ray 19a and ray 19b and is then repeatedly totally reflected within light-guide plate 11 before exiting solely from the side faces 15 of projections 12, so the amount of light output from the back face of the illuminating devise is large and notice 56 can be effectively illuminated.

Also, as the transparent material that forms light-guide plate 11, transparent resin such as acrylic resin, polystyrene resin, polycarbonate resin, or amorphous polyolefin resin etc., transparent film such as polyolefin resin or polyester resin such an polyethylene terephthalate resin, or inorganic transparent material such as glass or composites thereof may be employed. Examples of methods of manufacture that may be employed include: methods such as joining a film or resin layer on to an injection moulding, extrusion moulding, heat setting moulding, photo (ultraviolet) setting moulding, etching, transparent plastic or flat glass plate and the method of forming by transferring a transparent resin plate and/or transparent film by roll moulding etc.

As light source 2, a fluorescent tube, electric light bulb, or light emitting diode (LED) etc. may be employed. Fluorescent tubes may be expected to have high brightness for low power and can easily provide white light and so are suited to notice board applications. LEDs have a semi-permanent life and can be driven at low voltage so the circuitry is simple and safety is high. Regarding colour recently, apart from red, green and blue, mixtures of these colours and also white have become available. Electric light bulbs suffer from the drawback of a short life but they are cheap and can easily be replaced. With the above construction, by arranging the present notice board device in front of a notice a notice board device can be realised wherein, under bright conditions when there is sufficient external light the notice can be viewed with the illumination extinguished while under dark conditions with insufficient external light the notice can be viewed with the illumination turned on, providing part-time illumination with extremely small thickness. A further decrease in power consumption can also be obtained from the fact that, when illuminated, the illumination is at a location that is extremely close to the light source.

Regarding the size of projections 12, since the wavelength of visible light is from about 380 nm to 700 nm, this must be at least about 5 $\mu$m to avoid diffraction effects and is desirably below about 1 mm if projections 12 are not to be so large as to be noticeable to the naked eye. Also regarding the ratio of height and width (i.e. diameter if the projections are approximately cylindrical) of projections 12, since, for rays within light-guide plate 1, the angle of elevation in the planar direction is under 45°, a ratio of one-to-one or less is satisfactory; since in fact rays of under 20° represent more than 90%, satisfactory performance is obtained with ratios up to 1 to 2.

Figure 82:
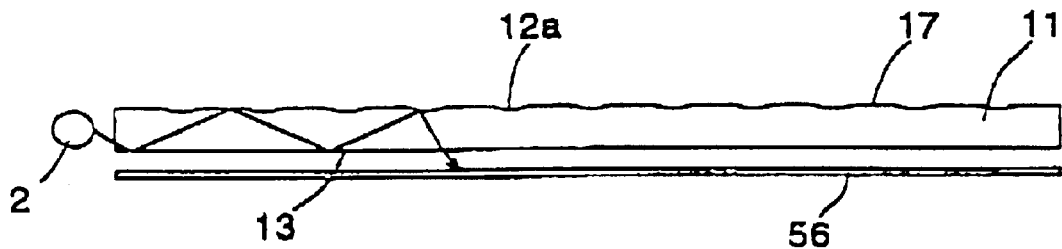
FIG. 82 is a diagrammatic cross-sectional view relating to a modification of the twenty-ninth embodiment.

In FIG. 82, concave shapes 12a are provided on face 17 on the opposite side to the optical output face of light-guide plate 11. Concave shapes 12a can have any desired size and shape and have the function of converting optical flux arriving at these concave shapes 12a into optical flux having a large angle of elevation with respect to the plans of light-guide plate 11; it has been found that good performance is obtained by making them approximately spherical of centre angle less than 90°.

Optical flux red into light-guide plate 11 from point light sources 2 is guided within light-guide plate 11 whilst being subjected to total reflection; however, since concave shapes 12a are provided in face 17 opposite to the optical output face of light-guide plate 11, the optical flux arriving thereat is converted to optical flux having a large angle of elevation with respect to the plane of light-guide plate 11 and so can be output from optical output face 13. The construction functions as planar illumination by the arrangement of a notice 56 at optical output face 13 of light-guide plate 11. Also, since the rest of face 17 opposite to the optical output face i.e. apart from the concave shapes is practically parallel to optical output face, it has the function of perpendicular ray transmission whereby rays in a direction intersecting the flat plate are transmitted unaffected.

These concave shapes 12a can be provided in any desired area ratio with respect to the area of the illumination section. However, although illumination efficiency can be raised by increasing the area ratio of concave shapes 12a, recognisability is lowered by decreasing the proportion of perpendicularly transmitted rays. In fact it is not realistic to set an area ratio of above 50% and for part-time illumination under dark conditions an area ratio of about 10% may suitably be set. Also, if, as described above, the density is regulated in order to make the illumination brightness uniform, if the density is about 10%, the area ratio of the perpendicular transmission section will be in the range about 80–90%, so no unevenness of recognisability dependent on position will be experienced.

Regarding the size of concave shapes 12a, since the wavelength of visible light is from about 380 nm to about 700 nm, this must be at least about 5 $\mu$m in order to avoid diffraction effects and concave shapes 12a are desirably under about 1 mm in order not to be of such a size as to be noticeable to the naked eye.

Figure 83:
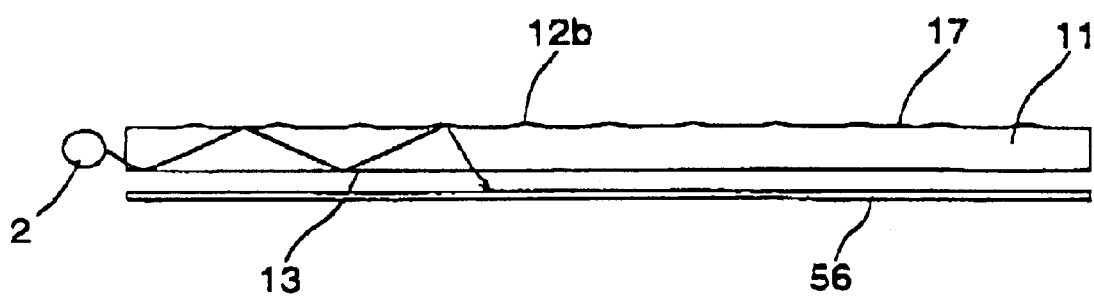
FIG. 83 is a diagrammatic cross-sectional view relating to a further modification of the twenty-ninth embodiment.

In FIG. 83, convex shapes 12b are provided on the side of face 17 opposite to the optical output face of light-guide plate 11. Convex shapes 12b can have any desired size and shape and have the function of converting optical flux arriving at these convex shapes 12b into optical flux of large angle of elevation with respect to the plane of light-guide plate 11; it has been found that good results are obtained by making them approximately conical surfaces of apex angle less than 20°. The density and size of convex shapes 12b are in accordance with those of the concave shapes described above.

Figure 84:
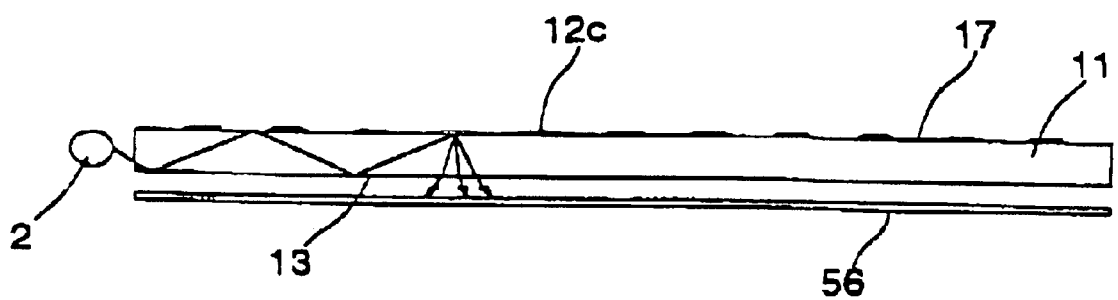
FIG. 84 is a diagrammatic cross-sectional view relating to a further modification of the twenty-ninth embodiment.

In FIG. 84, an optical diffusion member layer 12c is provided on face 17 opposite the optical output face of light-guide plate 11. [The members of] optical diffusion member layer 12c can have any desired size and shape and have the function of converting optical flux arriving at this optical diffusion member layer 12c into optical flux having a large angle of elevation with respect to the plane of light-guide plate 11. Specifically, this optical diffusion member layer 12c has an optical diffusion function towards optical output face 13 and an optical screening capability towards face 17 opposite to the optical output face. A further optical screening layer may be provided in order to guarantee optical screening capability. Optical diffusion member layer 12c can be formed by for example printing or etching; an optical screening layer can be formed by a method such as printing or metallic film deposition. The density and size of [the members of] optical diffusion member layer 12c are in accordance with those of the concave shapes described above.

Figure 85:
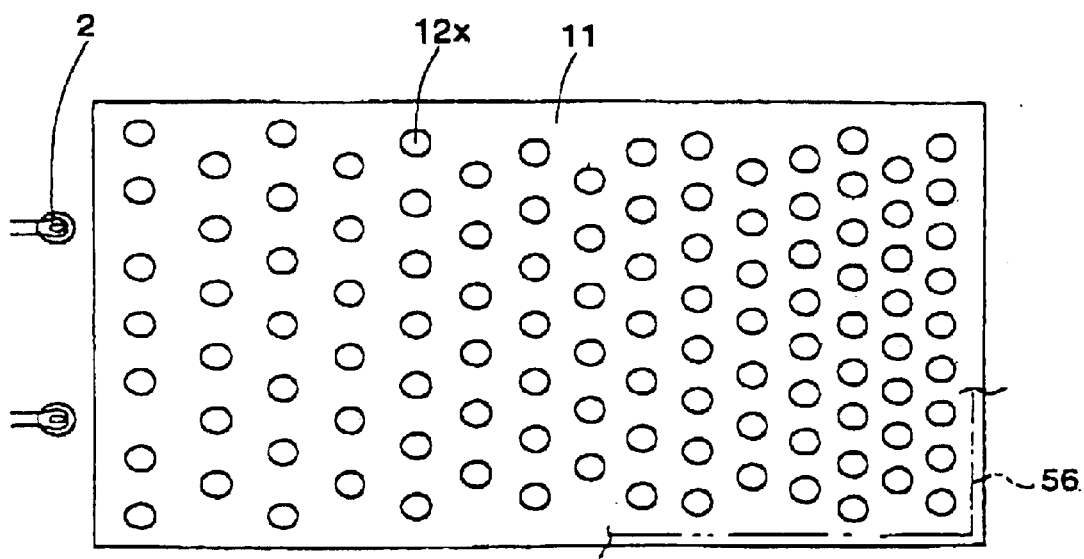
FIG. 85 is a diagrammatic plan view relating to a further modification of the twenty-ninth embodiment.

FIG. 85 shows an example in which point-form optical extraction shapes 12x as described above are distributed on light-guide plate 11 sparsely in the vicinity of light sources 2 and more densely as the distance from light sources 2 is increased. The optical flux density in light-guide plate 1x is high in the vicinity of light sources 2 but the rays are dispersed by optical extraction shapes 12x so the optical flux density decreases going away from light sources 2; optical extraction shapes 12x are therefore arranged progressively more densely. In this way, more uniform illumination is possible.

Figure 86:
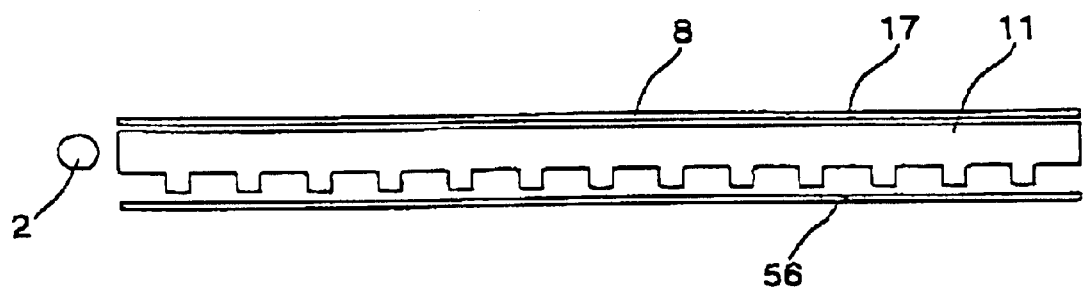
FIG. 86 is a diagrammatic cross-sectional view relating to a further modification of the twenty-ninth embodiment.

In FIG. 86, a transparent plate or transparent sheet 8 is arranged on face 17 opposite to the optical output face of light-guide plate 11. Light-guide plate 11 and the transparent plate or transparent sheet 8 are not stuck together but have an air layer therebetween. If there is even slight damage to the surface of light-guide plate 1, rays which are being guided through the interior thereof are reflected thereat and can be recognised as bright points or bright lines from the surface. Not only are these unattractive as illumination of the transmission type but they also severely lower recognisability due to lowered contrast. However, since an air layer is interposed between the transparent plate or transparent sheet 8 and optical guide plate 11, optical flux from light sources 2 cannot enter therein, so even if there is damage, bright points or bright lines cannot be produced. Also in this case, since the relative area of the damage is slight, there is very little effect on notice 56 in terms of recognisability. In order to use this light-guide plate 11 as illumination arranged at the front face, the presence of a transparent plate or transparent sheet 8 is indispensable. For transparent plate or transparent sheet 8, transparent resin such as polycarbonate resin or amorphous polyolefin resin or inorganic transparent material such as glass may be employed.

Figure 87:
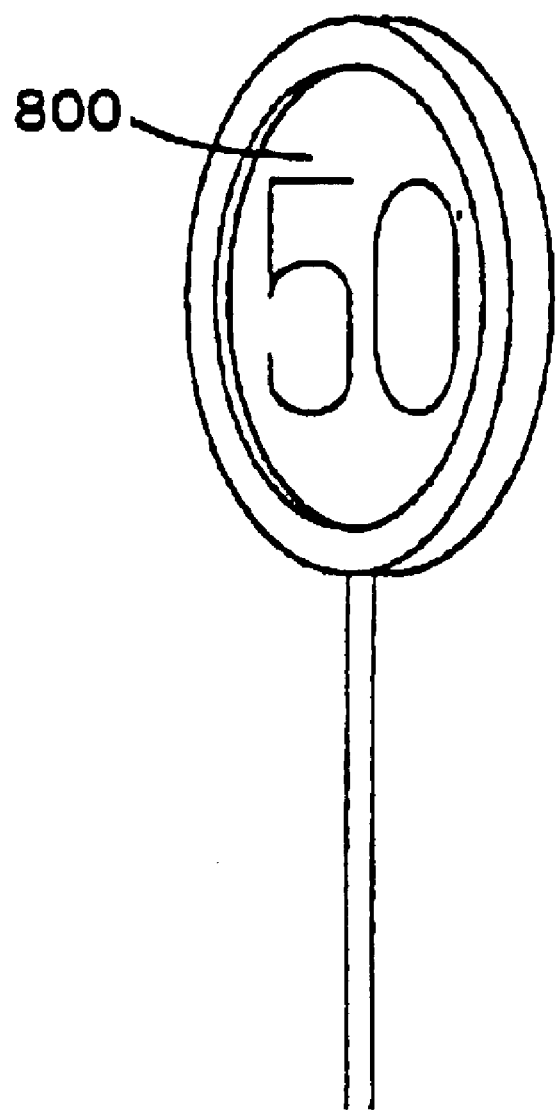
FIG. 87 is a perspective view showing an example of a display device employing the twenty-ninth embodiment.

FIG. 87 shows an example in which a notice board device is used for a traffic sign 800. A sign can be implemented which is easy to recognise even at night without impairing the reflective function utilising rays from car headlights which is possessed by a traffic sign.

Figure 88:
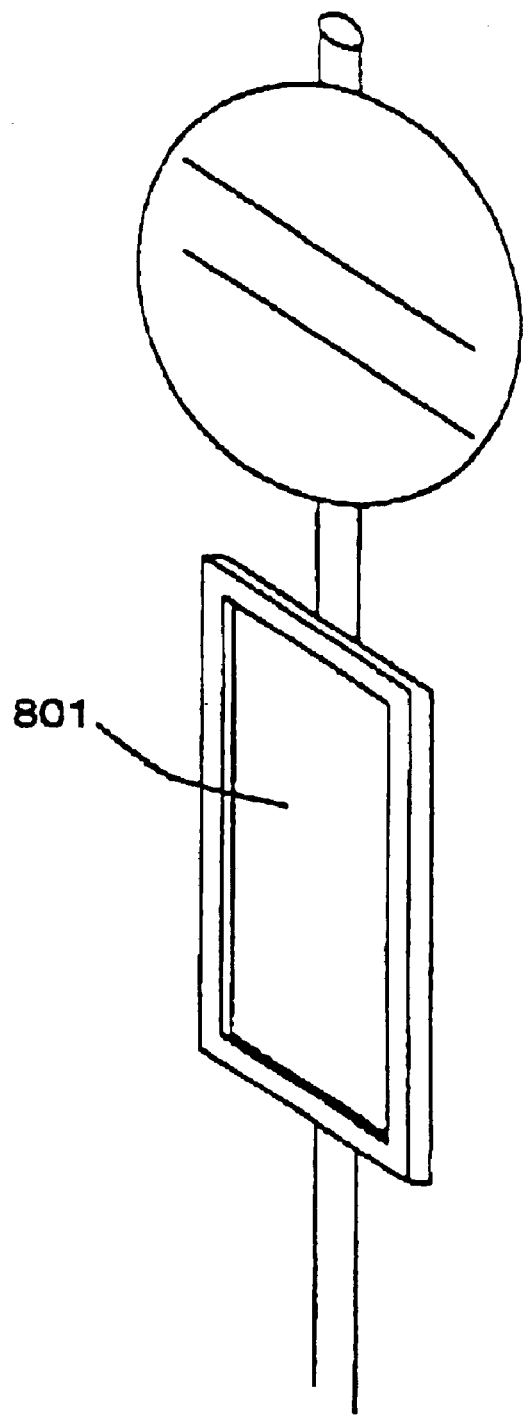
FIG. 88 is a perspective view showing a further example of a display device employing the twenty-ninth embodiment.

FIG. 88 shows an example in which a notice board device is used as a bus stop sign 801. Display indication with low power consumption can be achieved.

Figure 89:
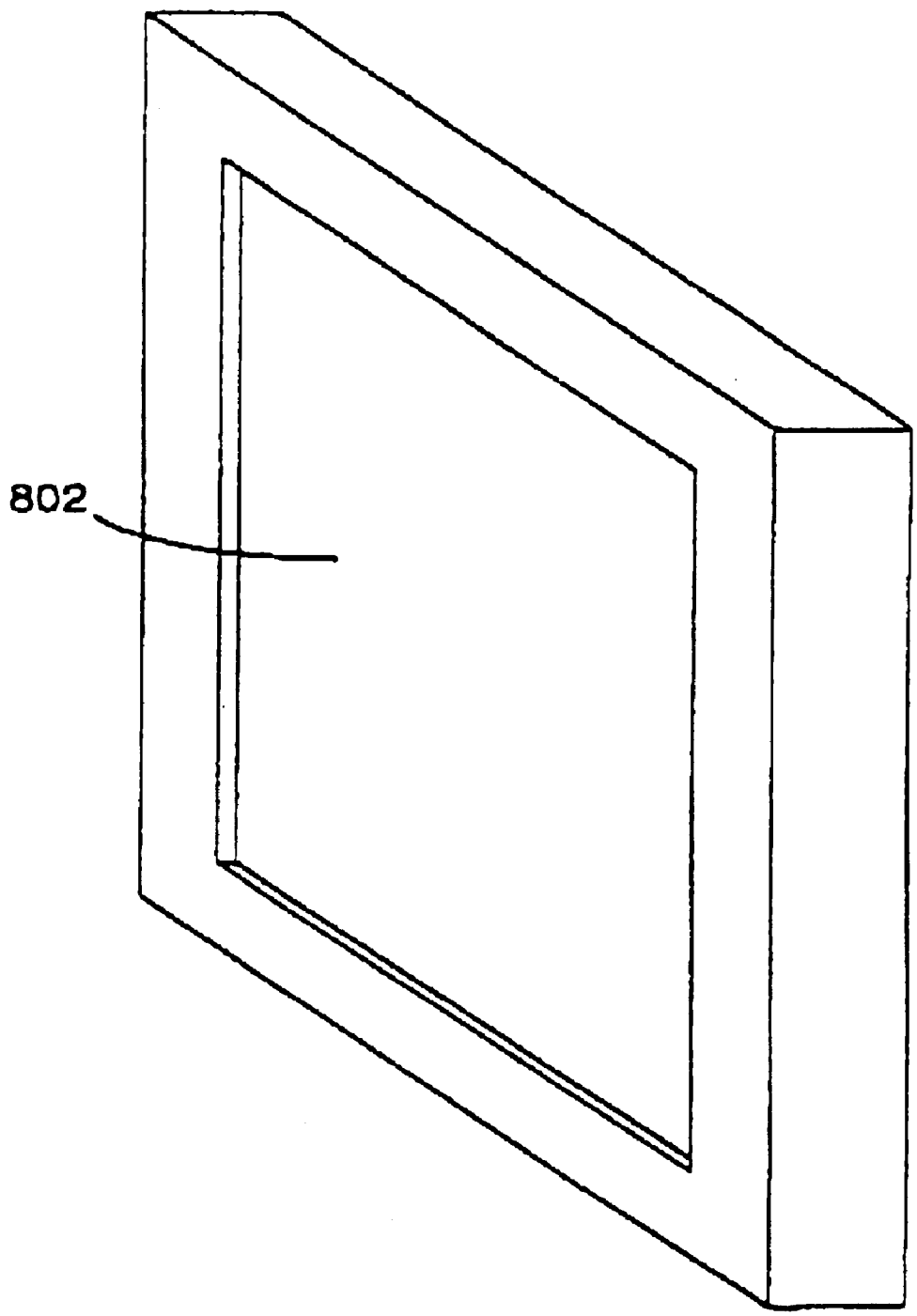
FIG. 89 is a perspective view showing a further example of a display device employing the twenty-ninth embodiment.

FIG. 89 shows an example in which a notice board device is employed in a picture frame 802. A picture frame can be realised that can be recognised in dark locations.

Figure 90:
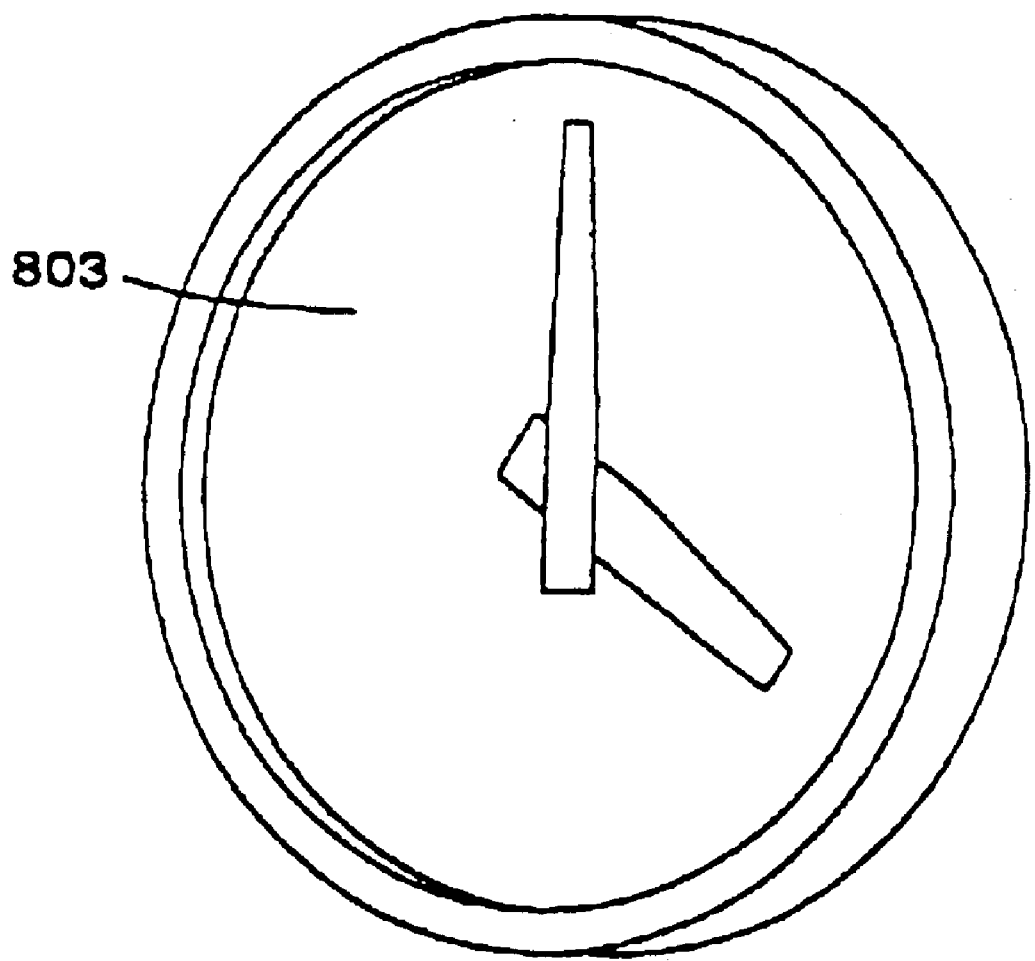
FIG. 90 is a perspective view showing a further example of a display device employing the twenty-ninth embodiment.

FIG. 90 shows an example in which a notice board device is used in a clock face 803. Illumination with low power consumption can be achieved for clocks etc. arranged in public places.

As described above, with the twenty-ninth embodiment and examples of application thereof, a notice board device and signs etc. using the notice board device can be provided having an illumination function with small thickness, high uniformity of illumination, and which enables power saving, by means of a simple construction.

It should be noted that, with the illumination device of the present invention exemplified by the embodiments and modifications described above, various applications are possible including the display devices already described. These are again indicated by way of example in the form of a summary:

Illumination devices of portable devices such as portable telephones, small-size information devices, or watches Illumination devices for furniture such as ornamental shelf illumination, triple mirror lights, or the glass parts of tables Illumination devices for night illumination of large outdoor clocks, public maps, or timetable display boards at for example bus stops etc.

Illumination devices of for example sunroofs or covers for automobiles

Illumination devices for medical equipment such as mirror lights in dentistry

Illumination devices used in illumination of compact reference books, illumination for in-flight reading material, or outdoor map illumination Illumination devices used for show case illumination, or for illumination of displays or art gallery exhibits Illumination devices used for louver illumination, photo frame illumination, or for small domestic items such as picture frame illumination Illumination devices for buildings such as illumination for windows, shower rooms, night illumination of entrances, indoor wall lighting, or illumination of frames set into walls Illumination devices for example product illumination of automatic vending machines, illumination of the water in swimming pools, and illumination of outdoor company signboards etc.

There are a very wide range of industrial applications such as the above.

Figure 91A:
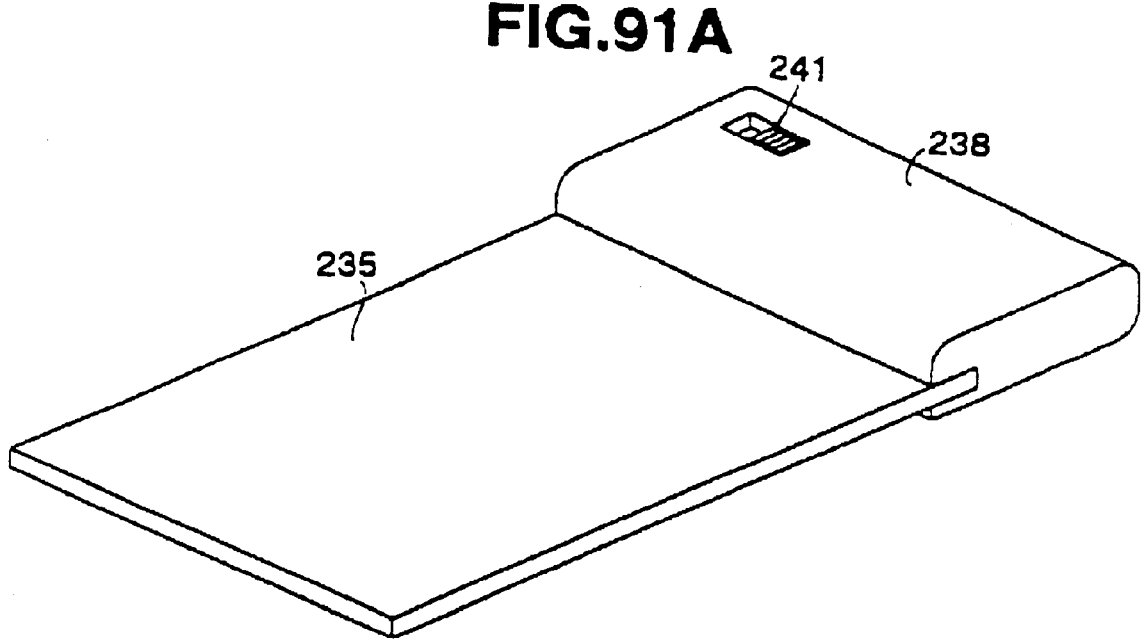
FIG. 91A to FIG. 91C are a perspective view, plan view and side view of an illumination device of a handy type employing the present invention.
Figure 91B:
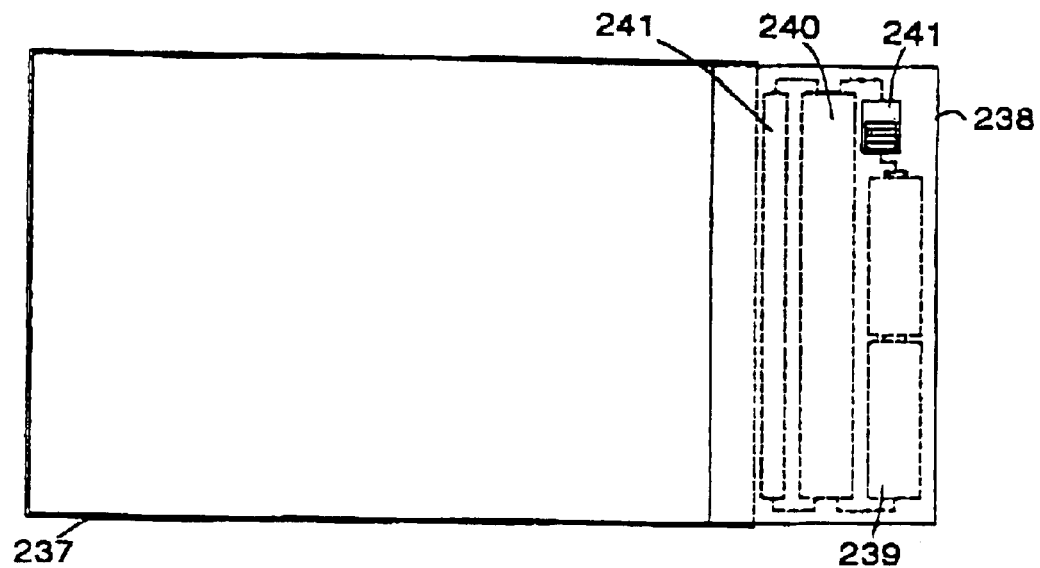
Figure 91C:
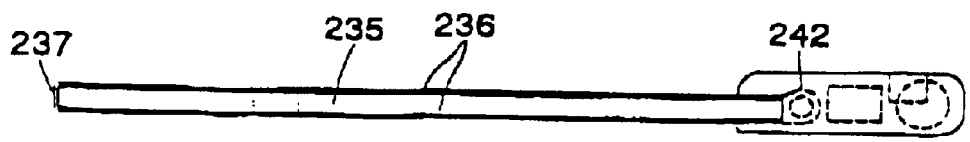

Of these, an example of an illumination device employed in for example outdoor map illumination is shown in FIG. 91A–FIG. 91C. This device has excellent portability, being of a compact size such as could be held in the palm of the hand (for example a size about that of a postcard). In this illumination device, transparent protective sheets 236 are respectively stuck on to the upper and lower faces of a light-guide plate 235 and reflective sheets 237 are respectively stuck on to three side faces. The functions of light-guide plate 235, protective sheets 236 and reflective sheets 237 are the same as or equivalent to those already described. A rectangular box-shaped case 236 is mounted on the remaining optical input side face portion of light-guide plate 235 so as to cover part of it. Within this case there are accommodated a battery 239 constituting a power source, a lighting circuit (inverter) 240, a fluorescent tube 241 constituting a linear light source, and a switch 242 etc. Fluorescent tube 241 is covered by a reflector 242. Lighting circuit 240 can thereby light fluorescent tube 241 with power from battery 239 when necessary so that the actions and effects described above can be obtained. A handy-type illumination device having a convenient high quality illumination function whereby a map can be viewed outdoors can thereby be provided. It should be noted that the present invention is not restricted to the constructions set out in the embodiments and modifications described above but could of course be modified in various ways without departing from the essence of the present invention as set forth in the claims, by persons skilled in the art.

What is claimed is:

1. A liquid crystal display device, comprising:
    a liquid crystal display including a reflector; and
    an illumination device arranged at the front side of the liquid crystal display,
    the illumination device comprising:
        a light-guide plate with transparency having a first face on which a optical extraction structure is formed and a second face being opposite to the first face; and
        a light source facing the second face of the light guide plate so as to introduce light in the light-guide,
        wherein the second face is adapted to face the liquid crystal display, wherein the optical extraction structure include a plurality of convex elements.

2. The illumination device according to claim 1, wherein the elements are distributed relatively sparsely in the vicinity of the light source and progressively more densely going away from the light source.

3. The illumination device according to claim 1, wherein a light illuminated from the light source is output through the second face, is reflected by the reflector, passes through the light-guide plate, and is output from the first face.

4. The illumination device according to claim 1, wherein the optical extraction structure includes an inclined face of less than 30°.

5. The illumination device according to claim 1, wherein the light source is selected from a group consisting of an LED, a light bulb and a fluorescent light.

6. The illumination device according to claim 1, wherein the diameter of a bottom face of the optical extraction structure is more than 5 $\mu$m and less than 300$\mu$ in size.

7. The illumination device according to claim 1, further comprising a reflector provided on at least one end of the light-guide plate other than the end where the light source faces.

8. The illumination device according to claim 1, further comprising a transparent plate provided at the first face, wherein a gap is formed between the first face and the transparent plate.

9. The illumination device according to claim 1, wherein the light source faces an end face of the light-guide plate.

* * * * *